(12) United States Patent
Pierer

(10) Patent No.: US 9,792,757 B2
(45) Date of Patent: Oct. 17, 2017

(54) 3D ENHANCED GAMING MACHINE WITH SELECTABLE 3D INTENSITY LEVEL

(71) Applicant: IGT CANADA SOLUTIONS ULC, Moncton (CA)

(72) Inventor: Franz Pierer, Kainbach (AT)

(73) Assignee: IGT CANADA SOLUTIONS ULC, Moncton (CA)

( * ) Notice: Subject to any disclaimer, the term of this patent is extended or adjusted under 35 U.S.C. 154(b) by 285 days.

(21) Appl. No.: 14/487,870

(22) Filed: Sep. 16, 2014

(65) Prior Publication Data

US 2016/0078710 A1    Mar. 17, 2016

(51) Int. Cl.
*G07F 17/32* (2006.01)
*A63F 13/25* (2014.01)

(52) U.S. Cl.
CPC ......... *G07F 17/3211* (2013.01); *A63F 13/25* (2014.09); *G07F 17/3216* (2013.01)

(58) Field of Classification Search
CPC ............ G07F 17/3211; G07F 17/3216; G07F 17/3241; A63F 13/25
USPC ........................................ 463/16, 20–25, 31
See application file for complete search history.

(56) References Cited

U.S. PATENT DOCUMENTS

| | | | | |
|---|---|---|---|---|
| 6,954,223 B2 * | 10/2005 | Miyazawa | ......... | H04N 13/0051 348/51 |
| 7,857,700 B2 * | 12/2010 | Wilder | ............... | G02B 27/2214 345/419 |
| 8,077,195 B2 * | 12/2011 | Großmann | ......... | G02B 27/0093 345/32 |
| 2001/0048507 A1 * | 12/2001 | Thomas | ............. | G02B 27/2214 353/10 |
| 2002/0186348 A1 * | 12/2002 | Covannon | ............ | G02B 27/225 351/240 |
| 2004/0192430 A1 * | 9/2004 | Burak | ................ | G02B 27/2214 463/20 |
| 2007/0285585 A1 * | 12/2007 | Nakamura | ............. | G03B 21/10 348/744 |

(Continued)

OTHER PUBLICATIONS

Seong-Mo An, et al, "Interaxial Distance and Convergence Control for Efficient Stereoscopic Shooting using Horizontal Moving 3D Camera Rig", World Academmy of Science, Engineering and Technology vol. 5 Nov. 25, 2011, pp. 1397-1402.

(Continued)

*Primary Examiner* — David L Lewis
*Assistant Examiner* — Shauna-Kay Hall
(74) *Attorney, Agent, or Firm* — Sage Patent Group

(57) ABSTRACT

An electronic gaming machine for stereoscopic display of game components is provided. The machine includes at least one processor, memory storing processor-executable instructions in communication with the at least one processor, a stereoscopic display. Executing the instructions by the at least one processor causes the processor to: identify, for display, at least one game component in accordance with a set of game rules for a given game; select a three-dimensional intensity level for displaying the at least one game component; render left and right eye images based on the selected three-dimensional intensity level; and provide the rendered left and right eye images to the stereoscopic display, for presentation to the left and right eyes, respectively, of a player.

20 Claims, 88 Drawing Sheets

(56) References Cited

U.S. PATENT DOCUMENTS

| | | | | |
|---|---|---|---|---|
| 2011/0181706 | A1* | 7/2011 | Harrold | H04N 13/0497 |
| | | | | 348/51 |
| 2013/0182083 | A1 | 7/2013 | Grossmann | |
| 2013/0267317 | A1* | 10/2013 | Aoki | G07F 17/3206 |
| | | | | 463/32 |
| 2013/0303284 | A1* | 11/2013 | Aponte | G07F 17/3211 |
| | | | | 463/32 |
| 2014/0176685 | A1* | 6/2014 | Oikawa | G06T 15/08 |
| | | | | 348/51 |
| 2014/0364197 | A1* | 12/2014 | Osman | A63F 13/00 |
| | | | | 463/24 |

OTHER PUBLICATIONS

Tim Dashood, "A Beginner's Guide to Shooting Stereoscopic 3D", Dashwood Cinema Solutions, May 1, 2010 (revised Sep. 10, 2011).
"3D Rendering", Wikipedia, The Free Encyclopedia, Page Last Modified Jan. 22, 2015.

* cited by examiner

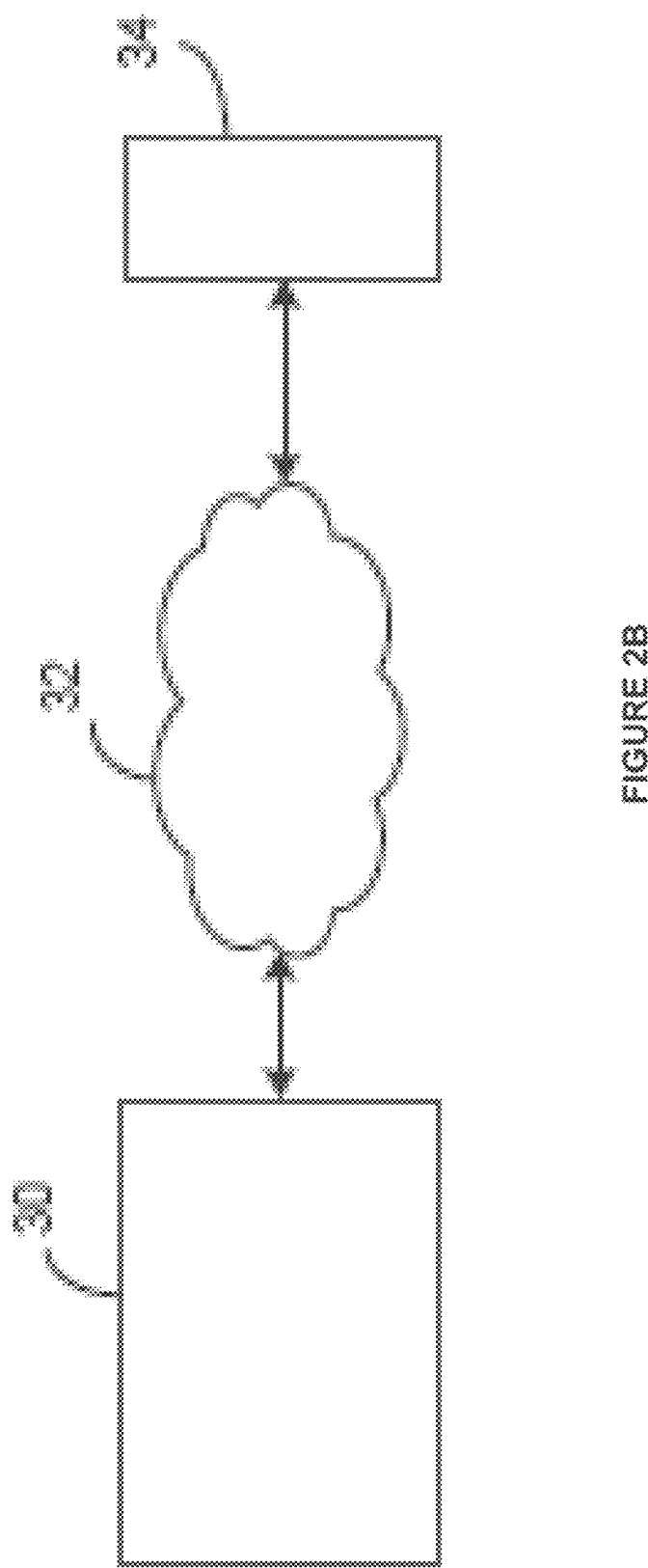

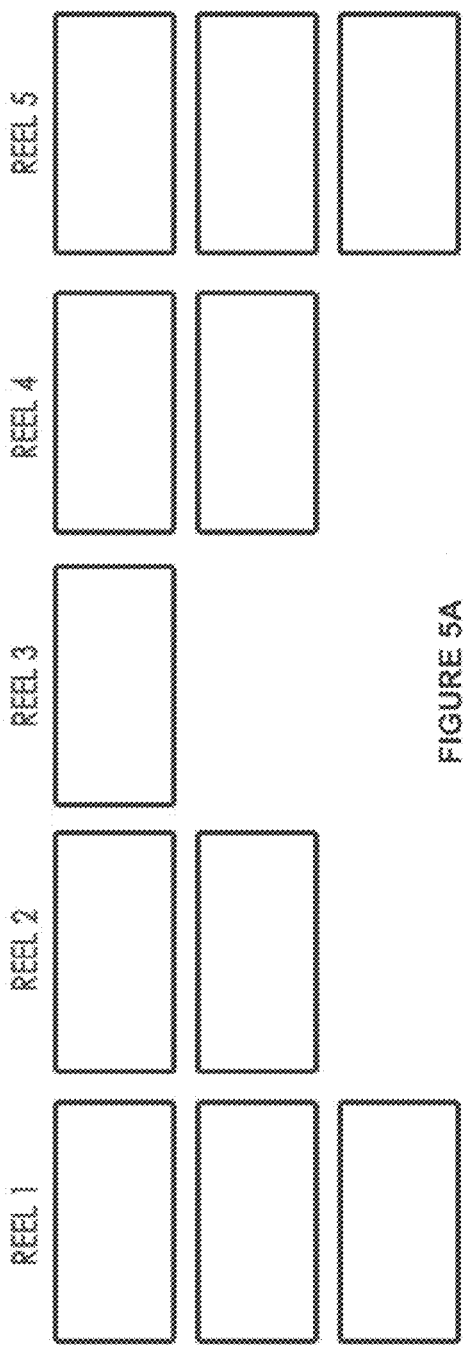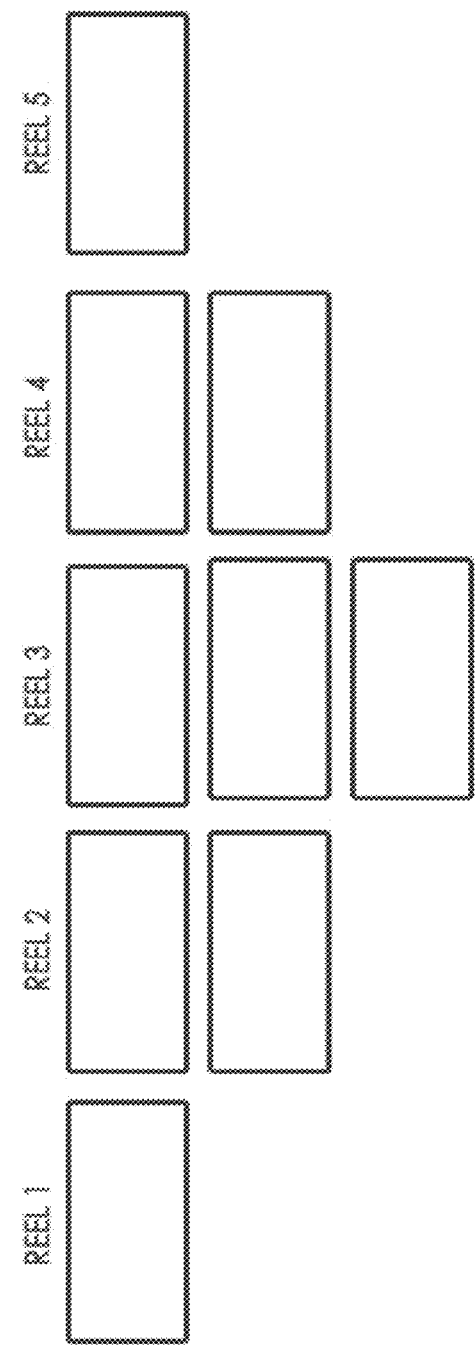

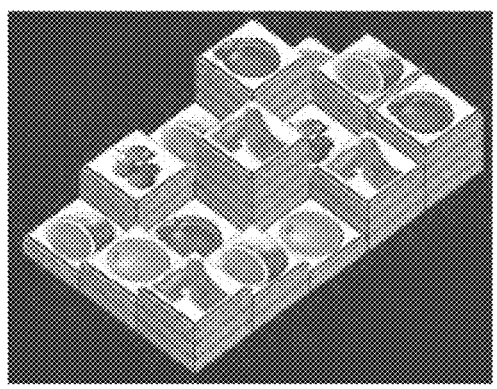
(a)
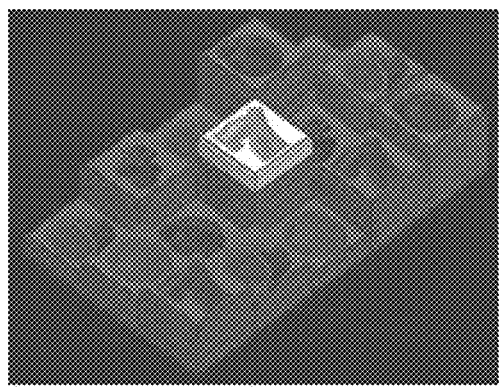
(b)
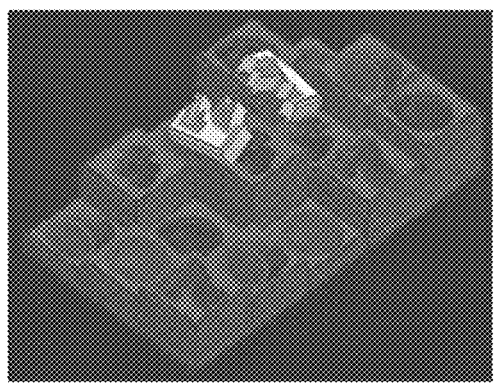
(c)
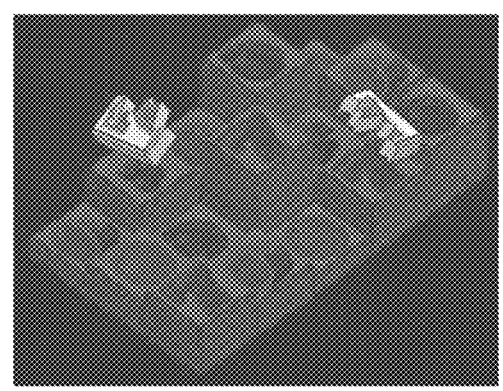
(d)
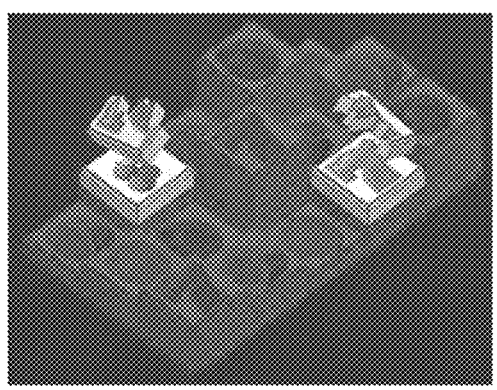
(e)
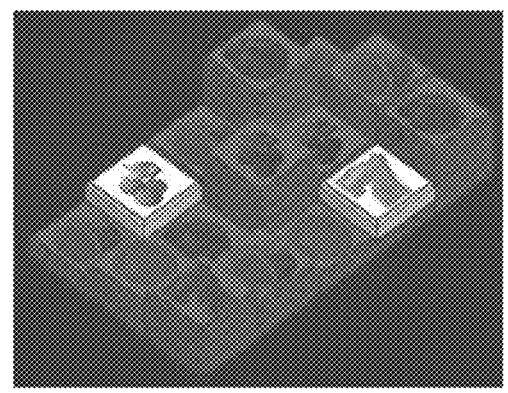
(f)
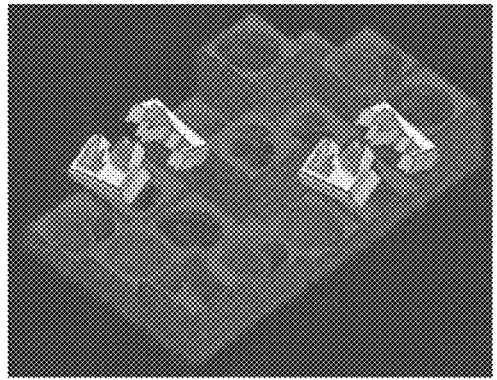
(g)
Figure 32

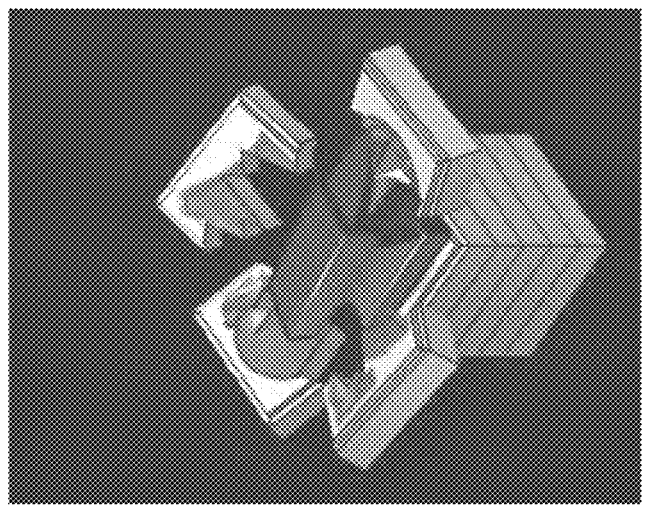
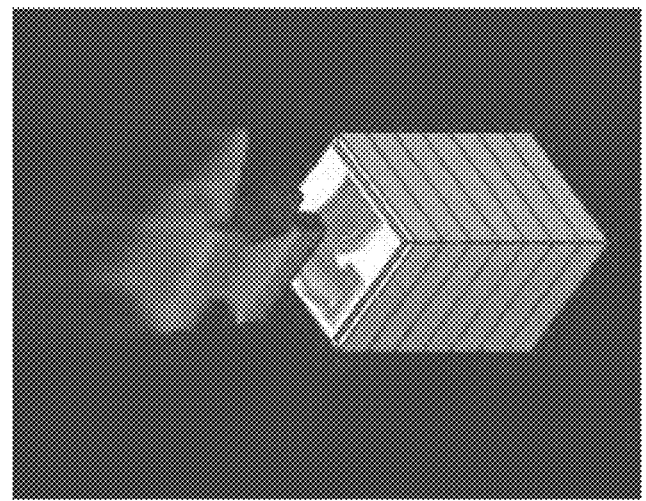
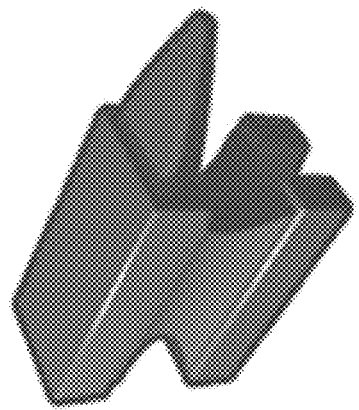
Figure 33

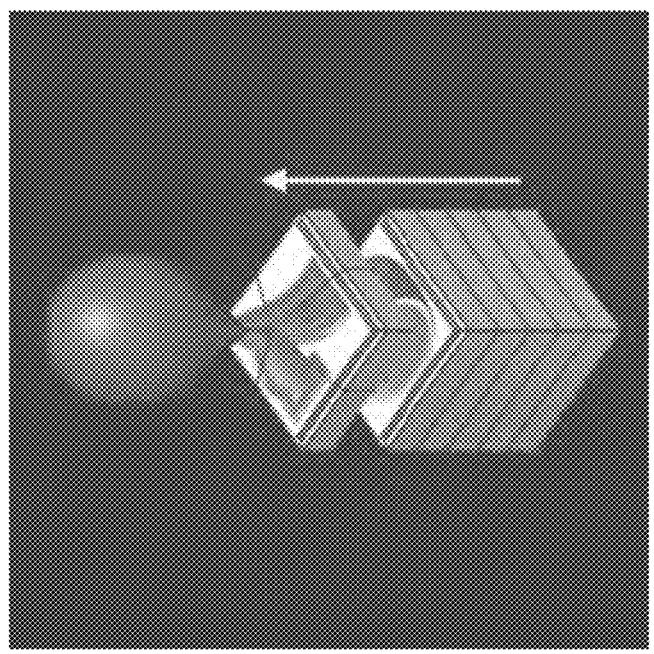
(b)
figure 34
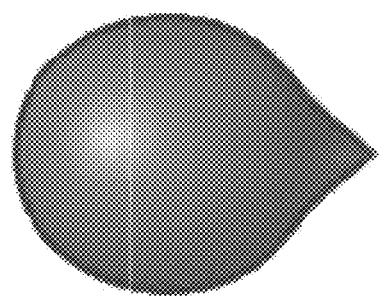
(a)

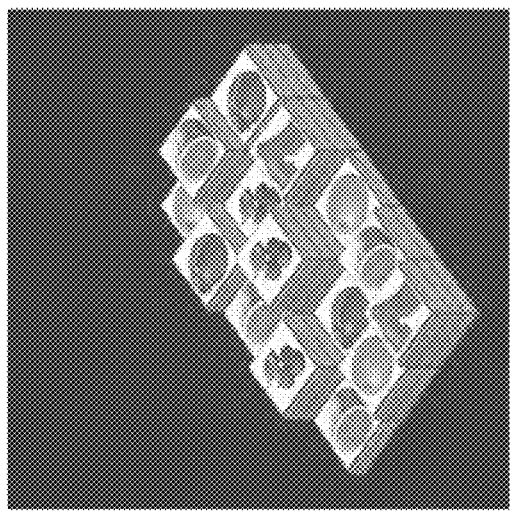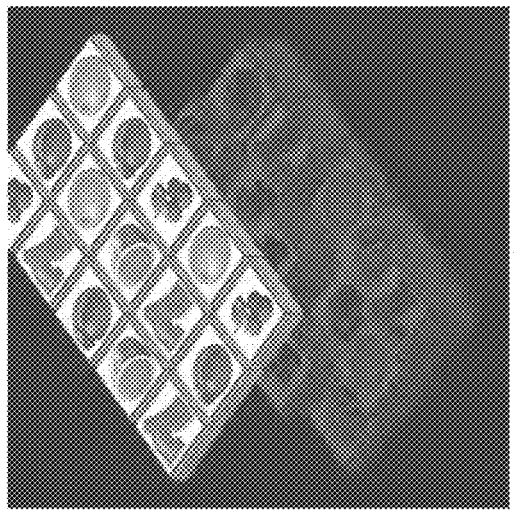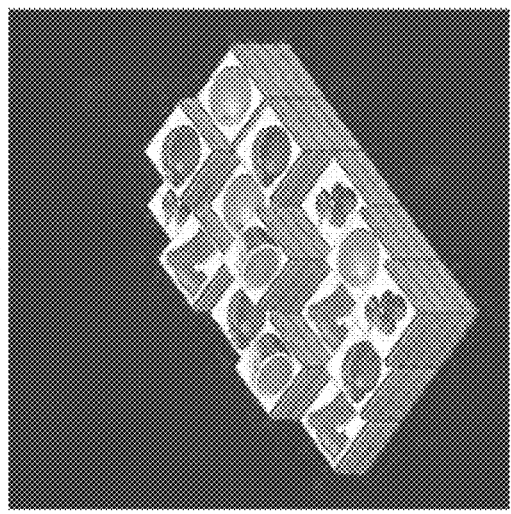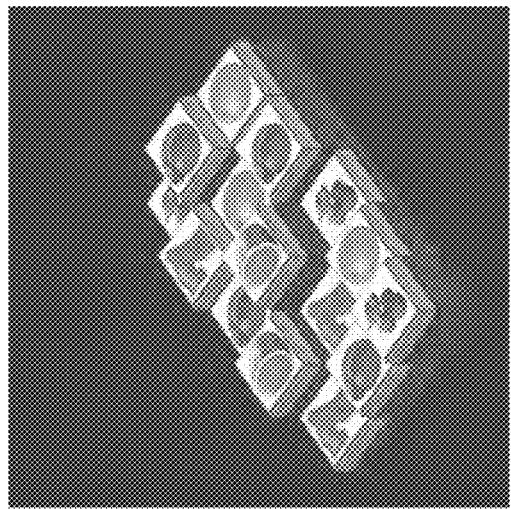
Figure 36

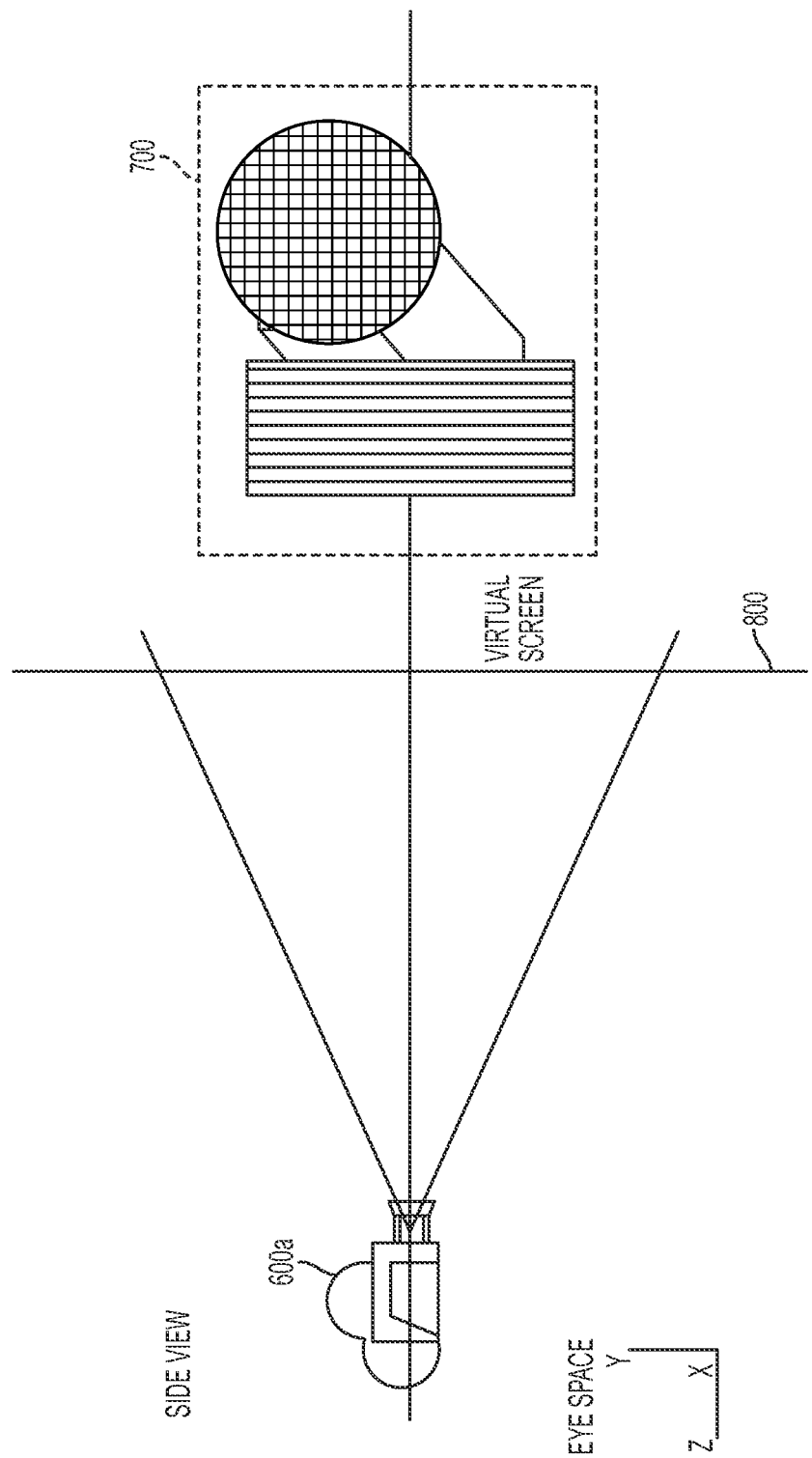

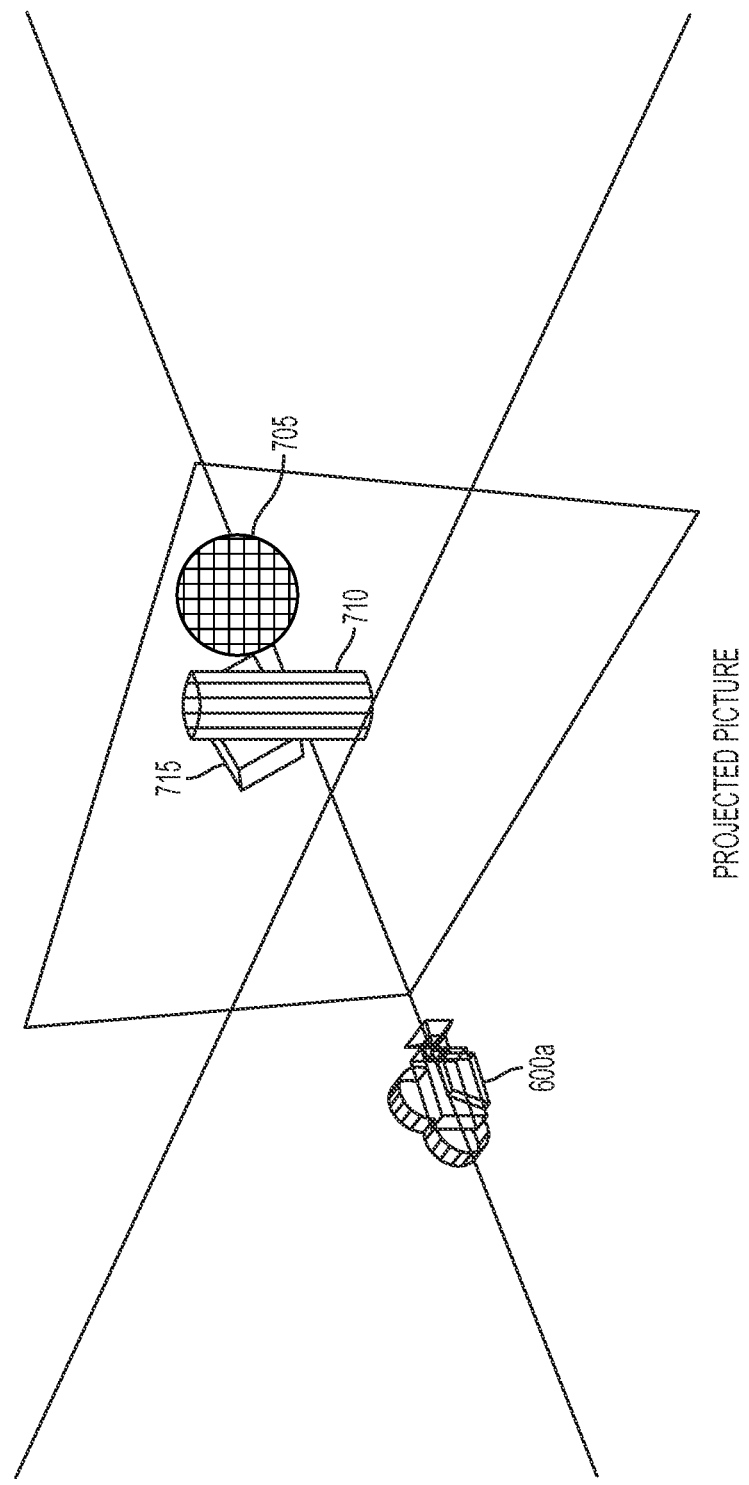

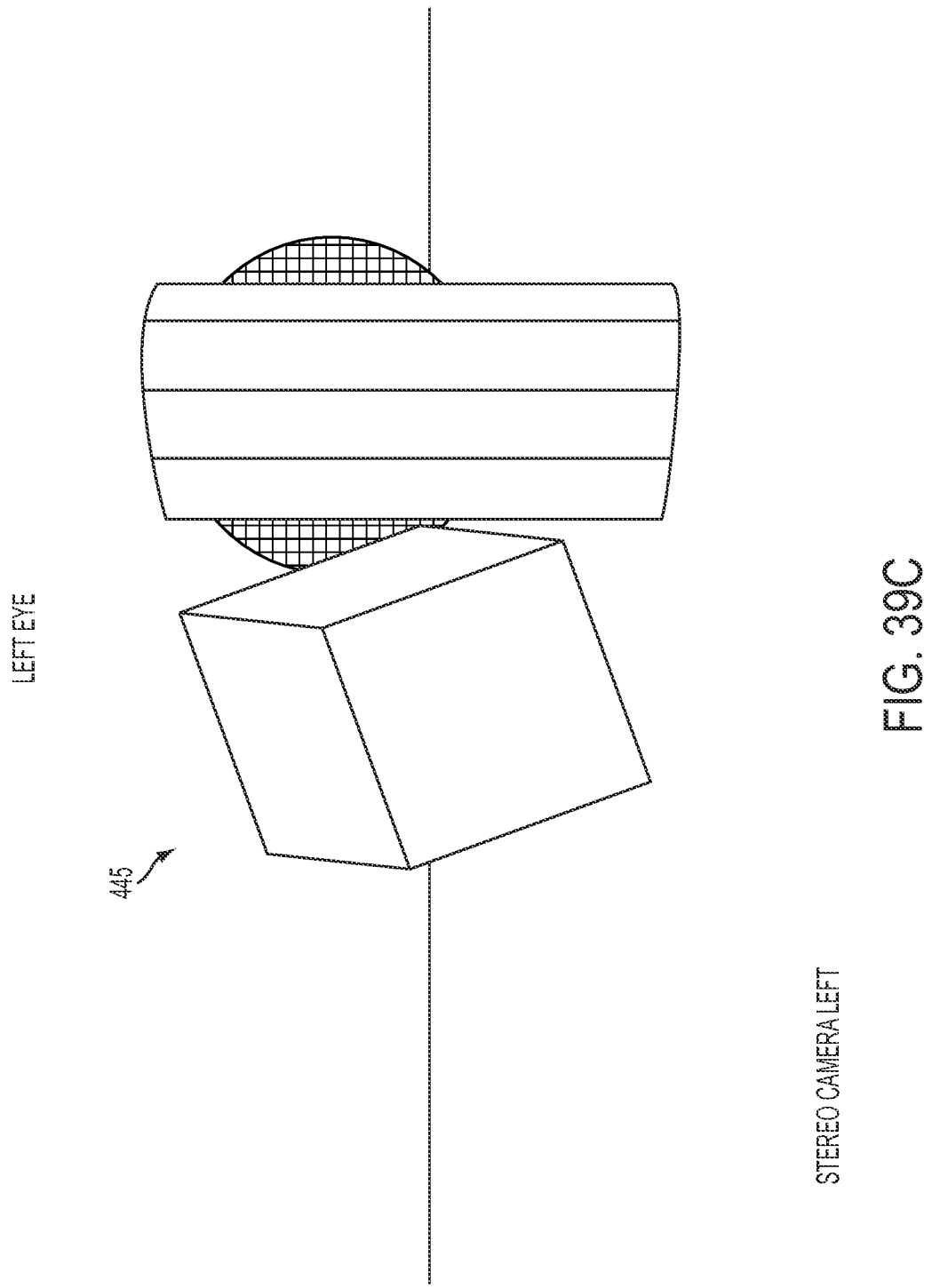

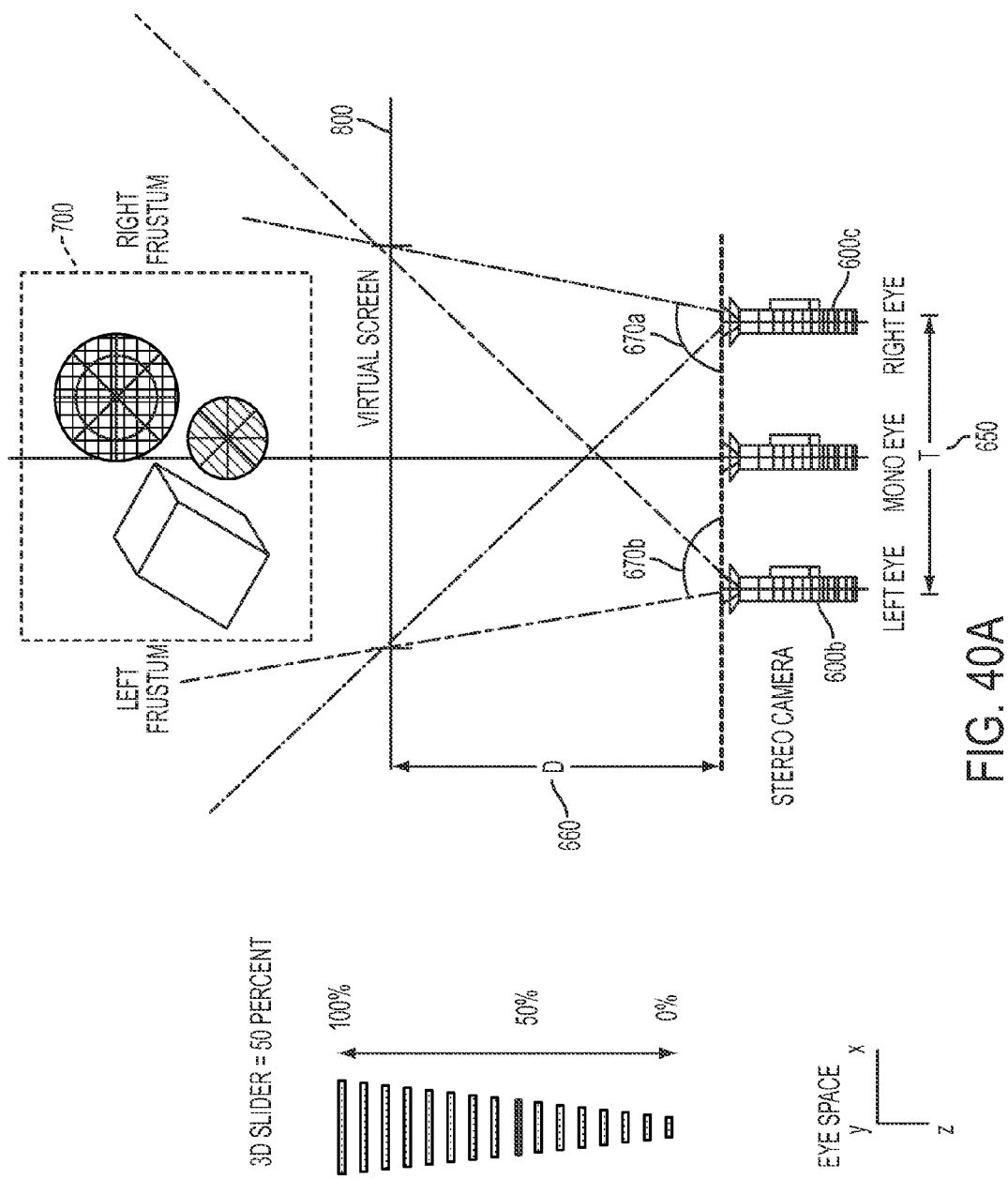

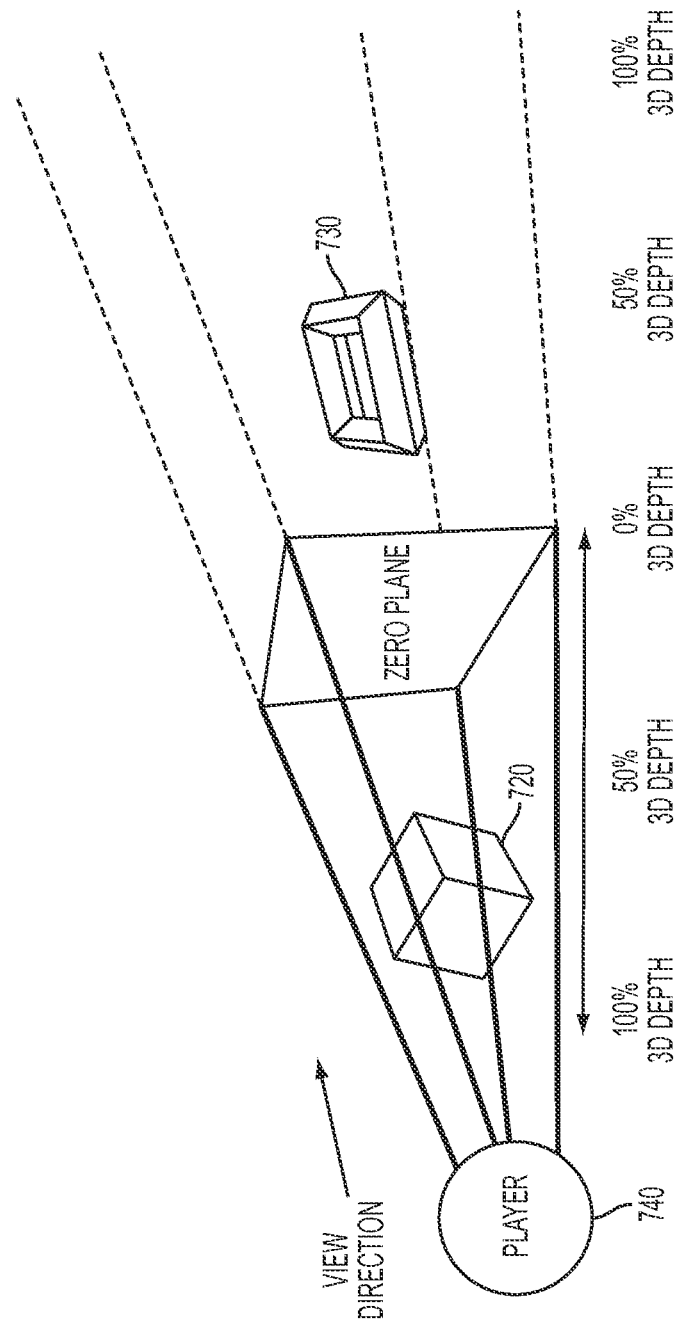

3D ENHANCED GAMING MACHINE WITH SELECTABLE 3D INTENSITY LEVEL

TECHNICAL FIELD

This disclosure relates to electronic gaming systems, such as on-line gaming systems and gaming systems in casinos. More particularly, this disclosure relates to electronic gaming machines enhanced to provide three-dimensional game components.

INTRODUCTION

Various video gaming systems or machines are known. These may consist of slot machines, online gaming systems (that enable users to play games using computer devices, whether desktop computers, laptops, tablet computers or smart phones), computer programs for use on a computer device (including desktop computer, laptops, tablet computers of smart phones), or gaming consoles that are connectable to a display such as a television or computer screen.

Video gaming machines may be configured to enable users to play a variety of different types of games. One type of game displays a plurality of moving arrangements of gaming elements (such as reels, and symbols on reels), and one or more winning combinations are displayed using a pattern of gaming elements in an arrangement of cells (or an "array"), where each cell may include a gaming element, and where gaming elements may define winning combinations (or a "winning pattern").

Games that are based on winning patterns may be referred to as "pattern games" in this disclosure.

One example of a pattern game is a game that includes spinning reels, where a user wagers on one or more lines, activates the game, and the spinning reels are stopped to show one or more patterns in an array. The game rules may define one or more winning patterns of gaming elements, and these winning patterns may be associated with credits, points or the equivalent.

Gaming systems or machines of this type are popular, however, there is a need to compete for the attention of users, and therefore it is necessary to innovate by launching new, engaging game features.

SUMMARY

In one aspect of the invention, an electronic gaming machine for stereoscopic display of game components is provided, the machine may include: at least one processor; memory storing processor-executable instructions in communication with the at least one processor; a stereoscopic display; wherein executing the processor-executable instructions by the at least one processor causes the at least one processor to:
  identify, for display, at least one game component in accordance with a set of game rules for a given game;
  select a three-dimensional intensity level for displaying the at least one game component;
  render left and right eye images based on the selected three-dimensional intensity level; and
  provide the rendered left and right eye images to the stereoscopic display, for presentation to the left and right eyes, respectively, of a player.

In another aspect, the rendering may include: determining, based on the selected three-dimensional intensity level, an interaxial distance between a left virtual camera and a right virtual camera; disposing left and right virtual cameras such that they are separated by the determined interaxial distance; and rendering the left and right eye image from the respective perspectives of the left and right virtual cameras.

In yet another aspect, the rendering may include: constructing a three-dimensional scene comprising at least one three-dimensional object representative of the at least one game component; and rendering the left and right eye images each as a perspective projection of the constructed three-dimensional scene.

In still another aspect, the stereoscopic display may be at least one of a polarized display, an anaglyphic display, an autostereoscopic display, and a virtual reality head-mounted display.

In one aspect, the selecting may include receiving a user input indicating the selected three-dimensional intensity level.

In another aspect, the selecting may include selecting the three-dimensional intensity level in accordance with the set of game rules.

In still another aspect, the selecting may include increasing the three-dimensional intensity level when the player wins the given game, wins a round of the given game, obtains points exceeding a pre-defined threshold, or activates a bonus game.

In one aspect, executing the processor-executable instructions by the at least one processor may further cause the at least one processor to activate user selection of the three-dimensional intensity level.

In another aspect, user selection of the three-dimensional intensity level may be activated when the player wins the given game, wins a round of the given game, obtains points exceeding a pre-defined threshold, or activates a bonus game.

In yet another aspect, the machine may be configured to transition between at least a monoscopic rendering mode and a stereoscopic rendering mode.

In still another aspect, the machine may be configured to transition to the monoscopic rendering mode when the selected three-dimensional intensity level is less than a pre-defined threshold.

In another aspect, the machine may be configured to transition to the stereoscopic rendering mode when the selected three-dimensional intensity level exceeds a pre-defined threshold.

In one aspect, an electronic gaming system for stereoscopic display of game components is provided, the system may include: a server comprising a transmitter for transmitting electronic data signals representing game data; an electronic device comprising: at least one processor; memory storing processor-executable instructions in communication with the at least one processor; a stereoscopic display; at least one receiver to receive the game data for storage in the memory; and a network configured to provide a communication link to couple the server and the electronic device; wherein executing the processor-executable instructions by the at least one processor causes the at least one processor to:
  identify, for display, at least one game component in accordance with a set of game rules for a given game;
  select a three-dimensional intensity level for displaying the at least one game component;
  render left and right eye images based on the selected three-dimensional intensity level; and
  provide the rendered left and right eye images to the stereoscopic display, for presentation to the left and right eyes, respectively, of a player;

In another aspect, the electronic device is an electronic gaming terminal and the system further comprises: a mobile gaming device operated by a player coupled via a communications link to the electronic gaming terminal, the mobile gaming device running a remote gaming program to play the given game, the electronic gaming terminal programmed to carry out at least the game functions of pseudo-randomly determining a game outcome and determining an award to a player and receiving player control signals by the electronic gaming terminal from the mobile gaming device to initiate the given game; wherein the electronic gaming terminal is configured to carry out the given game by the electronic gaming terminal, including determining a final outcome of the given game and any award for the outcome and transmitting electronic data signals to the mobile gaming device identifying the final outcome of the given game and the award.

In yet another aspect, the mobile gaming device may be a laptop computer, a tablet computer, or a mobile phone.

In still another aspect, the network may include a wireless network.

In one aspect, a computer-implemented method for displaying game components stereoscopically is provided, the method comprising: identifying, for display, at least one game component in accordance with a set of game rules for a given game; selecting a three-dimensional intensity level for displaying the at least one game component; rendering left and right eye images based on the selected three-dimensional intensity level; and providing the rendered left and right eye images to a stereoscopic display, for presentation to the left and right eyes, respectively, of a player.

In another aspect, the method may further include: determining, based on the selected three-dimensional intensity level, an interaxial distance between a left virtual camera and a right virtual camera; disposing left and right virtual cameras such that they are separated by the determined interaxial distance; and rendering the left and right eye image from the respective perspectives of the left and right virtual cameras.

In yet another aspect, the method may include: constructing a three-dimensional scene comprising at least one three-dimensional object representative of the at least one game component; and rendering the left and right eye images each as a perspective projection of the constructed three-dimensional scene.

In still another aspect, the method may include receiving a user input indicating the selected three-dimensional intensity level.

In one aspect, the method may include selecting the three-dimensional intensity level in accordance with the set of game rules.

In another aspect, the method may include: increasing the three-dimensional intensity level when the player wins the given game, wins a round of the given game, obtains points exceeding a pre-defined threshold, or activates a bonus game.

Features of the systems, devices, and methods described herein may be used in various combinations, and may also be used for the system and computer-readable storage medium in various combinations.

In this specification, the term "game component" or game element is intended to mean any individual element which when grouped with other elements will form a layout for a game. For example, in card games such as poker, blackjack, and gin rummy, the game components may be the cards that form the player's hand and/or the dealer's hand, and cards that are drawn to further advance the game. In a traditional Bingo game, the game components may be the numbers printed on a 5×5 matrix which the players must match against drawn numbers. The drawn numbers may also be game components. In a spinning reel game, each reel may be made up of one or more game components. Each game component may be represented by a symbol of a given image, number, shape, color, theme, etc. Like symbols are of a same image, number, shape, color, theme, etc. Other embodiments for game components will be readily understood by those skilled in the art.

BRIEF DESCRIPTION OF THE DRAWINGS

Further features and advantages of embodiments described herein may become apparent from the following detailed description, taken in combination with the appended drawings, in which:

FIG. 2b is an exemplary online implementation of a computer system and online gaming system;

FIGS. 5a and 5b are top down views of exemplary spinning reels with mirrored configurations using reel stacking;

FIG. 32 shows an example three-dimensional game enhancement that relates to physics effects.

FIG. 33 shows another example three-dimensional game enhancement that relates to physics effects.

FIG. 34 shows another example of symbols, items or gaming components associated with different virtual weights, so the symbols or gaming components react differently to a virtual gravity effect.

FIG. 36 shows a three-dimensional game enhancement with stacks of symbols or gaming components.

FIGS. 38a-38c are schematic diagrams that show monoscopic rendering of the three-dimensional scene of FIG. 37 from the perspective of one virtual camera.

FIGS. 39c and 39d illustrate example stereoscopic images as rendered from the perspective of the two virtual cameras of FIG. 39a and FIG. 39b.

FIGS. 40a and 40b are schematic diagrams that show adjustment of interaxial distances T between the two virtual cameras of FIGS. 39a and 39b based on selected three-dimensional intensity levels.

FIGS. 41a and 41b are schematic diagram that show the effect varying three-dimensional intensity levels on rendering.

It will be noted that throughout the appended drawings, like features are identified by like reference numerals.

DETAILED DESCRIPTION

Figure 1:
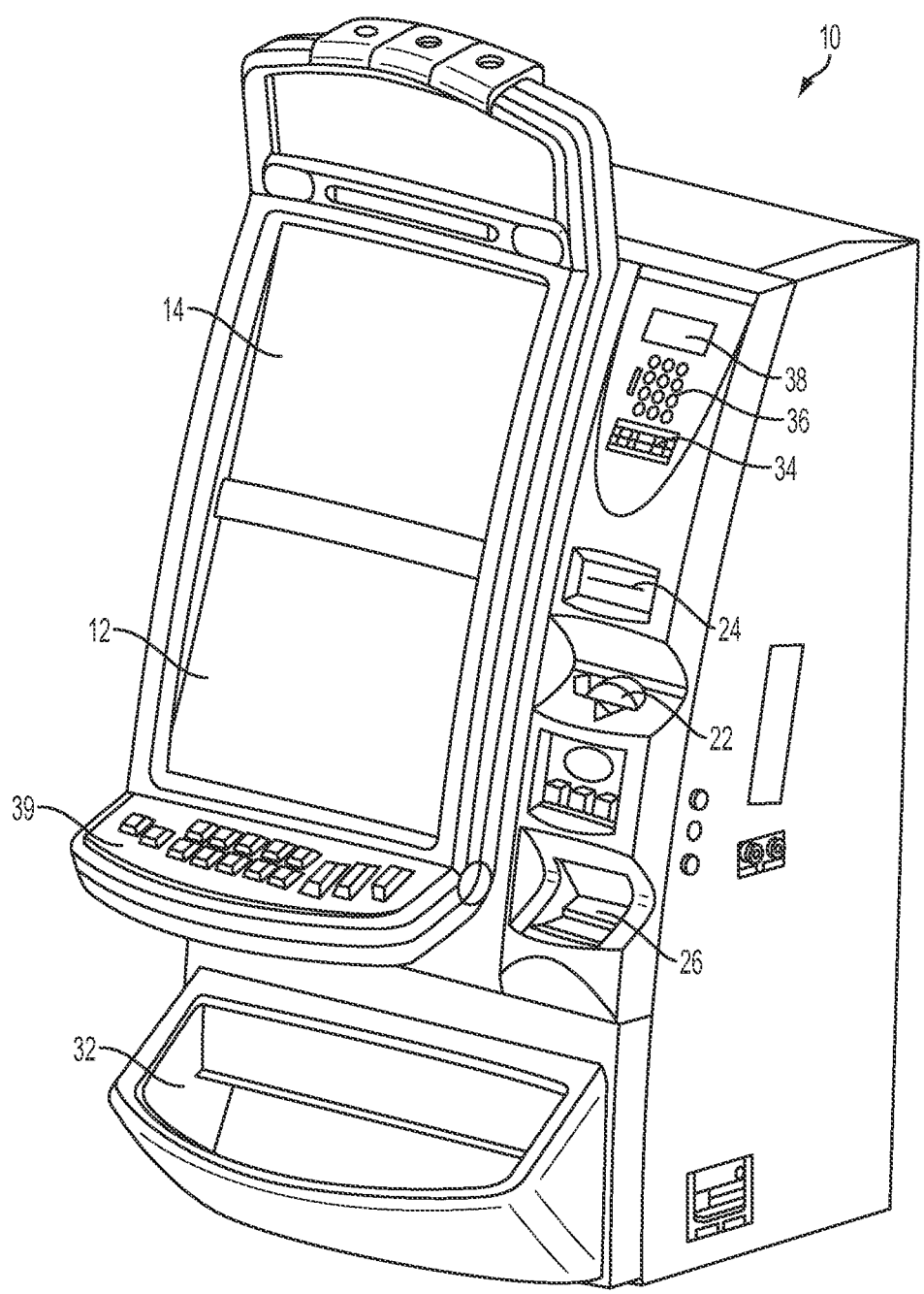
FIG. 1 is a perspective view of an electronic gaming machine for implementing the gaming enhancements, in accordance with one embodiment.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, gaming machine, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may transform electronic signals of various data objects into three dimensional representations for display on a tangible screen configured for three dimensional displays. One should appreciate that the systems and methods described herein involve interconnected networks of hardware devices configured to receive data using receivers, transmit data using transmitters, and transform electronic data signals for various three dimensional enhancements using particularly configured processors, where the three dimensional enhancements are for subsequent display on three dimensional adapted display screens.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The gaming enhancements described herein may be carried out using any type of computer, including portable devices, such as smart phones, that can access a gaming site or a portal (which may access a plurality of gaming sites) via the internet or other communication path (e.g., a LAN or WAN). Embodiments described herein can also be carried out using an electronic gaming machine (EGM) in various venues, such as a casino. One example type of EGM is described with respect to FIG. 1.

FIG. 1 is a perspective view of an EGM 10 where the three-dimensional enhancements to game components may be provided. EGM 10 includes a display 12 that may be a thin film transistor (TFT) display, a liquid crystal display (LCD), a cathode ray tube (CRT), autostereoscopic three dimensional displays and LED display, an OLED display, or any other type of display. A second display 14 provides game data or other information in addition to display 12. Display 14 may provide static information, such as an advertisement for the game, the rules of the game, pay tables, pay lines, or other information, or may even display the main game or a bonus game along with display 12. Alternatively, the area for display 14 may be a display glass for conveying information about the game. Display 12/14 may also include a camera.

Display 12 or 14 may have a touch screen lamination that includes a transparent grid of conductors. Touching the screen may change the capacitance between the conductors, and thereby the X-Y location of the touch may be determined. The processor associates this X-Y location with a function to be performed. Such touch screens may be used for slot machines. There may be an upper and lower multi-touch screen in accordance with some embodiments.

A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the gaming machine 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may accept various types of cards, such as smart cards, magnetic strip cards, or other types of cards conveying machine readable information. The card reader reads the inserted card for player and credit information for cashless gaming. The card reader may read a magnetic code on a conventional player tracking card, where the code uniquely identifies the player to the host system. The code is cross-referenced by the host system to any data related to the player, and such data may affect the games offered to the player by the gaming terminal. The card reader may also include an optical reader and printer for reading and printing coded barcodes and other information on a paper ticket. A card may also include credentials that enable the host system to access one or more accounts associated with a user. The account may be debited based on wagers by a user and credited based on a win. Alternatively, an electronic device may couple (wired or wireless) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

The keypad 36 may be an input device such as a touchscreen, or dynamic digital button panel, in accordance with some embodiments.

Player control buttons 39 may include any buttons or other controllers needed for the play of the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

In some embodiments, player control buttons 39 may include buttons that allow players to set certain parameters of EGM 10 (e.g., by increasing or decreasing those parameters according to pre-defined increments). For example, buttons 39 may include one or more buttons allowing a player to set a bet amount. Buttons 39 may also include one or more buttons allowing a player to set the value of a three-dimensional (3D) intensity level of a stereoscopic display of EGM 10.

EGM 10 may also include hardware configured to provide motion tracking (e.g., optical motion tracking) of at least one of a player's body position, head position, and eye position. EGM 10 may also include hardware configured to track changes in those positions (i.e., movements). The EGM 10 may implement head-, body- or eye-tracking using any suitable combination of camera(s), sensor(s) (e.g. optical sensor, ultrasound sensors, etc.), data receiver(s) and other electronic hardware, and conventional tracking algorithm(s).

EGM 10 may also include a body and head controller adapted to allow EGM 10 to respond to tracked head position/movements or tracked body position/movements, respectively. Similarly, EGM 10 may also include an eye controller adapted to allow EGM 10 to respond to a tracked eye position and/or eye movements.

For example, EGM 10 may track a player's body position/movements so that the player may move his/her body (e.g., from side to side) or parts of his/her body (e.g., limbs) to control aspects of the game. For example, a player may use his/her body position/movements to control or otherwise interact with a game or particular game components.

According to another example, EGM 10 may track player's eye position, so that when the eyes moves (e.g., left, right, up, or down), a cursor, a game component, a character, or a symbol on screen moves in response to the eye movements. In an example game, the player may use head/body/eye movements to avoid obstacles or to collect items. In another example game in which the player is represented by a virtual character or avatar, the movements of the virtual character or avatar may be controlled by the player's head/body/eye movements.

In some embodiments, EGM 10 may use tracked eye positions and/or eye movements to control a stereoscopic display. For example, as detailed below, EGM 10 may include a stereoscopic display configured to display stereoscopic images based on eye positions and/or eye movements. In one particular embodiment, such a stereoscopic display may divide image information into separate channels for a right eye and a left eye of a user. The channels are then displayed in interleaved segments on the screen, and a lens array is disposed to direct light from the screen such that the image information of each channel is presented towards to a corresponding left and right eye of the user. Consequently, the information in each channel visible only to the corresponding left or right eye of the user. In this way, the image information is displayed stereoscopically to a user without requiring the user to wear any headgear or glasses. Such stereoscopic displays may be referred to as autosteroscopic displays.

As described herein, EGM 10 may be configured to provide three dimensional enhancements to game components. The three dimensional enhancements may be provided dynamically as dynamic game content in response to electronic data signals relating to player input, game activity, player interactivity with display and EGM 10, and so on.

The EGM 10 may include a display with multi-touch and auto stereoscopic three-dimensional functionality, including a camera, for example. The EGM 10 may also include several effects and frame lights. The three dimensional enhancements may be three dimensional variants of gaming components. For example, the three dimensional variants may not be limited to a three dimensional version of the gaming components.

The EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu.

The EGM 10 is configurable to provide full control over all built-in functionality (lights, frame lights, sounds, and so on).

The EGM 10 may also couple to a user's mobile device to provide a tethering gaming experience. That is, EGM 10 may be configured to establish a communications link between a mobile gaming device operated by a player and EGM 10. The mobile gaming device may run a remote gaming program to play games via EGM 10, and the EGM 10 may be programmed to carry out at game functions of pseudo-randomly determining a game outcome and determining an award to a player. The EGM 10 may receive player control signals from the mobile gaming device to initiate a game. The EGM 10 may carry out the game, including determining a final outcome of the game and any award for the outcome. The EGM 10 may transmit signals to the mobile gaming device identifying the final outcome of the first game and the award. In this configuration, a player may play games provided by the EGM 10 remotely using their mobile gaming device.

That is, a wireless hand-held device, such as a tablet, may also be used to remotely play EGM 10. The EGM 10, for security and central monitoring/accounting purposes, may perform all the processing to deduct a bet from the remote player's stored bank of credits, randomly select a game outcome, determine the award to be paid to the player, and credit the player's bank of credits. The information processed by EMG 10 may be wirelessly communicated to the tablet, and the predetermined outcome may be displayed to the player (such as by displaying stopped reels). The tablet may function as a user interface and display.

The EGM 10 may also include a camera. The camera may be used for motion tracking of player, such as detecting player positions and movements, and generating signals defining x, y and z coordinates. A viewing object of the game may be illustrated as a three-dimensional enhancement coming towards the player. Another viewing object of the game may be illustrated as a three-dimensional enhancement moving away from the player. The players head position may be used as a view guide for the viewing camera during a three-dimensional enhancement. A player sitting directly in front of display 12 may see a different view than a player moving aside. The camera may also be used to detect occupancy of the machine.

The EGM 10 may also include a digital button panel. The digital button panel may include various elements such as for example, a touch display, animated buttons, frame light, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The EGM 10 may also include physical buttons.

The EGM 10 may include frame and effect lights. The lights may be synchronized with enhancements of the game. The EGM 10 may be configured to control color and brightness of lights. Additional custom animations (color cycle, blinking, etc.) may also be configured by the EGM 10. The customer animations may be triggered by certain gaming events.

Figure 2A:
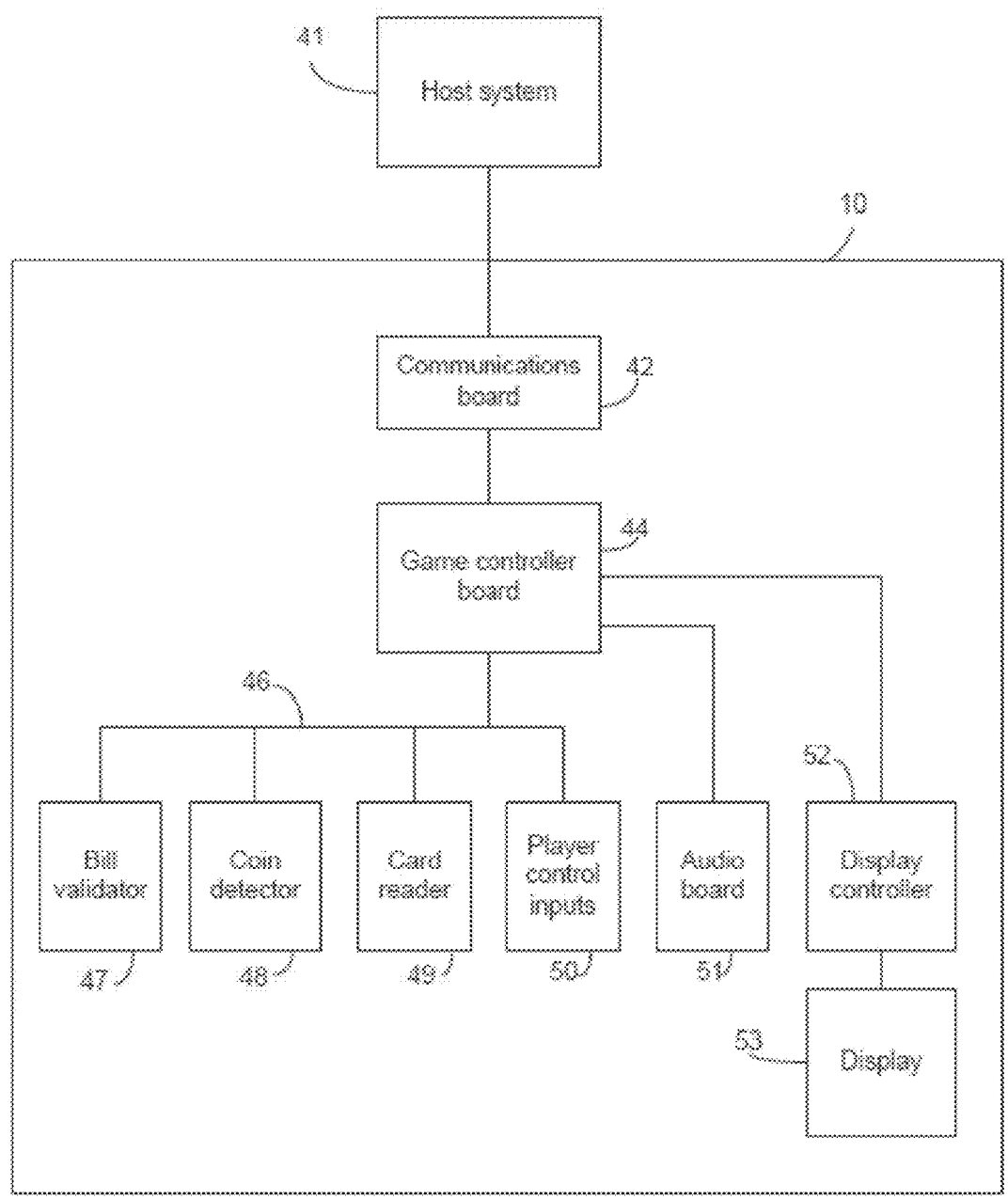
FIG. 2a is a block diagram of an electronic gaming machine linked to a casino host system, in accordance with one embodiment.

FIG. 2a is a block diagram of EGM 10 linked to the casino's host system 41. The EGM 10 may use conventional hardware. FIG. 2b illustrates a possible online implementation of a computer system and online gaming device in accordance with the present gaming enhancements. For example, a server computer 34 may be configured to enable online gaming in accordance with embodiments described herein. One or more users may use a computing device 30 that is configured to connect to the Internet 32 (or other network), and via the Internet 32 to the server computer 34 in order to access the functionality described in this disclosure.

A communications board 42 may contain conventional circuitry for coupling the EGM 10 to a local area network (LAN) or other type of network using any suitable protocol, such as the G2S protocols. Internet protocols are typically used for such communication under the G2S standard, incorporated herein by reference. The communications board 42 transmits using a wireless transmitter, or it may be directly connected to a network running throughout the casino floor. The communications board 42 basically sets up a communication link with a master controller and buffers data between the network and the game controller board 44. The communications board 42 may also communicate with a network server, such as in accordance with the G2S standard, for exchanging information to carry out embodiments described herein.

The game controller board 44 contains memory and a processor for carrying out programs stored in the memory and for providing the information requested by the network. The game controller board 44 primarily carries out the game routines.

Peripheral devices/boards communicate with the game controller board 44 via a bus 46 using, for example, an RS-232 interface. Such peripherals may include a bill validator 47, a coin detector 48, a smart card reader or other type of credit card reader 49, and player control inputs 50 (such as buttons or a touch screen).

The game controller board 44 also controls one or more devices that produce the game output including audio and video output associated with a particular game that is presented to the user. For example audio board 51 converts coded signals into analog signals for driving speakers. A display controller 52, which typically requires a high data transfer rate, converts coded signals to pixel signals for the display 53. Display controller 52 and audio board 51 may be directly connected to parallel ports on the game controller board 44. The electronics on the various boards may be combined onto a single board.

Computing device 30 may be particularly configured with hardware and software to interact with gaming machine 10 or gaming server 34 via network 32 to implement gaming functionality and render three dimensional enhancements, as described herein. For simplicity only one computing device 30 is shown but system may include one or more computing devices 30 operable by users to access remote network resources. Computing device 30 may be implemented using one or more processors and one or more data storage devices configured with database(s) or file system(s), or using multiple devices or groups of storage devices distributed over a wide geographic area and connected via a network (which may be referred to as "cloud computing").

Computing device 30 may reside on any networked computing device, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. As described herein, a computing device 30 may couple to EGM 10 to remotely play games via EGM 10. Further, in some configurations computing device 30 may operate as EGM 10, or components thereof.

Computing device 30 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Computing device 30 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device 30 may include one or more input devices, such as a keyboard, mouse, camera, touch screen and a microphone, and may also include one or more output devices such as a display screen (with three dimensional capabilities) and a speaker. Computing device 30 has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Computing device 30 is operable to register and authenticate users (using a login, unique identifier, and password for example) prior to providing access to applications, a local network, network resources, other networks and network security devices. Computing device 30 may serve one user or multiple users.

Figure 2C:
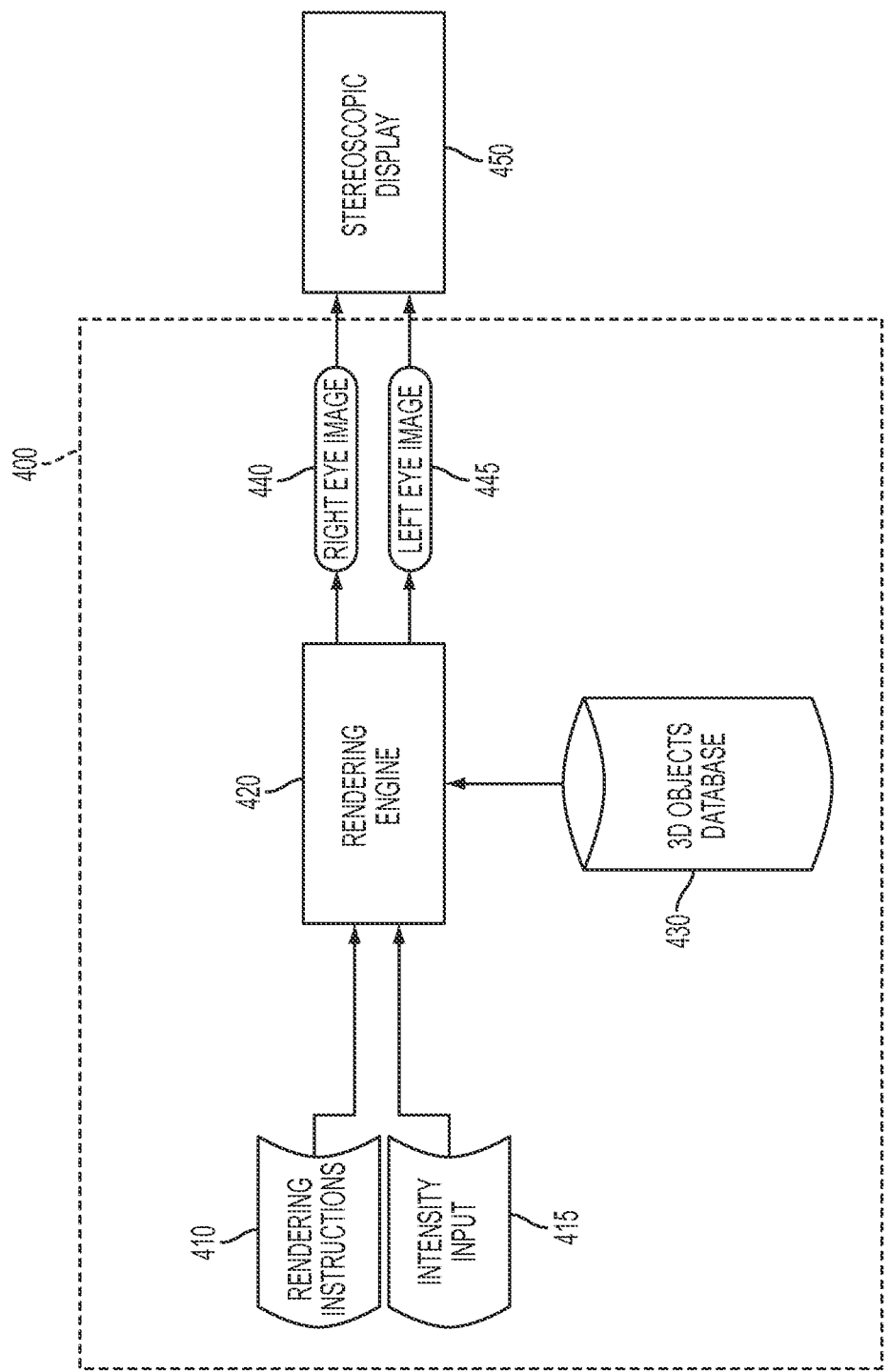
FIG. 2c is an exemplary system block diagram depicting a rendering system 400.

FIG. 2c is a high-level system block diagram depicting a stereoscopic rendering system 400 configured to render images suitable for stereoscopic or autostereoscopic display. In particular, rendering system 400 renders and provides right and right images to an interconnected stereoscopic display 450.

As depicted, system 400 may include a rendering engine 420 and a 3D object database 430. Rendering engine 420 is adapted to render two-dimensional (2D) images, for presentation by display 450 to a particular one of a user's left and right eyes. In particular, rendering engine 420 renders right eye images 440 for presentation to a user's right eye, and left eye images 445 for presentation to the user's left eye. When images 440 and 445 are presented in a suitable stereoscopic display such as display 450, they are perceived with depth (i.e., in 3D) as a result of binocular depth perception. Right eye image 440 may also be referred to as a right camera image; and left eye image 445 may also be referred to as a left camera image.

Rendering engine 420 may be part of, or connected to, game controller board 44 of EGM 10 and receive instructions therefrom. Rendering engine 420 may also receive instructions, at least in part, from user input, e.g., provided by way of buttons 39, keypad 36, or touch input from a touch-sensitive display.

As shown, instructions received by rendering engine 420 may include, for example, rendering instructions 410 and intensity input 415. Rendering engine 420 can render the aforementioned right eye images 440 and left eye images 445 in accordance with the received instructions.

Rendering instructions 410 may comprise electronic signals representing data identifying 3D objects to be rendered in a 3D scene and their respective positions and/or orientations in the 3D scene. As detailed below, one or more 3D objects may be composited to create the 3D scene.

Intensity input 415 may be a user input, or may be determined by game controller board 44 based on game rules, pre-determined settings, administrative settings, or a combination thereof.

Database 430 may be connected to rendering engine 420. Database 430 may store a library of pre-defined or pre-configured 3D objects for constructing 3D scenes of one or more games provided at EGM 10.

For example, database 430 may store 3D objects that are basic geometric shapes, e.g., spheres, cubes, cones, etc. Database 430 may also store 3D objects having more complex shapes corresponding to game components, e.g., trees, animals, buildings, etc. The 3D objects may correspond to game boards, game components, spinning wheels, background/decorative components, or parts of each of the foregoing. The 3D objects may also correspond to any of components that are subject to 3D enhancement, as detailed elsewhere in this disclosure.

Database 430 may be populated with 3D objects based on the particular games or types of games provided at EGM 10. For example, when EGM 10 provides an Egyptian-themed game, the library may be populated with 3D objects corresponding to that theme, such as pyramids, sphinxes, sarcophaguses, and so on.

In an embodiment, 3D objects may be stored in database 430 in one or more formats, such as, e.g., wireframe, polygon, skeleton, texture mapping, etc. Each 3D object may be stored in the database 430 in association with a data file storing a representation of the 3D object's shape (e.g. wireframe model) along with any colour, texture, transparency, or other graphics data. In another embodiment, each 3D object may be stored in the database 430 in association with a plurality of data files, each data file storing a representation of the 3D object's shape in a different format.

As noted, rendering engine 420 may receive rendering instructions identifying a plurality of 3D objects and their respective positions and/or orientations in a 3D scene. The position/orientation information may be expressed in terms of, for example, 3D coordinates and rotations expressed with reference to a pre-defined 3D coordinate system (e.g. x-y-z coordinate system) of rendering engine 420. Rendering engine can thereby construct a 3D scene by compositing 3D objects in accordance with the rendering instructions.

Figure 37:
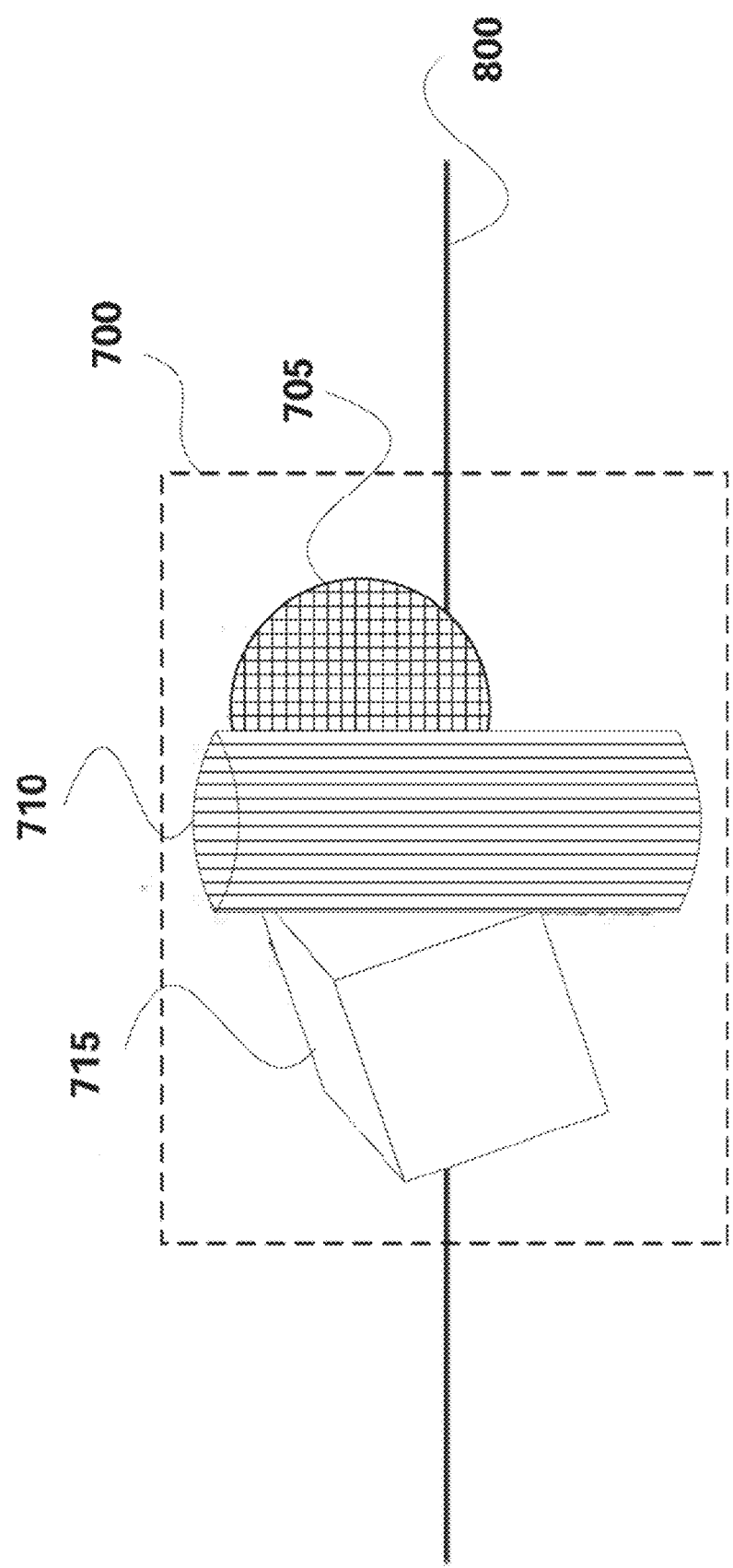
FIG. 37 illustrates an example three-dimensional scene.

FIG. 37 illustrates an example 3D scene 700, containing a plurality of 3D objects 705, 710, and 715. In this example, the shapes of the 3D objects have been simplified for clarity. As noted above, each 3D object may have a more complex shape, e.g., a sphinx, corresponding to a game element or component.

Rendering engine 420 may construct scene 700 in the following manner, exemplary of an embodiment. First, rendering engine 420 may receive rendering instructions identifying each of 3D objects 705, 710, and 715, and their positions/orientations in the 3D scene. Rendering engine 420 may then access database 430 to retrieve relevant graphics data for each of the 3D objects. Rendering engine 420 then populates 3D scene 700 by constructing the identified 3D objects based on graphics data and then placing the constructed 3D objects 705, 710, and 715 in the specified positions and orientations.

In an embodiment, rendering engine 420 may construct a data structure comprising references to each of the identified 3D objects, their positions/orientations, and associated graphics data. This data structure may be processed to render images (e.g., right eye images 440 and left eye images 445), in manners detailed below.

Figure 38B:
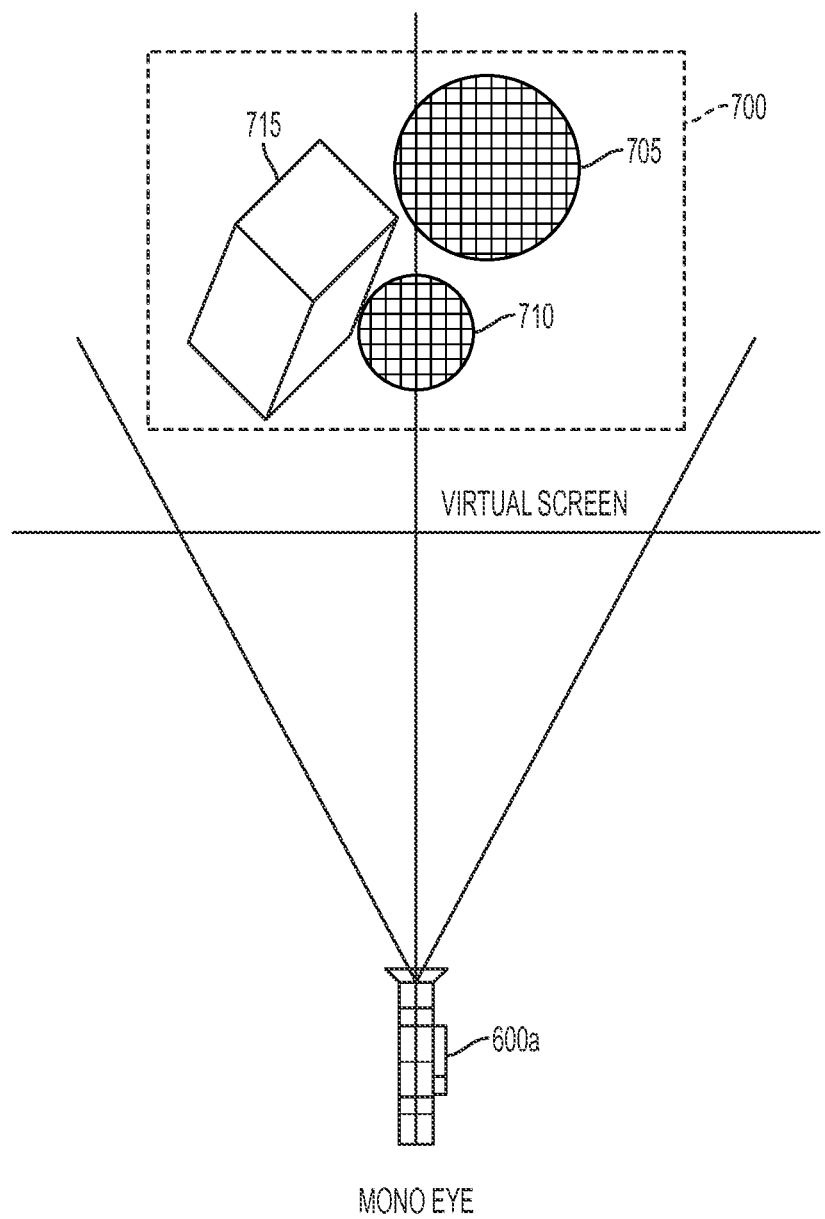
Figure 39A:
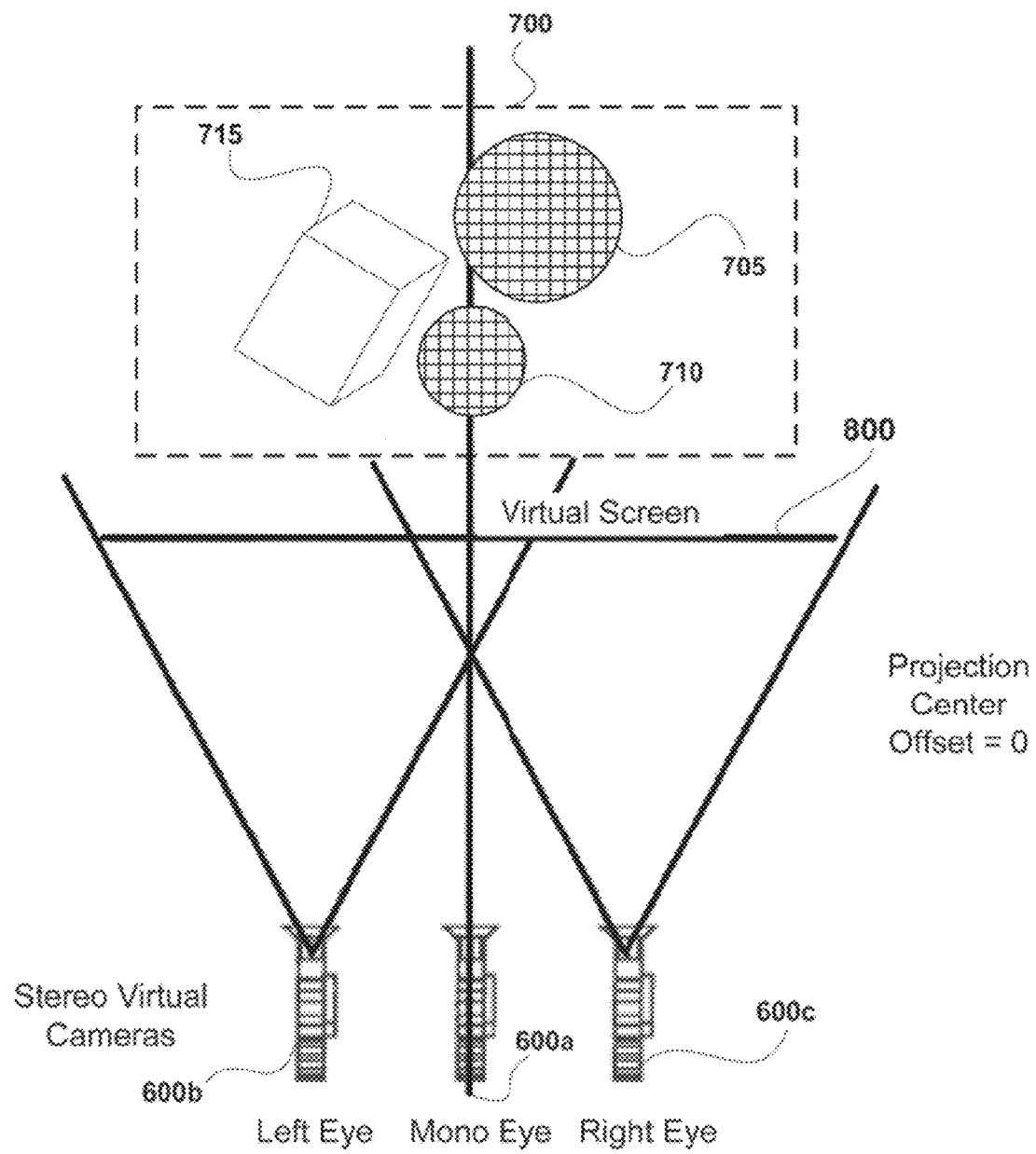
FIGS. 39a and 39b are schematic diagrams that show stereoscopic rendering of the three-dimensional scene of FIG. 37 from the perspective of two virtual cameras.
Figure 39B:
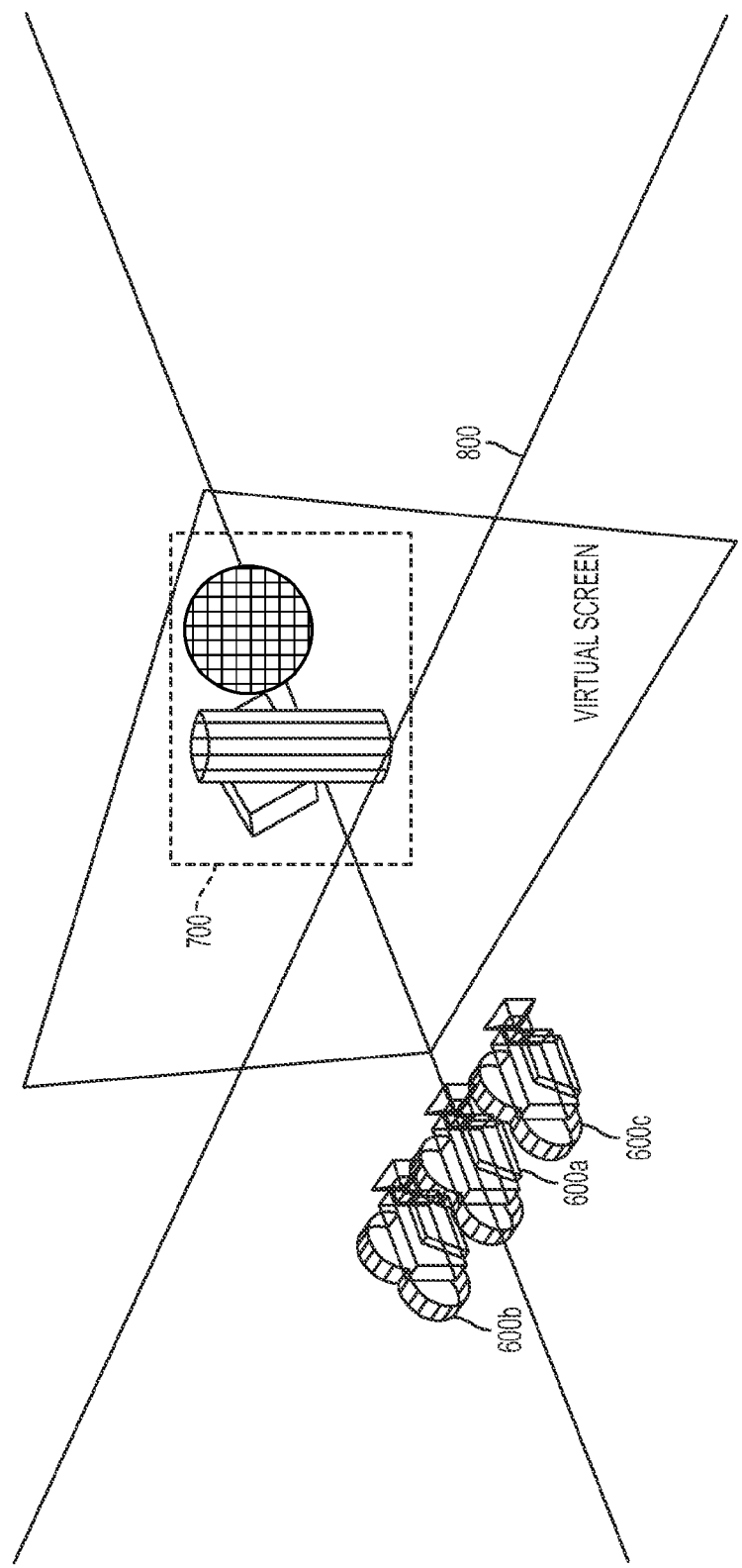
Figure 39D:
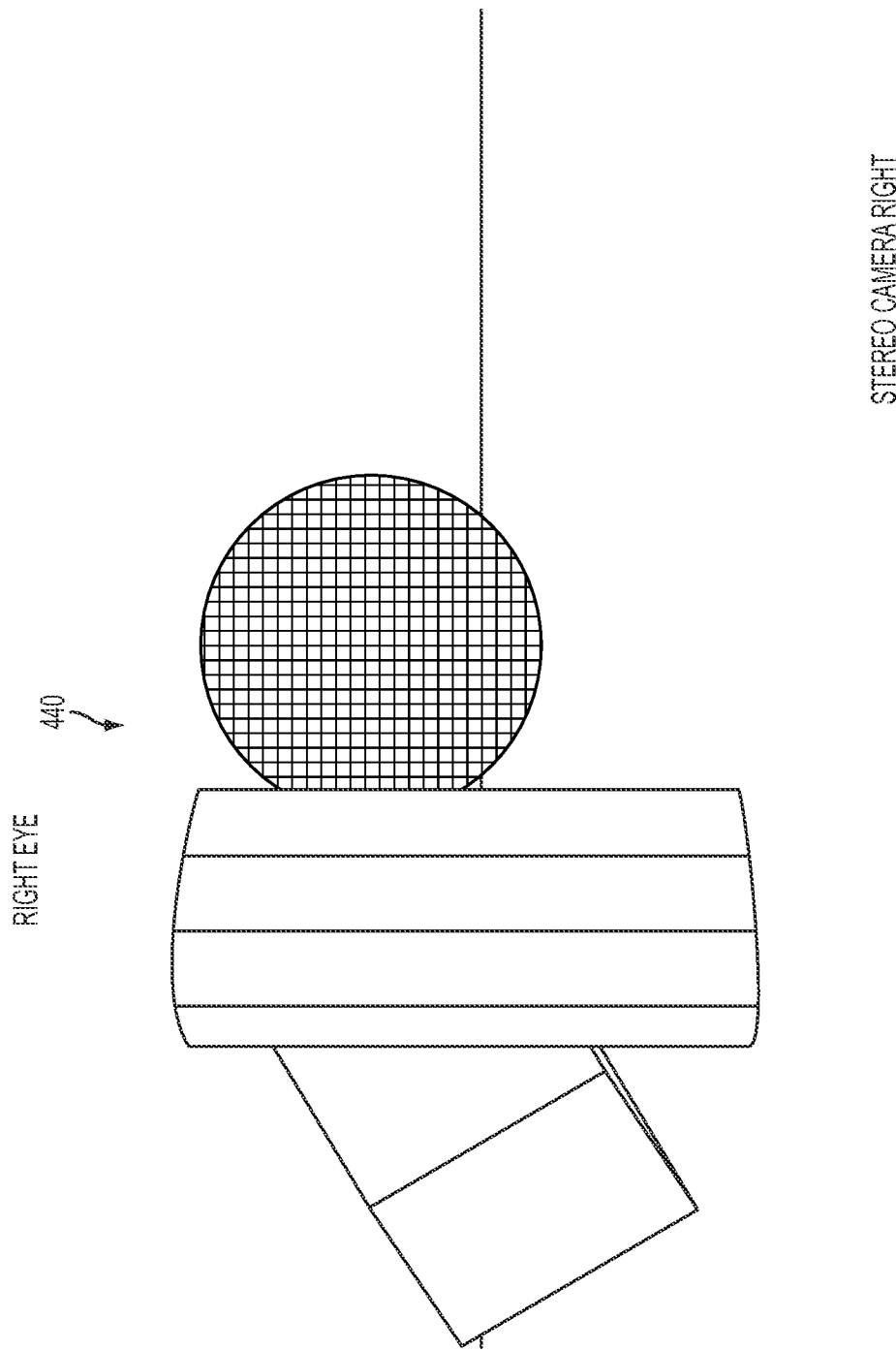

FIGS. 38a-38c are schematic diagrams that show monoscopic rendering of 3D scene 700 from the perspective of one virtual camera 600a, in a monoscopic rendering mode of rendering engine 420. Meanwhile, FIGS. 39a and 39b are schematic diagrams that show stereoscopic rendering of 3D scene 700 with two virtual cameras, namely, a left camera 600b and a right camera 600c, in a stereoscopic rendering mode of rendering engine 420.

As detailed below, rendering engine 420 may transition between a monoscopic rendering mode and a stereoscopic rendering mode, in response to a selected 3D intensity level.

When in the monoscopic rendering mode, rendering engine 420 renders each image of a 3D scene (e.g., scene 700) by performing a perspective projection of the scene onto a virtual screen 800 from the perspective of virtual camera 600a. In this mode, each rendered image may be provided to stereoscopic display 450 as right eye image 440 and left eye image 445. In such circumstance, the right eye image 440 and left eye image 445 are identical. As such, when the images are presented to a user by stereoscopic display 450, they will be viewed without a perception of depth.

When in the stereoscopic rendering mode, rendering engine 420 renders each right eye image 440 by performing a perspective projection of a 3D scene (e.g., scene 700) onto virtual screen 800 from the perspective of right camera 600c, and renders each left eye image 445 by performing a perspective projection of the scene onto virtual screen 800 from the perspective of left camera 600b. As will be detailed below, due to the separation between cameras 600b and 600c, the right eye images 440 and left eye images 445 will differ. When these images are presented to a user by stereoscopic display 450, they will be viewed with a perception of depth.

Rendering engine 420 is configured to render right eye images 440 and left eye images 445 at a 3D intensity level. This 3D intensity level may be selected by a user, game rules, or administrative settings. In an embodiment, this 3D intensity level is correlated to (e.g. proportional to) the degree of depth that is perceived by a user when the rendered images are presented by stereoscopic display 450. The degree of depth of a 3D scene may be defined as the distance between the foremost 3D object (e.g. 710 in FIG. 37) and the last 3D object (e.g. 705 in FIG. 37).

The rendering engine 420 may be configured to determine a desired intensity level based on an intensity input 415. Intensity input 415 may be provided by a user, an administrator, or by EGM 10 in accordance to game rules, as described elsewhere in this disclosure.

Figure 40B:
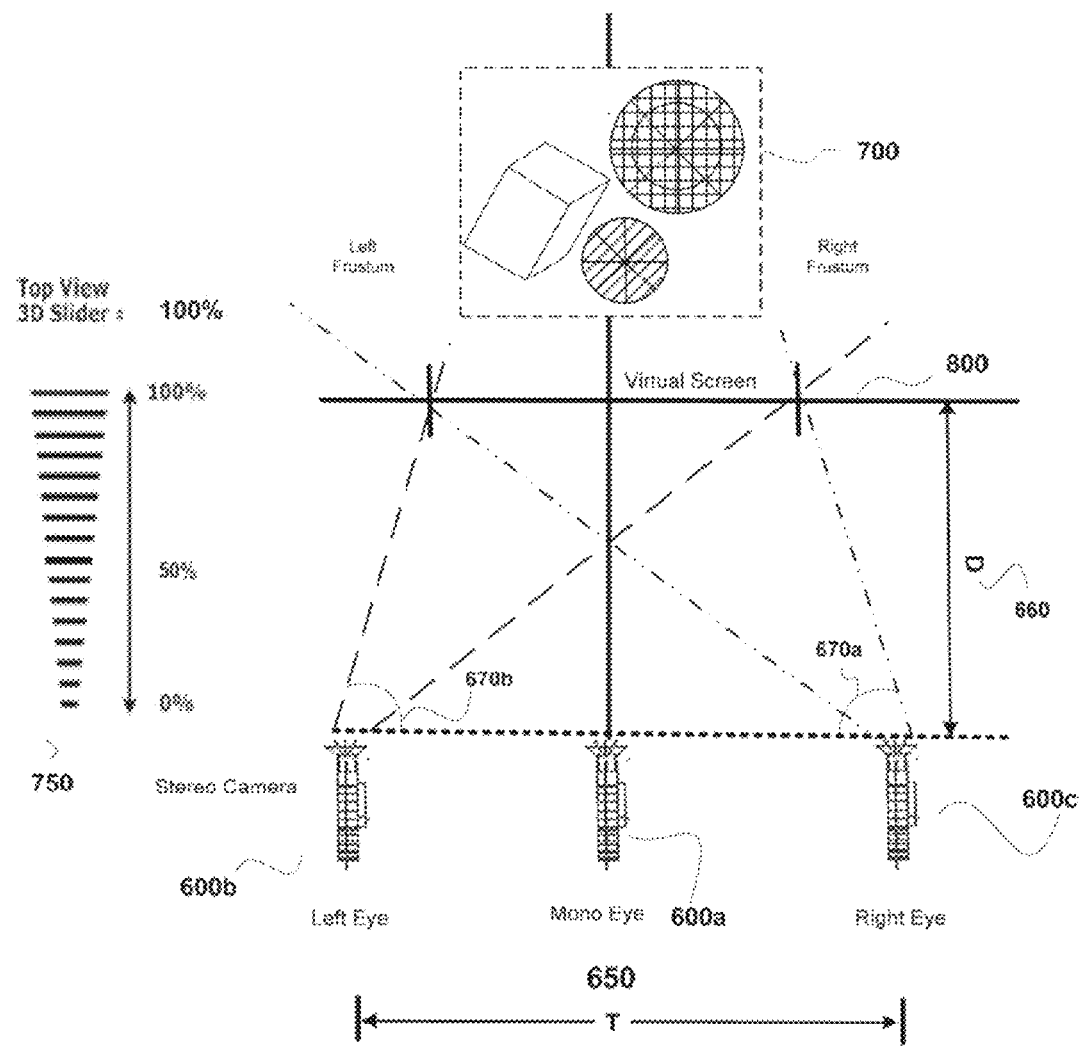

In response to determining a desired 3D intensity level, rendering engine 420 may adjust interaxial distance (or "eye separation") T 650 between virtual cameras 600b and 600c, as shown in FIGS. 40(a) and (b). Adjusting the interaxial distance T 650 between the two cameras alters the perspectives from which the right eye image 440 and left eye image 445 are rendered. Altering these perspectives causes the images to be rendered such that the desired 3D intensity level is presented to the user when the images are presented by stereoscopic display 450.

In an embodiment, the interaxial distance T 650 may be set initially to correspond to an average human interocular distance (i.e., distance between the two eyes), e.g., approximate 2.5 inches. When the interaxial distance T 650 is set to such an average value, the resulting stereoscopic effect may be referred to as "ortho-stereo". When the interaxial distance T 650 is set to be smaller than the average interocular distance, the resulting stereoscopic effect may be referred to as "hypo-stereo". On the other hand, when the interaxial distance T 650 is set to be larger than the average interocular distance, the resulting stereoscopic effect may be referred to as a "hyper-stereo".

By adjusting the interaxial distance T 650 between the two virtual cameras 600b, 600c, the degree of depth can be increased (by increasing T) or deceased (by decreasing T).

When the interaxial distance T 650 is set to zero, the two virtual cameras 600b and 600c overlap. In this case, rendering engine 420 may transition to the above-noted monoscopic rendering mode and render images using a single camera 600a. As noted, in this case, no depth will be perceived by a user viewing the images. That is, the user may simply see a 2D image. The rendering engine 420 may transition back to the above-noted stereoscopic mode when the interaxial distance T 650 is set to a value greater than zero.

When the interaxial distance T 650 between cameras 600b and 600c is adjusted, a corresponding adjustment may also be made to axial angles 670a, 670b of the two cameras. In particular, axial angles 670a and 670b may be adjusted by an inward rotation or an outward rotation of the cameras 600c and 600b, respectively. In an embodiment, axial angles 670a and 670b may be adjusted automatically to keep distance D 660 (between the cameras 600b/600c and virtual screen 800) constant. Further, by maintaining a constant distance D, the size of virtual screen 800 may also be kept constant. In an embodiment, the axial angle 670b of the left camera 600b is maintained to be the same as the axial angle 670a of the right camera 600c.

Figure 41B:
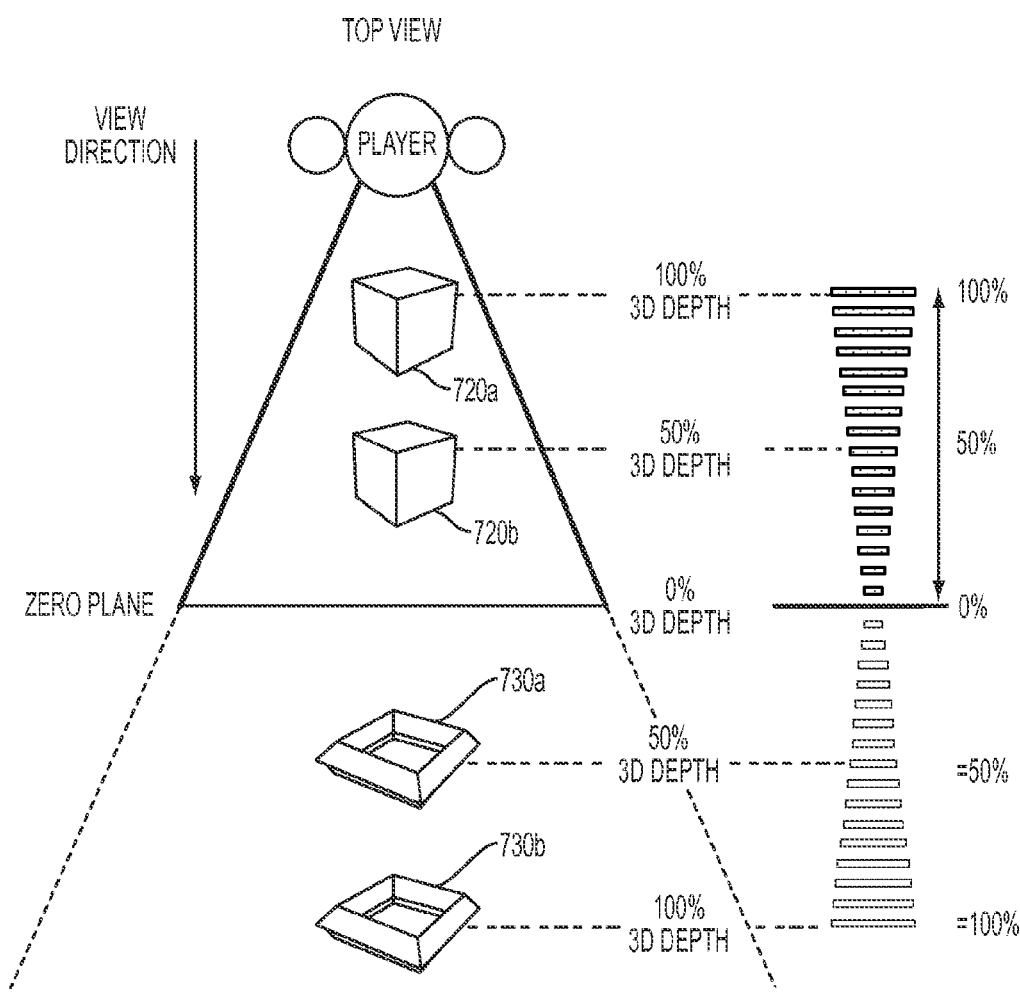

The effect of changing the degree of depth as the desired 3D intensity level is varied can be seen in FIGS. 41a and 41b. FIGS. 41a and 41b, are, respectively, a perspective view and a top view of a 3D scene as rendered and displayed to a player 740. As shown in FIG. 41a, the 3D scene may include 3D objects 720 and 730. As depicted, object 720 is positioned in front of the zero plane while object 730 is positioned behind the zero plane, where the zero plane corresponds to the plane of the display screen (e.g., of stereoscopic display 450).

FIG. 41b shows the effect of increasing the desired 3D intensity level on the degree of depth perceived by player 740. As shown, when the desired 3D intensity level is increased (e.g., from 50% to 100%), the degree of depth perceived by player 740 is increased such that objects positioned in front of the zero plane appear to move closer to player 740, and objects positioned behind the zero plane appear to move father away from player 740. So, as depicted in FIG. 41b, when the desired 3D intensity level is increased, object 720 appears at a position closer to player 740 (e.g., at position 720a rather than 720b), and object 730 appears at a position farther from player 740 (e.g., at position 730b rather than 730a).

As noted, the desired 3D intensity level may be determined from intensity input 415, which may be provided manually by a user, or automatically by EGM 10 under software control.

Figure 42:
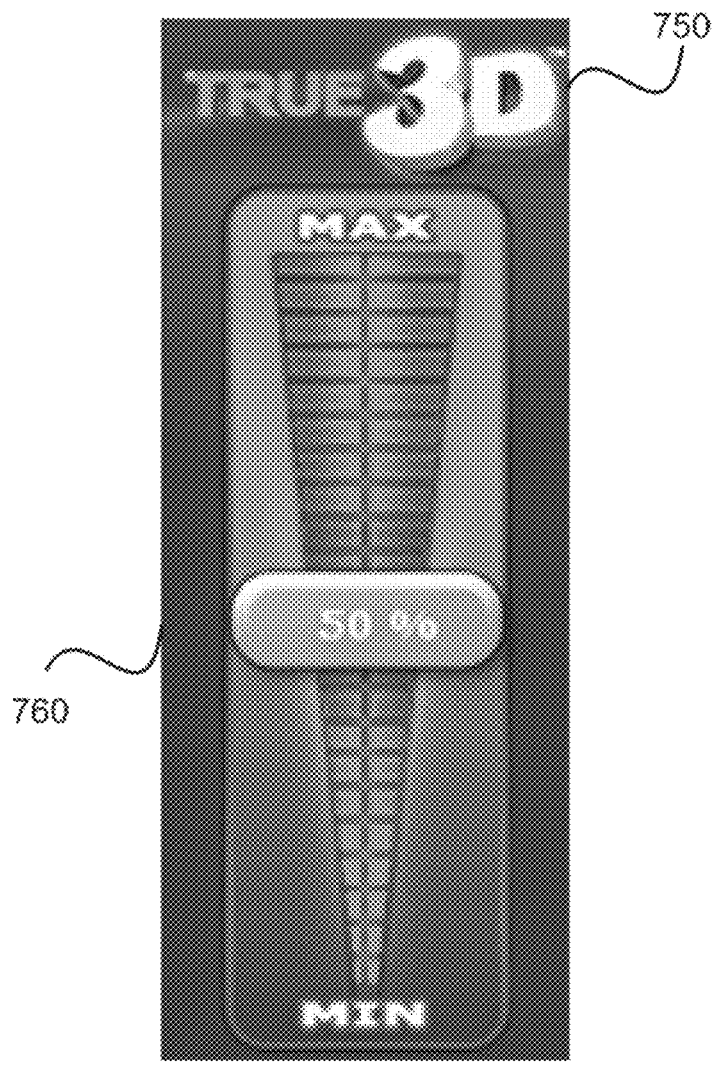
FIG. 42 illustrates an exemplary slider mechanism for display selecting three-dimensional intensity levels.

In one embodiment, intensity input 415 may be received from a player via input means of the EGM 10. For example, the player may control an onscreen slider mechanism 750 as illustrated in FIG. 42. As shown, slider mechanism 750 may be adjusted to have a value ranging from 0% to 100%. The bar 760 may indicate a selected intensity level (e.g. 50%). The user may move the bar up, e.g., via control buttons 39 on the EGM 10, in order to increase the desired intensity level, or alternatively, the user may move the bar down, e.g., via control buttons 39, in order to decrease the desired intensity level.

In some cases, user adjustment of slider mechanism 750 may be disabled such that slider mechanism 750 only displays the current 3D intensity level.

In an embodiment, a default position of the bar 760 may be set to provide a 3D intensity level of 50%. A 3D intensity level of 50% may correspond, for example, to an average human interocular distance (e.g., approximately 2.5 inches). The 3D intensity level may be reset to 50% when EGM 10 enters an idle state.

In an embodiment, a 3D intensity level of 100% (i.e., the maximum intensity level) may correspond to a pre-defined maximum human interocular distance (e.g., approximately 3.9 inches). Such a pre-defined maximum human interocular distance may be determined via experiments or scientific findings. Conversely, a 3D intensity level of 0% may correspond to a zero interocular distance, or in other words, zero interaxial distance between the two virtual cameras. As noted, rendering engine 420 may operate in monoscopic rendering mode when the interaxial distance T 650 is zero.

The slider mechanism 750 may be substituted with any other appropriate user input means, e.g., a dial, a numeric pad, or the like.

In another embodiment of the invention, the 3D intensity level may be automatically determined by game controller board 44 or by a system administrator.

As noted, stereoscopic display 450 may be configured to receive a right camera image 440 and a left camera image 445, and present the images to the user. In particular, stereoscopic display 450 is configured to present the right camera image 440 onto the right eye of the user, while presenting the left camera image 445 onto the left eye of the user.

In an embodiment, stereoscopic display 450 may be a conventional polarized display. In particular, display 450 may comprise a projector configured to present each of the camera images 440 and 445 through polarized filters. For example, right eye image 440 may be presented through a first filter that polarizes light in a first direction, and left eye image 445 may be presented through a second filter that polarizes light in a second direction. A user wearing glasses having filters corresponding to the first and second filters such that the user's right eye sees right image 440, and the user's left eye sees left eye image 445. In this way, a perception of depth is provided to the user.

In another embodiment, stereoscopic display 450 may be a conventional anaglyphic display that presents right eye and left eye images 440,445 through red and green filters, to be viewed by a user wearing glasses having corresponding red and green filters.

In yet another embodiment, stereoscopic display 450 may be an autostereoscopic display, as detailed in U.S. Pat. No. 8,441,522, the content of which is entirely incorporated herein by reference. Such an autostereoscopic display may for example, be a Seefront™ display provided by SeeFront GmbH (Germany).

As noted above, such a display may divide image information into separate channels for a right eye and a left eye of a user. The channels are then displayed in interleaved segments on the screen, and a lens array is disposed to direct light from the screen such that the image information of each channel is presented towards to the corresponding left and right eye position to be visible only to the corresponding left or right eye. The position of the user's left/right eyes may be determined by tracking the position/movement the eyes.

In a further embodiment, stereoscopic display 450 may be a conventional virtual reality head-mounted display, such as, e.g., an Oculus Rift™ device provided by Oculus VR (California, United States). In such an embodiment, EGM 10 may be implemented as a mobile device interconnected to the virtual reality head-mounted display. The mobile device may be carried or worn by the user during operation, e.g., when the user is playing a game.

Figure 3A:
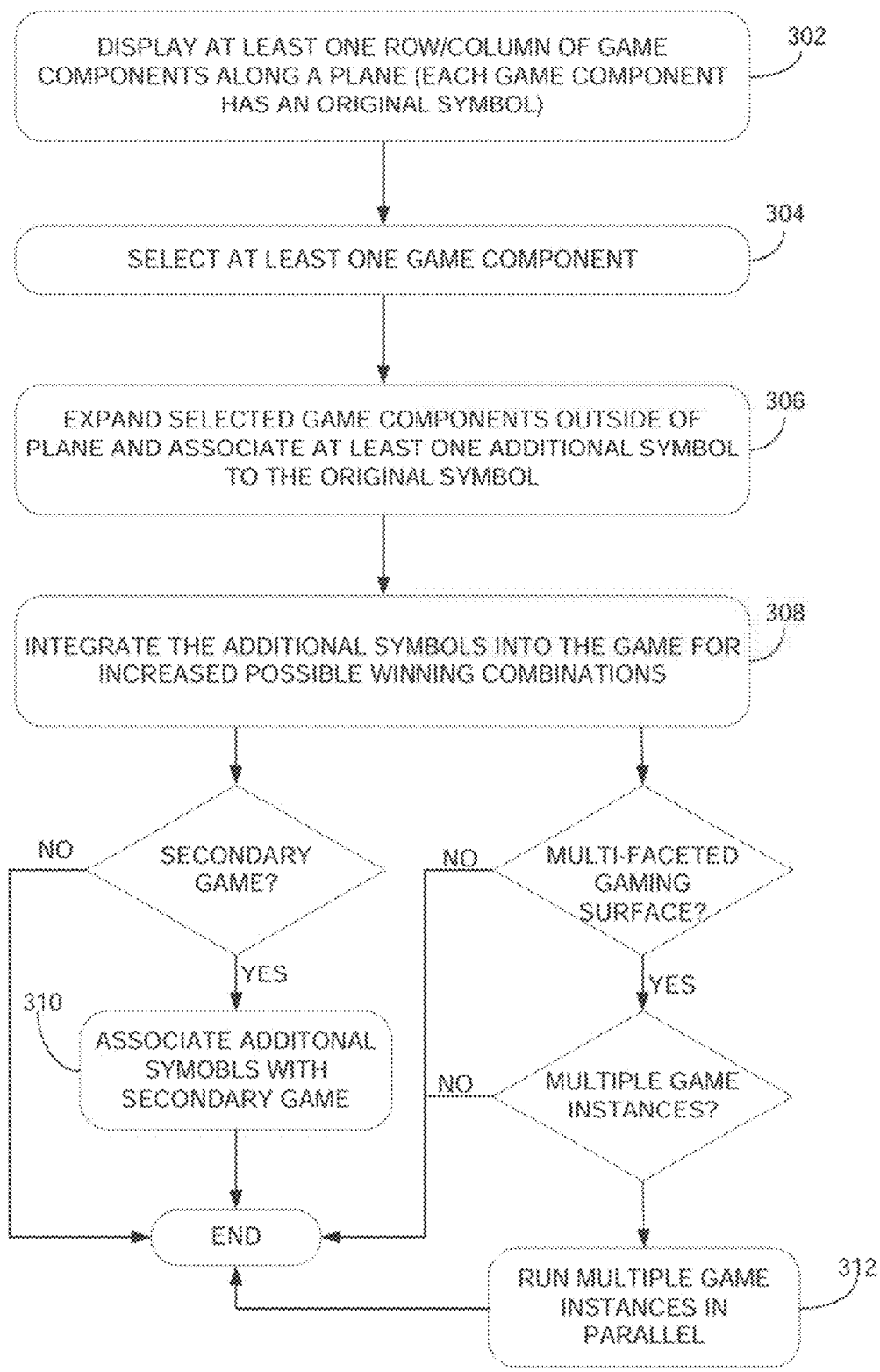
FIG. 3a is a flowchart of an exemplary computer-implemented method for the game component enhancements.

FIG. 3A is a flowchart illustrating an exemplary embodiment for a computer-implemented method for enhancing game components in a gaming system such as that illustrated in FIGS. 1, 2a, and 2b. In a step 302, at least one row and/or column of game components are displayed on a display device, such as display devices 12, 14, along a plane, referred to herein as the gaming plane, in accordance with a gaming configuration for a given game. The row/column may be made up of two or more game components, depending on the game being played. Each game component has a given symbol associated thereto, which may be referred to herein as an original symbol as it represents the game component before any enhancements are provided.

At 304, at least one game component is selected for enhancement from the plurality of game components displayed. The gaming component may be selected by the player or by the game. For example, the game outcome or state may determine which symbol to select for enhancement.

At 306, each selected game component is enhanced by expanding it outside of the gaming plane in which the original symbol was displayed, and at least one additional symbol is associated to the original symbol to form the enhanced game component. For example, the enhancement may be a three-dimensional enhancement where the selected game symbol is expanded in a third dimension. That is, EGM 10 may be configured to transform a selected game components by generating a three-dimensional variation for display on a display device. The transformation results in a different display of electronic data signals.

At 308, the additional symbols may be integrated into the game for increased possible winning combinations, as will be described in more detail herein.

In some embodiments, at 310, a secondary game is provided in addition to the primary or given game and the additional symbol may be associated with the secondary game in accordance with different gaming strategies and/or configurations.

The enhanced gaming components may be displayed as a three dimensional variant of the original symbol. For example, three dimensional enhancement of the enhanced gaming component may not be limited to a three dimensional version of the gaming component. The enhanced gaming component may also be enhanced by associating it with multiple gaming components, where each may be used independently to calculate winning combinations for a given game.

In some embodiments, expansion of the selected game components outside of the gaming plane results in a multi-faceted gaming surface. The multi-faceted gaming surface allows multiple gaming instances to be run in parallel, at 312, if desired. Alternatively, a single gaming instance may be run on the multi-faceted gaming surface.

Figure 3B:
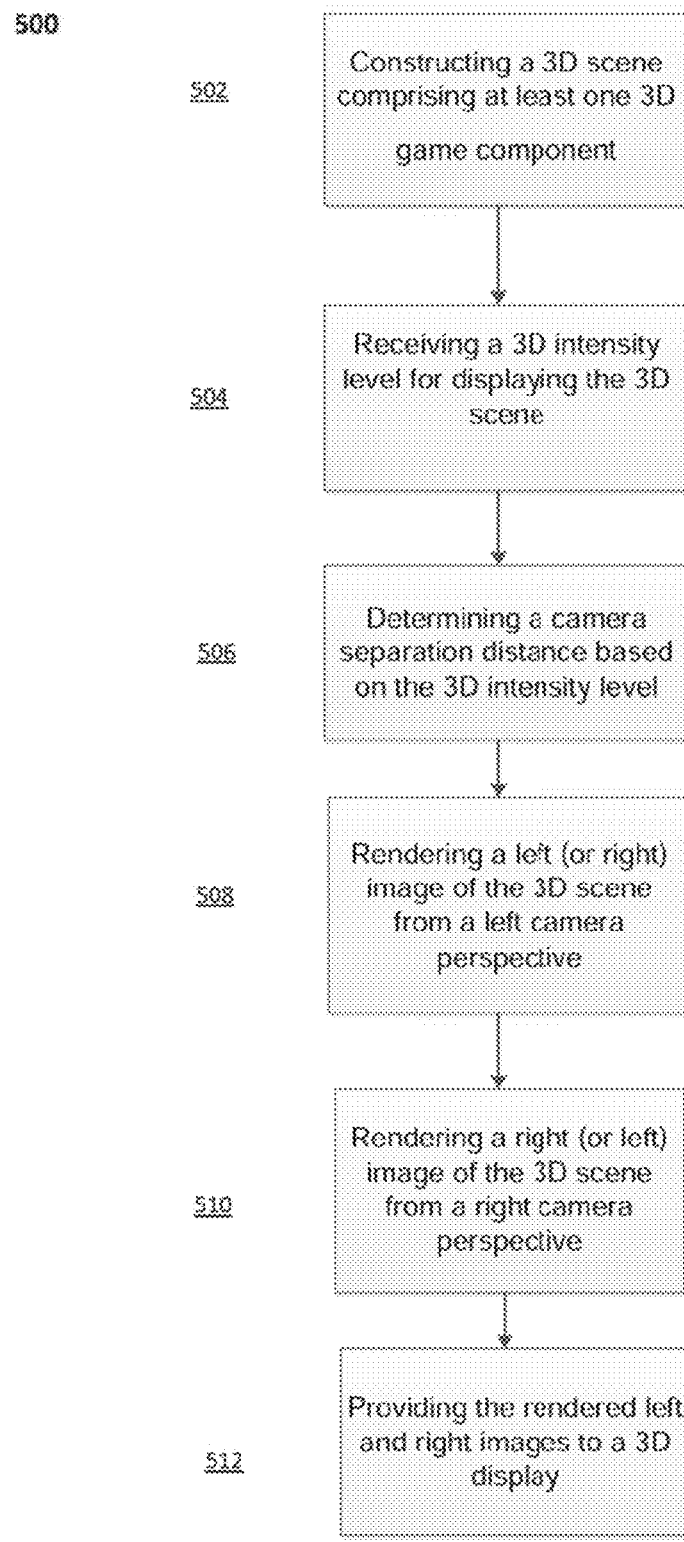
FIG. 3b illustrates a flow chart of an exemplary computer-implemented method 500 for rendering three-dimensional game components.

Referring now to FIG. 3B, there is shown a flowchart of an exemplary computer-implemented method 500 performed by rendering system 400 to render images suitable for stereoscopic display.

At step 502, rendering engine 420 receives 3D rendering instructions 415 and constructs a 3D scene 700 comprising one or more 3D objects 705, 710, 715, where the one or more 3D objects 705, 710, 715 may represent one or more elements or game components of a 3D enhanced game.

At step 504, rendering engine 420 receives or otherwise determine a selected 3D intensity level (or simply "intensity level"), and at step 506 subsequently determine an interaxial distance 650 between left and right virtual cameras 600b, 600c based on the selected 3D intensity level. The positions of the left and right virtual cameras 600b and 600c are adjusted such that the two cameras are separated by the determined interaxial distance.

At step 508, rendering engine 420 renders a left camera image 445 from a perspective of the left virtual camera 600b.

At step 510, rendering engine 420 renders a right camera image 440 from a perspective of the right virtual camera 600c.

As will be appreciated, rendering engine 420 may render the two images in the opposite order, or in parallel (e.g., using multiple rendering processors).

At step 512, rendering engine 420 provides the rendered left eye image 445 and the rendered right eye image 440 to stereoscopic display 450. Stereoscopic display 450 presents the two images to the respective left and right eyes of user 740 such that the user 740 perceives the 3D scene at the selected 3D intensity level.

FIGS. 43a-43g, 44a-44e, 45a-45e, 46a-46g, and 47a-47g illustrate exemplary 3D scenes comprising 3D game components, displayed at varying 3D intensity levels.

Figure 43A:
FIGS. 43a-43g, 44a-44e, 45a-45e, 46a-46g, and 47a-47g illustrate example 3D scenes rendered at varying three-dimensional intensity levels.
Figure 43B:
Figure 43C:
Figure 43D:
Figure 43E:
Figure 43F:
Figure 43G:
Figure 44A:
Figure 44B:
Figure 44C:
Figure 44D:
Figure 44E:
Figure 45A:
Figure 45B:
Figure 45C:
Figure 45D:
Figure 45E:
Figure 46A:
Figure 46B:
Figure 46C:
Figure 46D:
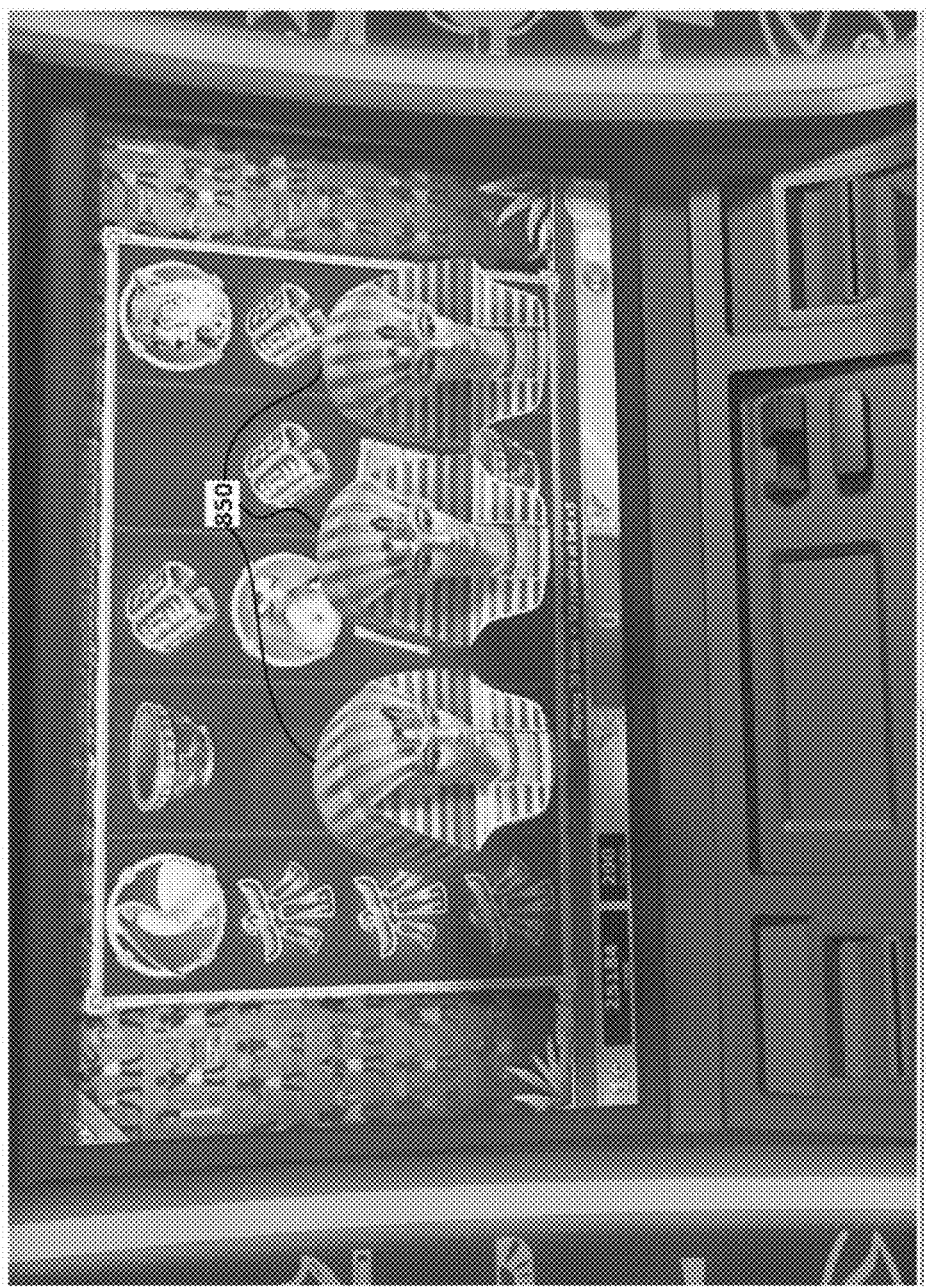
Figure 46E:
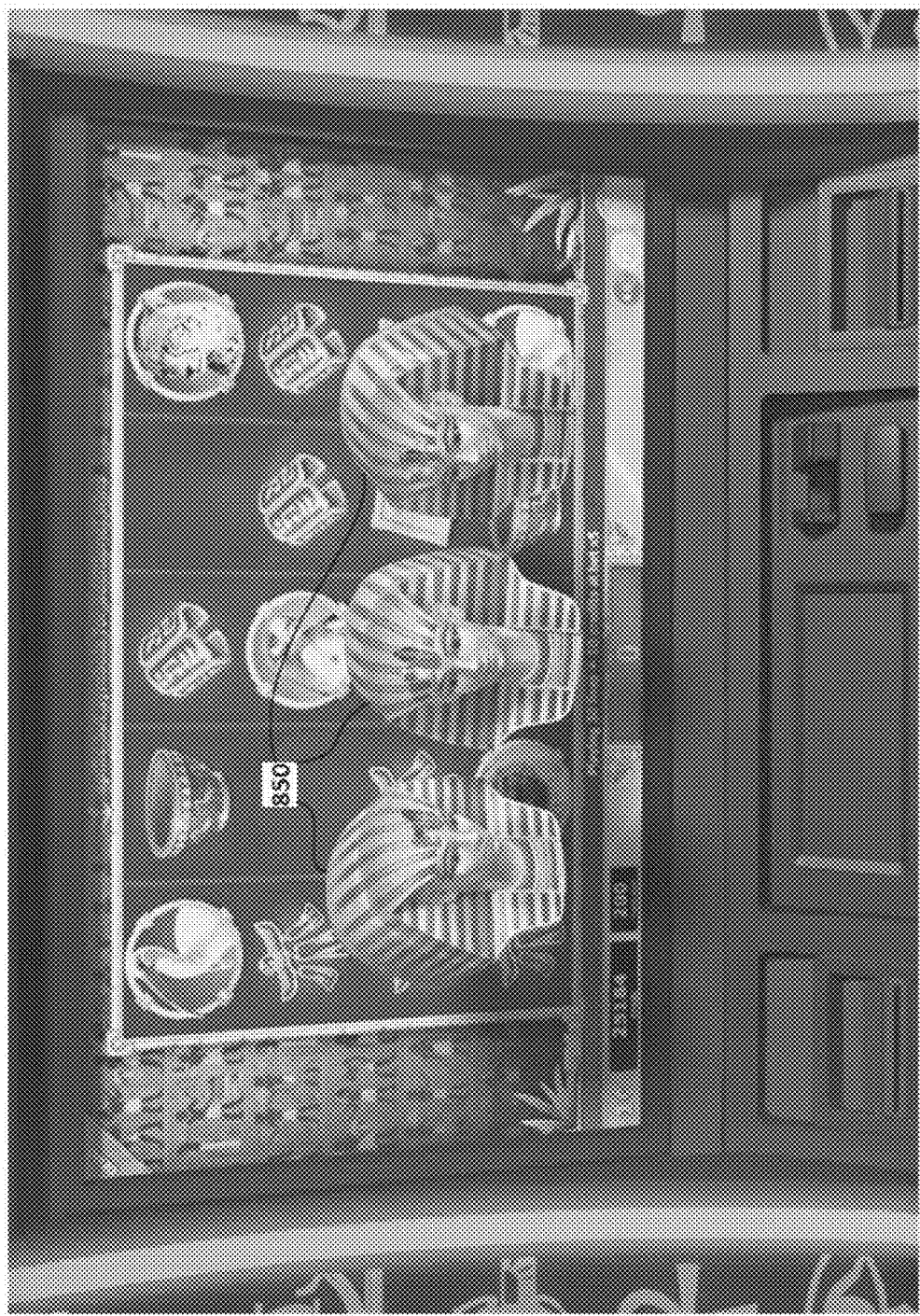
Figure 46F:
Figure 46G:
Figure 47A:
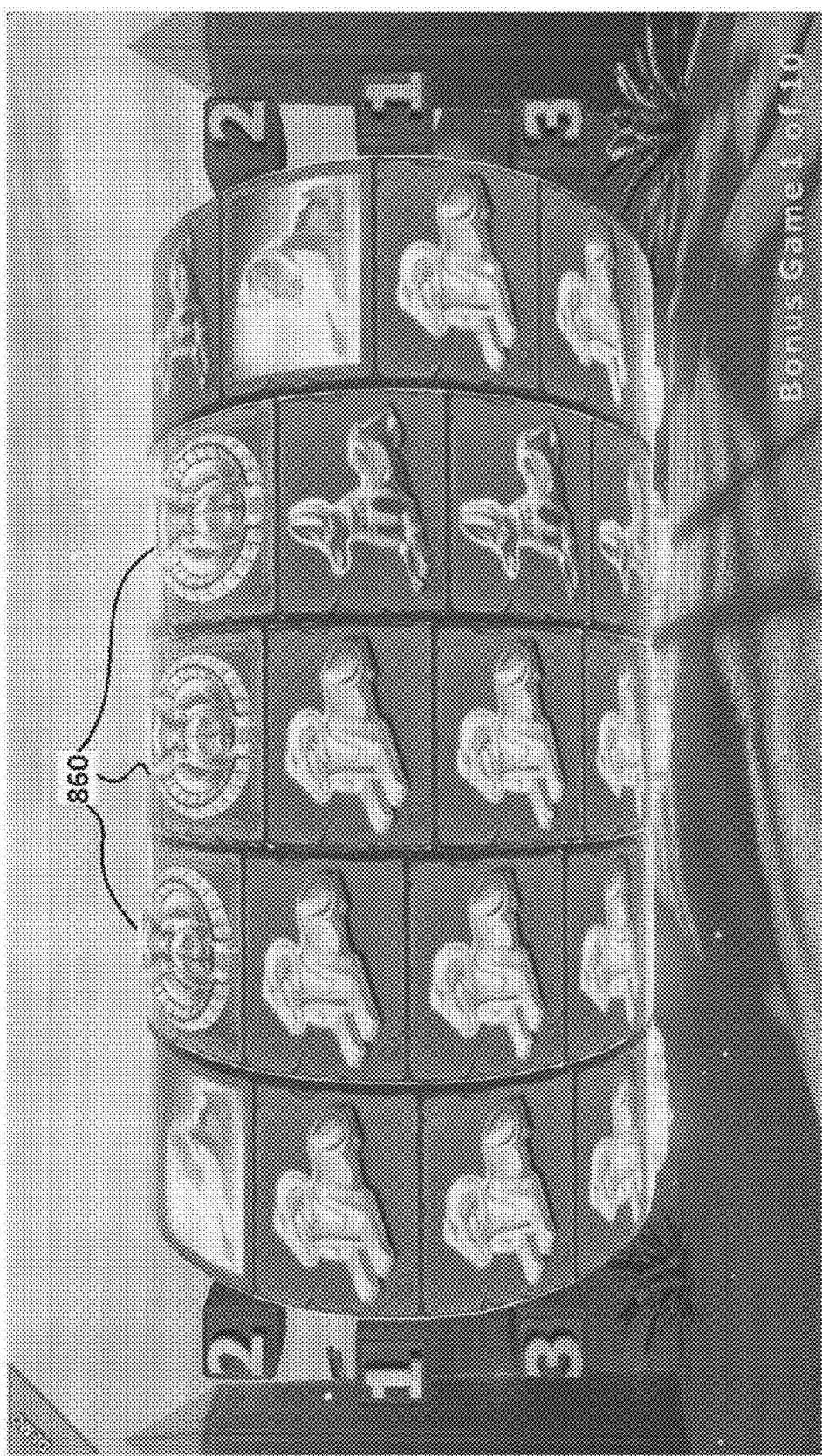
Figure 47B:
Figure 47C:
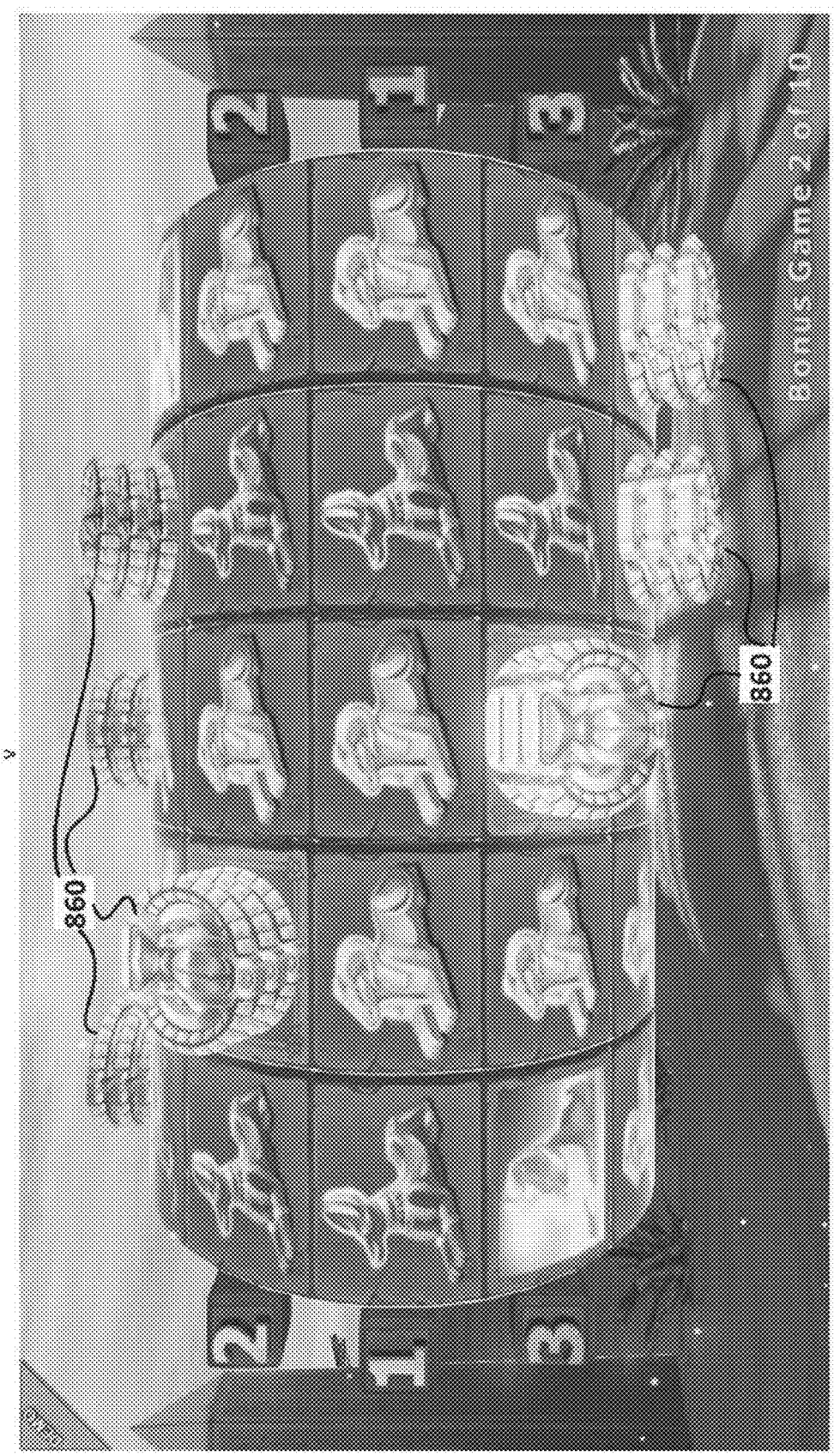
Figure 47D:
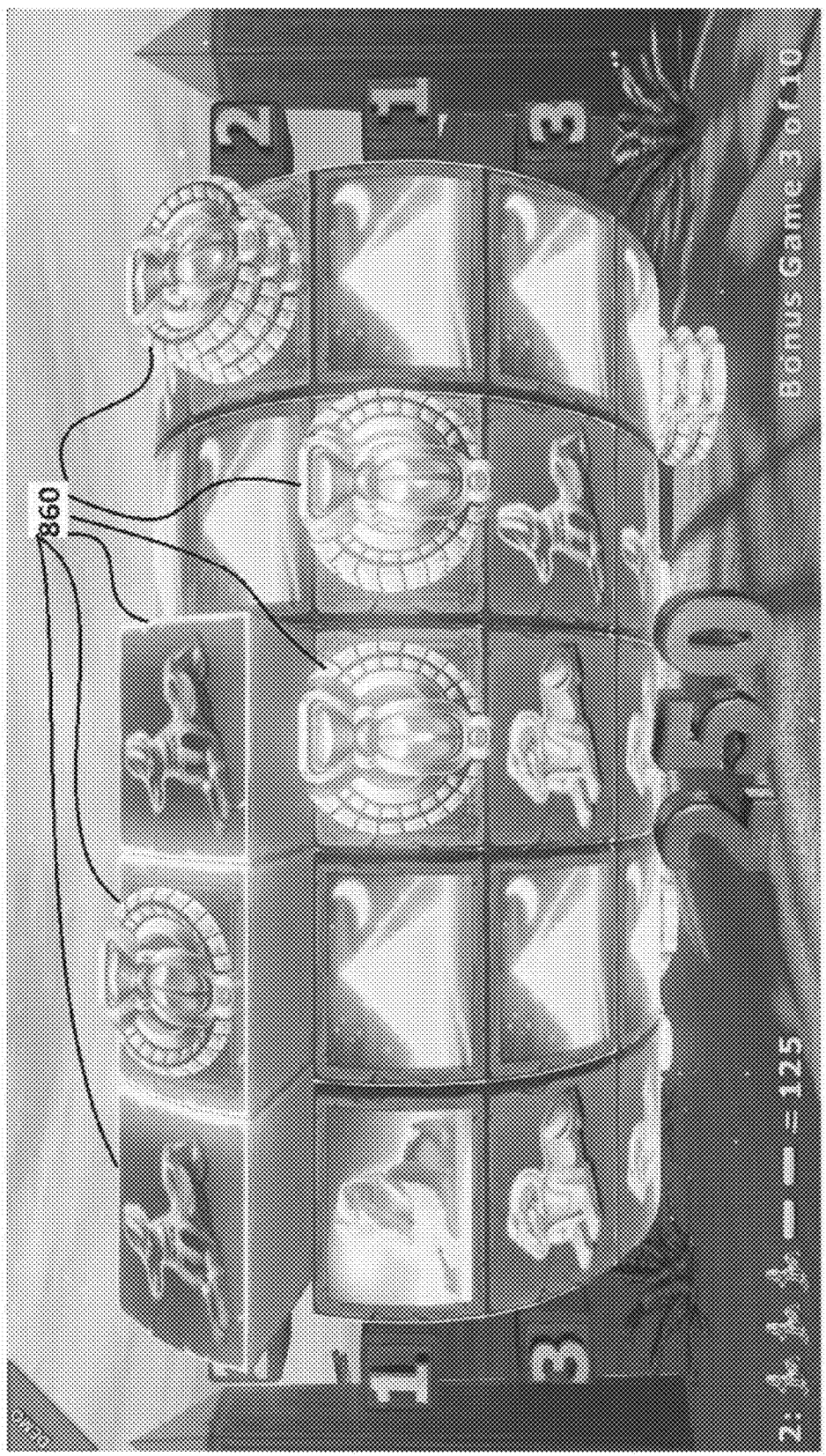
Figure 47E:
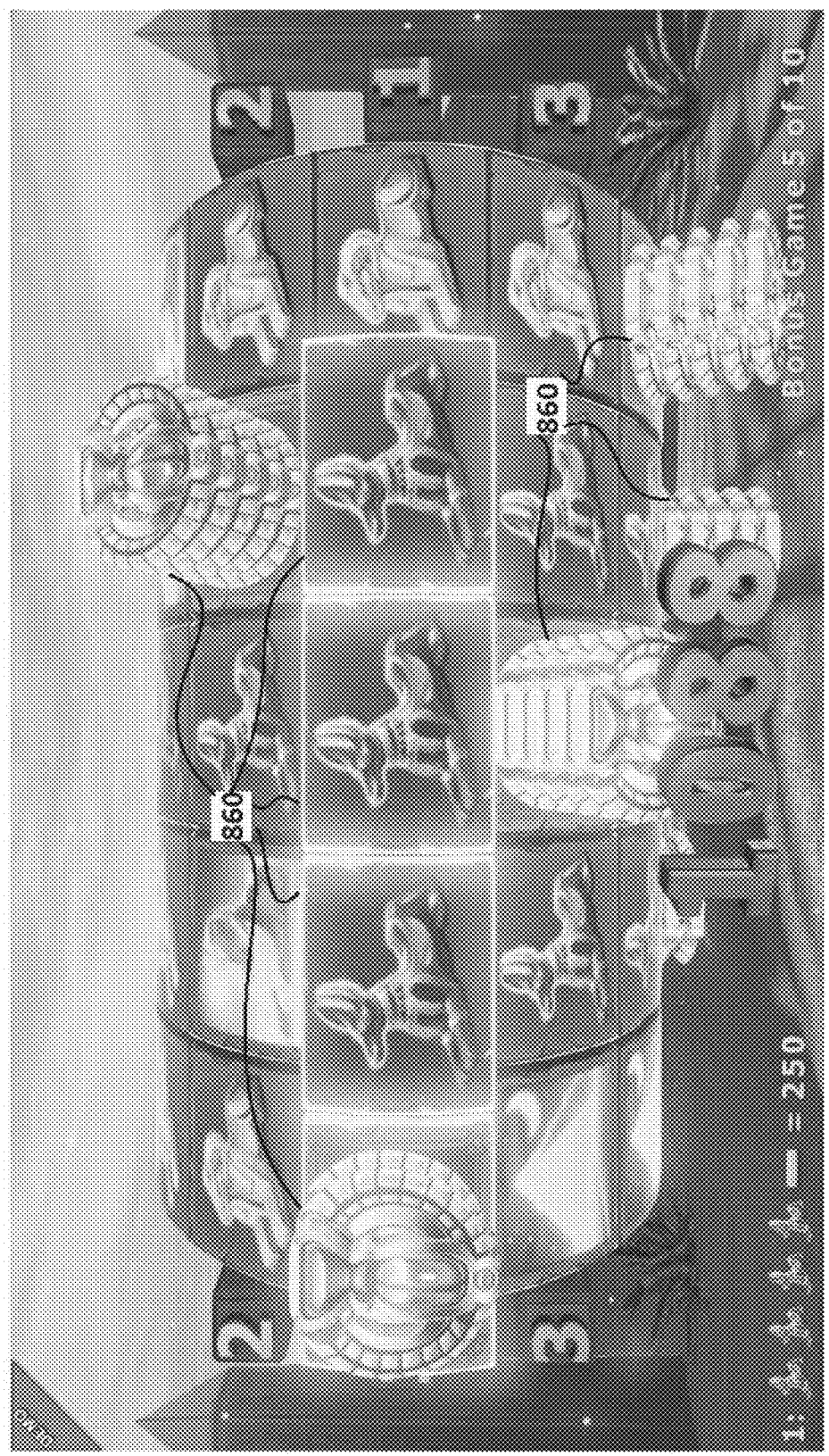
Figure 47F:
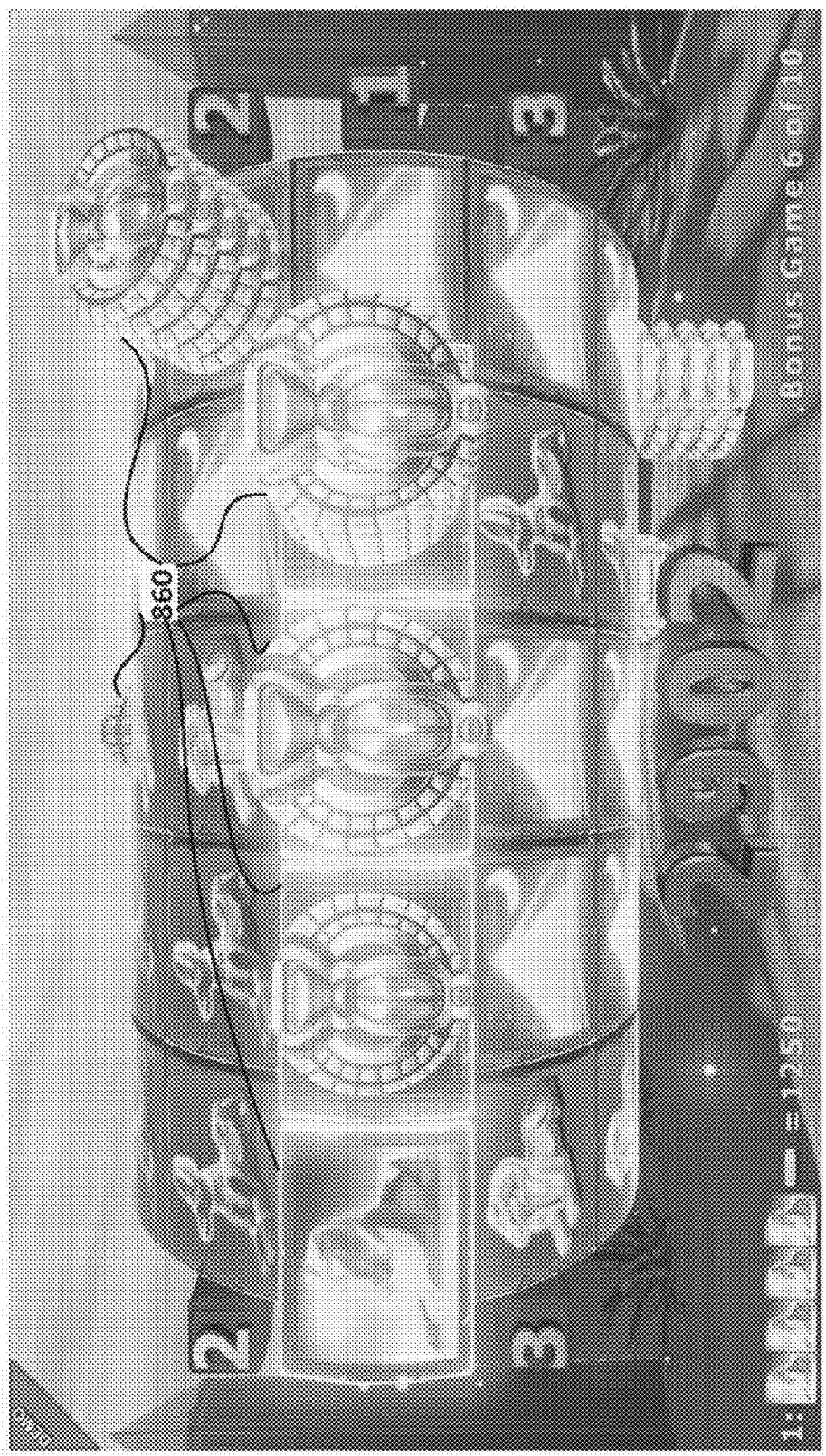
Figure 47G:
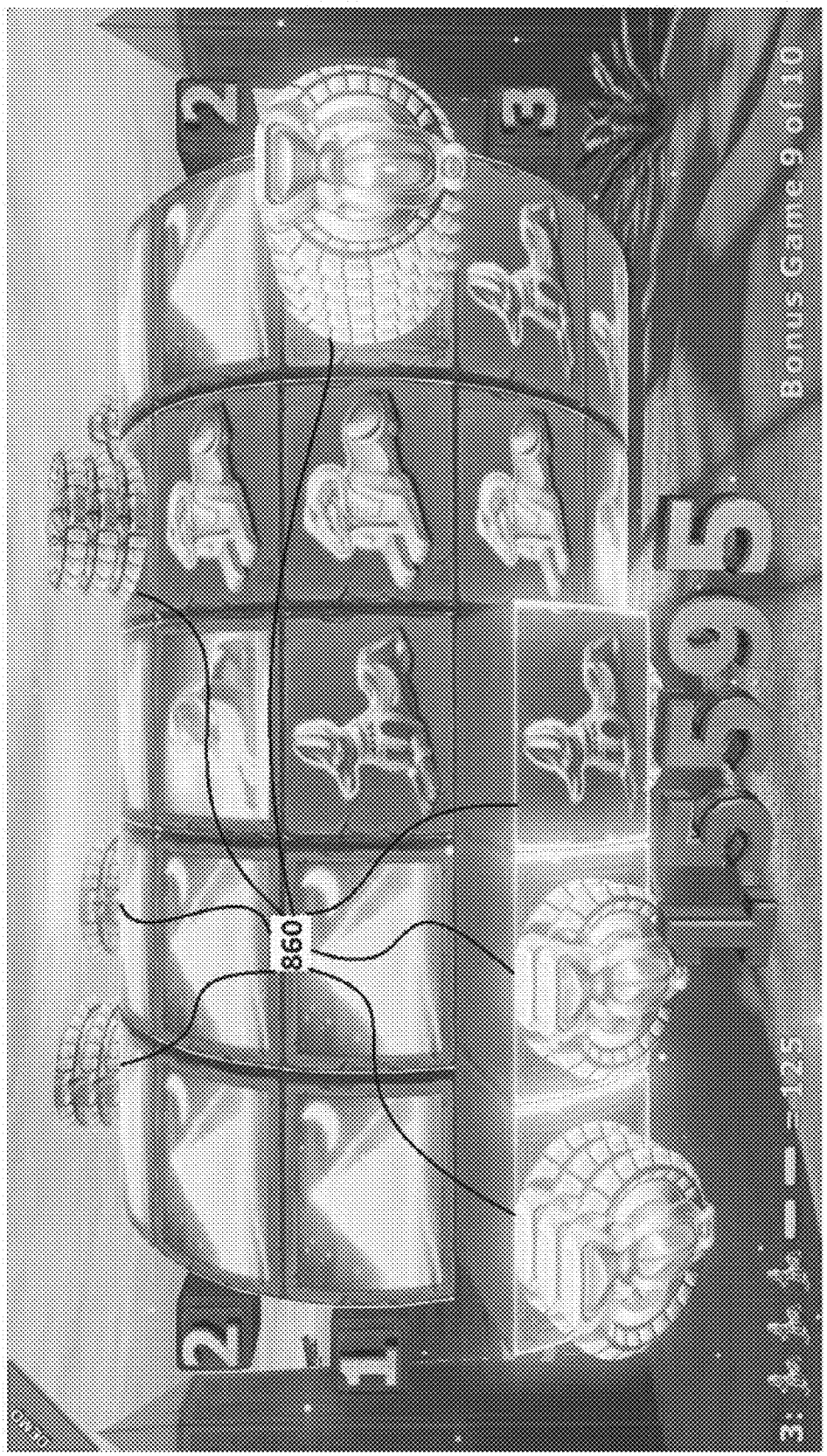

As shown in FIGS. 43a and 44a, when the 3D intensity level is set to a low value (as indicated by the position of the bar 760 on the slider mechanism 750), a 3D enhanced game component 850 in the shape of a Pharaoh's head is displayed with low 3D intensity. That is, the depth of the scene as it appears to the player is low.

However, as illustrated in FIGS. 43b-43g and FIGS. 44b-44e, as the 3D intensity level is increased, the 3D enhanced game component 850 is displayed with increasing 3D intensity. That is, the depth of the scene as it appears to the player increases commensurately with the increased 3D intensity level. Further, the game component appears to move towards the player as the 3D intensity level is increased.

Similarly, FIGS. 45a to 45e illustrate a 3D scene comprising three 3D enhanced game components 850, each in the shape of a Pharaoh's head. Again, increasing the 3D intensity level causes the depth of the 3D scene to increase.

The 3D intensity level may be automatically adjusted according to pre-determined game rules. For example, the 3D intensity level may increase automatically as a player progresses through a game or when the player earns sufficient points (e.g., points surpassing a pre-defined threshold). Similarly, the 3D intensity level may decrease automatically when a player loses points. Maximum and minimum values of the 3D intensity level may be set by an administrator or by the user to constrain automatic adjustment.

As shown in FIGS. 46a to 46g, the 3D objects or game components 850 may be animated such that they move relative to the game board. A player may be rewarded with such an animation once the maximum value of 3D intensity level has been reached, e.g., when a player wins a game, wins a round of a game, obtains points exceeding a pre-defined points threshold, or activates a bonus game. Thus, the player may be rewarded for successful play by increased 3D intensity levels.

In an embodiment, EGM 10 may present a base game first to a player. The base game (or starter game) may be configured to display 3D enhancements at a low 3D intensity level. However, during gameplay, the 3D intensity level may increase or decrease when the user triggers random or pre-defined game events.

In some cases, the player cannot adjust the 3D intensity level during a base game, as the slider mechanism 750 may be grayed out or otherwise inactive. However, the slider mechanism 750 may become activated when the player reaches a bonus round or receives a bonus round prize. Similarly, the slider mechanism 750 may become activated when a player wins a game, exceeds a pre-defined points threshold, or activates a bonus game. In these ways, the player may be granted control of the 3D intensity level as a reward for successful play.

In an embodiment, a game may offer multiple bonus rounds, so that as the player progresses through each bonus round, the EGM 10 is configured to offer more 3D enhanced game components.

In an embodiment, only winning game components or winning combinations of game components are displayed with 3D enhancement.

In an embodiment, 3D enhanced game components 860 may be provided on a spinning wheel. For example, FIGS. 47a to 47g illustrate 3D enhanced game component(s) 860 that appear to move towards and away a player as the wheel spins. Depending on the game rules, user input or administrator's settings, each of the 3D enhanced game components 860 may be displayed to the player with a different 3D intensity level.

In another embodiment, 3D enhanced game components may be configured to point or lead a player to a certain object, area of the game board, or a certain event during a game. For example, a player may be led to a secret chamber, a bonus round, or even another player in the case of multi-player games.

Figure 4A:
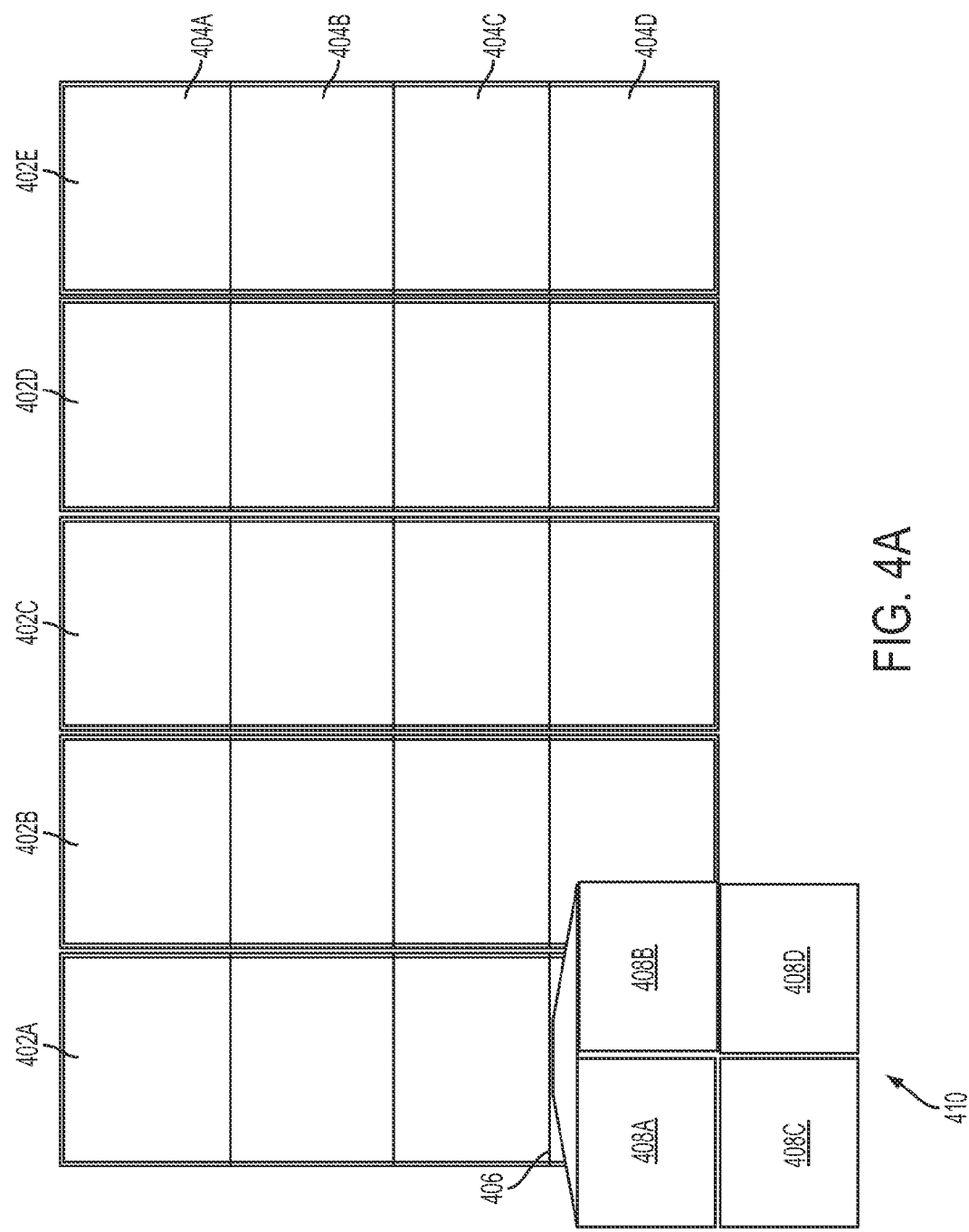
FIG. 4a illustrates an exemplary enhancement of a gaming component using an exploded matrix configuration.

FIG. 4a is an exemplary embodiment for an enhancement to a gaming component. In this example, a grid of five columns 402a, 402b, 402c, 402d, 402e and four rows 404a, 404b, 404c, 404d is displayed, resulting in 5×4=20 gaming components, illustrated as blank cells. An original symbol (not shown) may be associated with each one of the 20 gaming components in each blank cell. At least one gaming component 406 is selected for enhancement. Gaming component 406 is expanded outside of the gaming plane, formed by columns 402a-402e and rows 404a-404d, into a different plane, formed by a 2×2 grid of new cells 408a, 408b, 408c, 408d. Additional symbols are provided in new cells 408a, 408b, 408c, 408d and integrated into the original game. While the enhancement 410 in this example is illustrated as a 2×2 matrix, it should be understood that the matrix may be n×m and shall be limited in size only by the capabilities of the display screen and/or the ability to incorporate the enhancement 410 into the original game.

In one exemplary embodiment, the configuration of FIG. 4a may be a spinning reel game. A win may be obtained whenever matching symbols are aligned vertically, horizontally, or diagonally. These are illustrative examples and there may be other patterns of winning combinations of symbols. Using the gaming component enhancement 410, anyone of the symbols provided in cells 408a-408d may be matched with neighboring symbols to form a winning combination, thus increasing the odds of winning. In another exemplary embodiment, the configuration of FIG. 4a may be a bingo card. Similarly, anyone of the symbols provided in cells 408a-408d may be used to form a complete row or column and result in a winning combination, thus increasing the odds of winning. Other possibilities for the matrix-type gaming enhancement may be used for various embodiments.

Figure 4B:
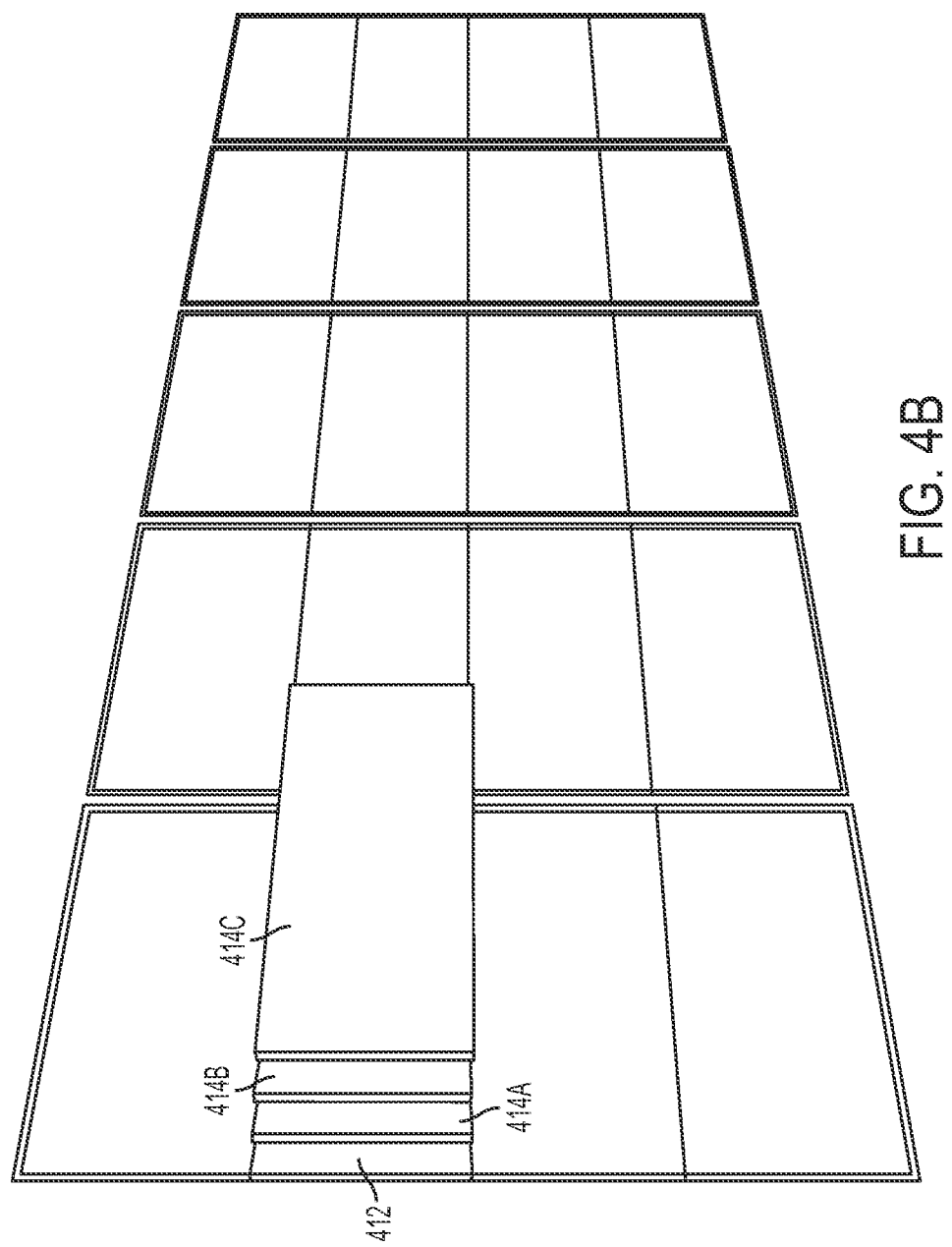
FIG. 4b illustrates an exemplary enhancement of a gaming component using stacking of symbols above the gaming plane.
Figure 4C:
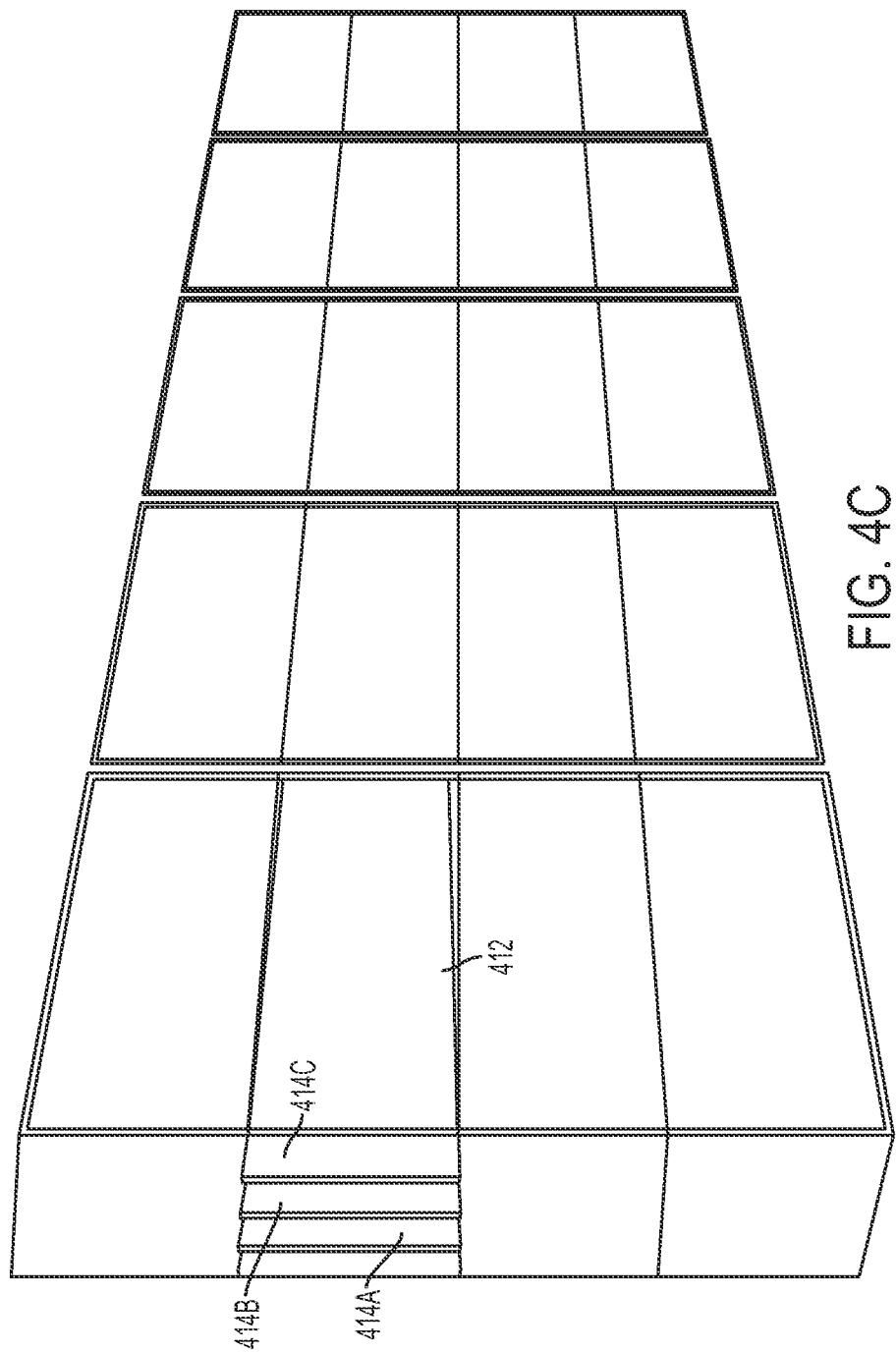
FIG. 4c illustrates an exemplary enhancement of a gaming component using stacking of symbols behind the gaming plane.

FIG. 4b is another exemplary embodiment for an enhancement to a gaming component. In this example, a selected gaming component 412 is expanded outside of the gaming plane by stacking new cells 414a, 414b, 414c on top of the original symbol. Alternatively, the new cells 414a, 414b, 414c may be stacked behind the original symbol, as illustrated in FIG. 4c. In either scenario, various embodiments are possible to integrate the additional symbols provided on cells 414a, 414b, 414c into the original game. For example, in a spinning reel game, anyone of the symbols in cells 414a, 414b, 414c may be used to form a winning combination with neighboring cells. Alternatively, only the top, or visible, symbol may be matched with neighboring cells and as the game progresses, hidden symbols may be discovered and used to further advance the game. In another embodiment, various events in the game, such as a particular winning combination or reaching a threshold of points, may allow the player to see and/or use the additional hidden symbols in addition to the top or visible symbol to form winning combinations. Other scenarios are also possible. In addition, the number of stacked symbols may be more or less than three, as desired.

Figure 4D:
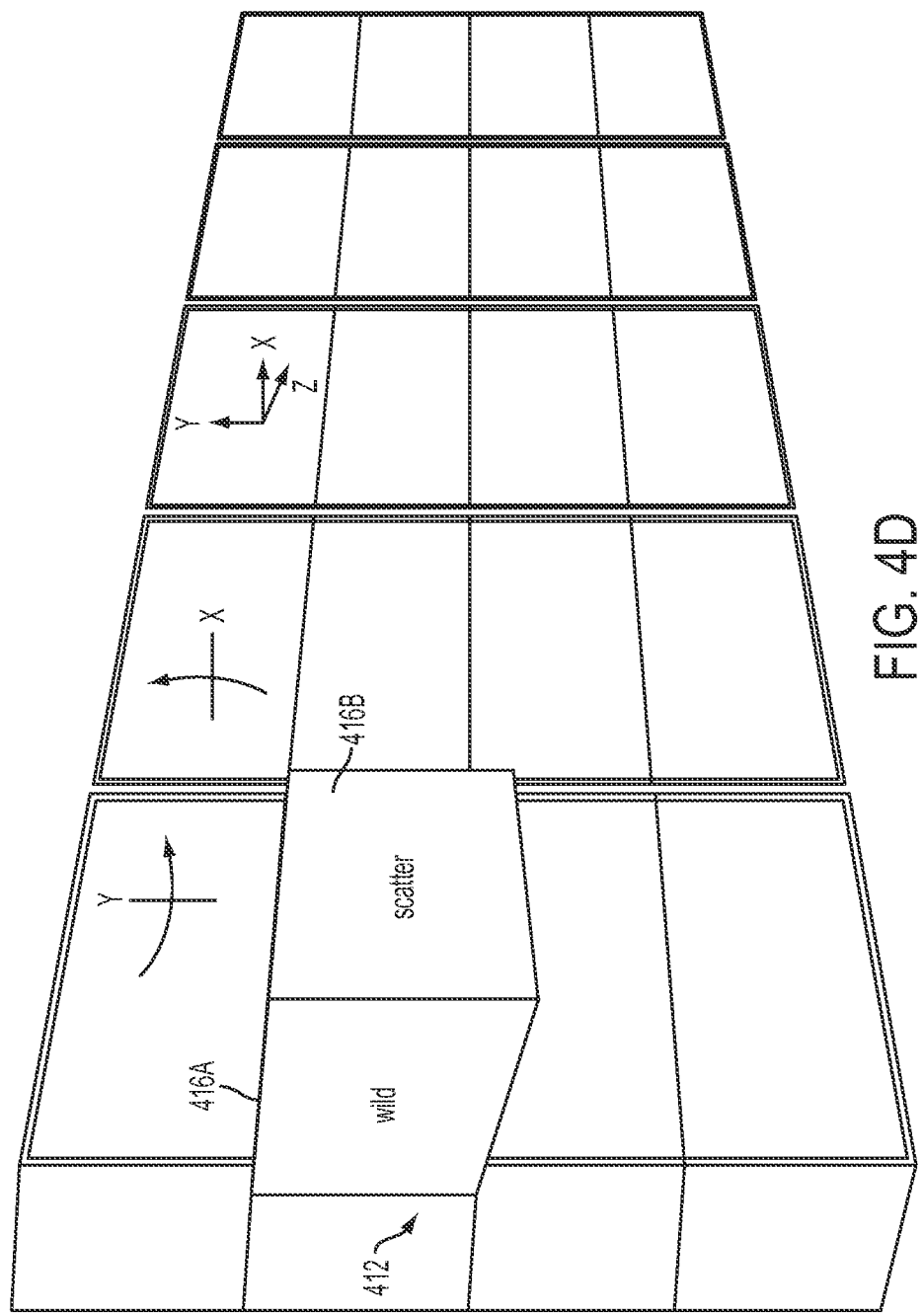
FIG. 4d illustrates an exemplary enhancement of a gaming component using a three-dimensional game component.

FIG. 4d is an exemplary embodiment for an enhancement to a gaming component whereby expanding the gaming component creates a three-dimensional structure. The single facet gaming component 412 becomes a multi-facet gaming component with the enhancement. Additional symbols may be provided on one or more of the facets of the three-dimensional structure, such as 416a and 416b. The additional symbols may be used in various ways. For example, in a spinning reel game, as each game component is spun in a single direction, such as about the x axis, the enhanced gaming component may be spun about multiple axes, such as the y axis and/or the x axis, thus resulting in more possibilities for the spinning gaming component. Alternatively, various events in the game, such as a particular winning combination or reaching a threshold of points, may allow the player to freely rotate the multi-faceted gaming component in a desired direction, such that the symbol on the facet that is rotated to the front may be used for a winning combination. The symbols on the facets other than the front may be displayed to the player or hidden from view. Various events in the game may allow hidden facets to be selectively shown to the player. Other scenarios are also possible. While the multi-faceted three-dimensional structure in this example is shown to be a cube, other geometrical shapes are also possible, such as a cylinder, an octagon, and many others.

The examples illustrated in FIGS. 4a-4d show a single gaming component as enhanced. In some embodiments, multiple gaming components on the gaming plane may be enhanced, thus creating various effects and three dimensional variants. For example, FIGS. 5a and 5b illustrate the use of stacking to create a mirrored effect on spinning reels. As viewed from the top down, FIG. 5a shows the stacking of reels 1 and 5 three symbols deep, reels 2 and 4 two symbols deep, and reel 3 having a single symbol. FIG. 5b shows the stacking of reel 3 three symbols deep, reels 2 and 4 two symbols deep, and reels 1 and 5 a single symbol deep. Various other configurations may be provided using stacked symbols to obtain mirrored or asymmetrical designs. Stacking of symbols may be more or less than three symbols, having the stacks above or below the original symbol. A combination of above and below an original symbol may be used on a same gaming plane.

Figure 6B:
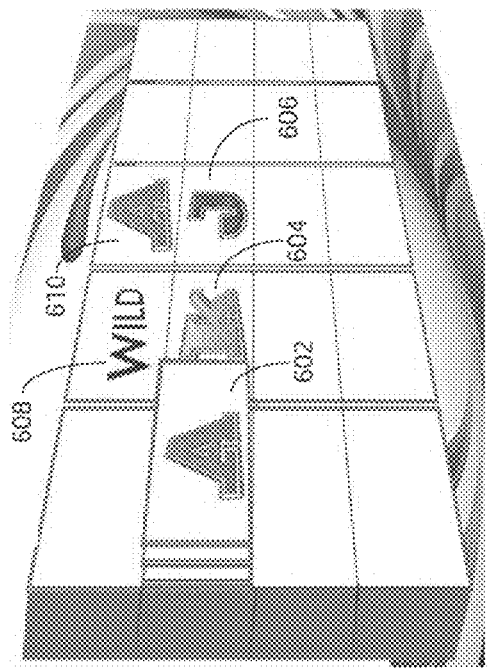
FIGS. 6a, 6b, 6c are exemplary illustrations of cascading of symbols using a stacking concept.
Figure 6C:
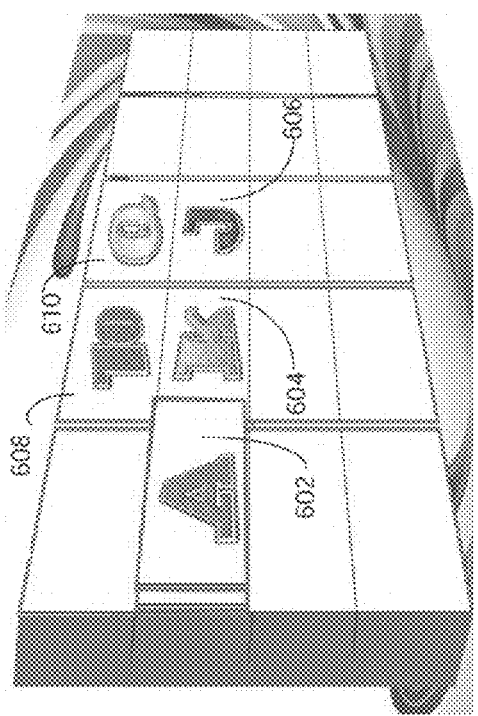
Figure 6A:
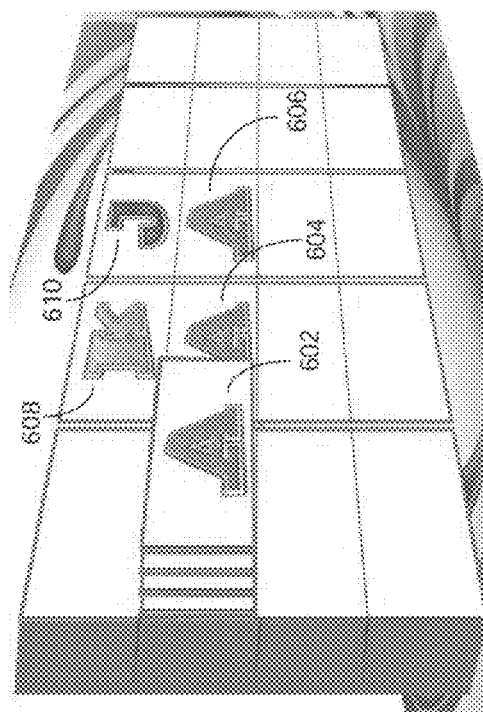

FIGS. 6a-6b illustrate an exemplary embodiment for game play using the gaming component enhancements, and more particularly the stacking of reels in reel spinning games. In FIG. 6a, an Ace on top of reel 602 has four ace symbols stacked under the top Ace symbol (hidden from view). On reels 604 and 606 there are also Ace symbols. These three Ace symbols line up on an active wagered pay pattern to then create an award to the player. The three symbols (top Ace from the stack on reel 602+Ace on Reel 604+Ace on Reel 606) may then remove themselves from the game screen altogether, causing the second stacked Ace on reel 602 to be shown, and a K and J from above reels 604 and 606 respectfully to fall down into the position where the aces on reels 604 and 606 used to be. This is displayed in FIG. 6b. The previous positions of the K and J are then filled with new symbols moving down and into the vacant cells. These happen to be a 'wild' and an 'ace' by way of illustrative example. The stacked cells or symbols may be used independently of the stacked symbols on top or below, as part of different winning combinations.

The screen may then be analyzed a second time to see if there are any new winning patterns available after all of the movement and replenishment that happened after the first set of Aces were removed. Since the Ace on reel 602, the Wild on reel 608, and the Ace on reel 610 create another winning pattern, these three symbols are then removed from the game screen. FIG. 6c shows the Ace from reel 602 removed from the stack of Aces to leave two in the pile (as two others were used in previous win patterns) and the 10 and the Q on reels 608 and 610 have populated the spots where the Wild and Ace were from the previous win pattern.

Thus, the stacking concept may have a stack of symbols that are either (a) all the same symbol as shown in this example with the stack of Aces on reel 602 or (b) offer a variety of symbols stacked on the position. Instead of a full stack of Aces only on reel 602, it could have been a stack of Ace, K, Q, J, 10, etc, in that position (not shown). The stack doesn't have to have same symbol only characteristics or even consecutive symbol characteristics. The stacked symbols may be a random set of symbols. Removing or eliminating symbols from the stack based on winning patterns that involve the stack may lead to other winning patterns. In the embodiment illustrated, the game screen replenishes to allow for the chance at consecutive wins happening, depending on new symbols that replenish the screen.

Figure 7:
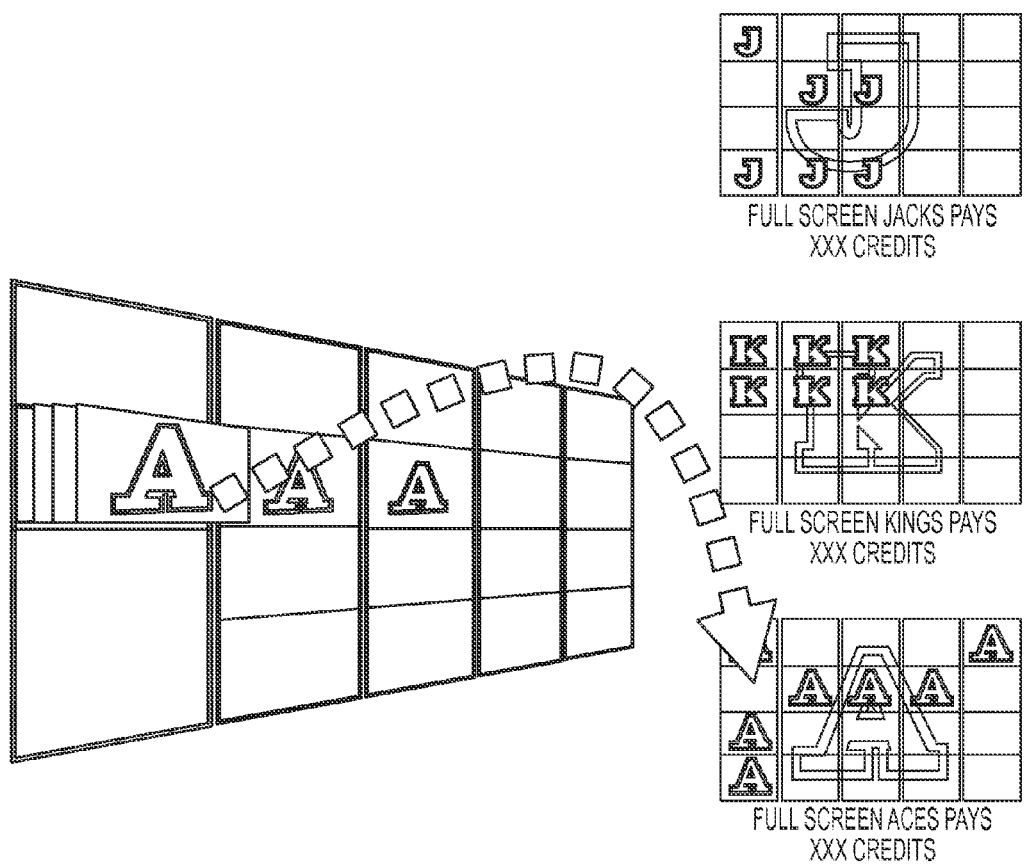
FIG. 7 is an exemplary illustration of associating additional symbols with a secondary game.

FIG. 7 illustrates an exemplary embodiment for using the stacked symbols for the purposes of a secondary game. In this example, the player may interact with the additional symbols and displace them onto one or more secondary game screens. For example, collecting symbols such as Aces, Kings and Jacks may provide additional credits when a given number of these symbols are collected. Alternatively, the symbols may be displaced onto the secondary game screens automatically, without player interaction. Other manners of integrating the additional symbols into a secondary game may be used. The secondary game may be used to trigger a bonus game, for example. The secondary game may also include three dimensional enhancements.

Figure 8A:
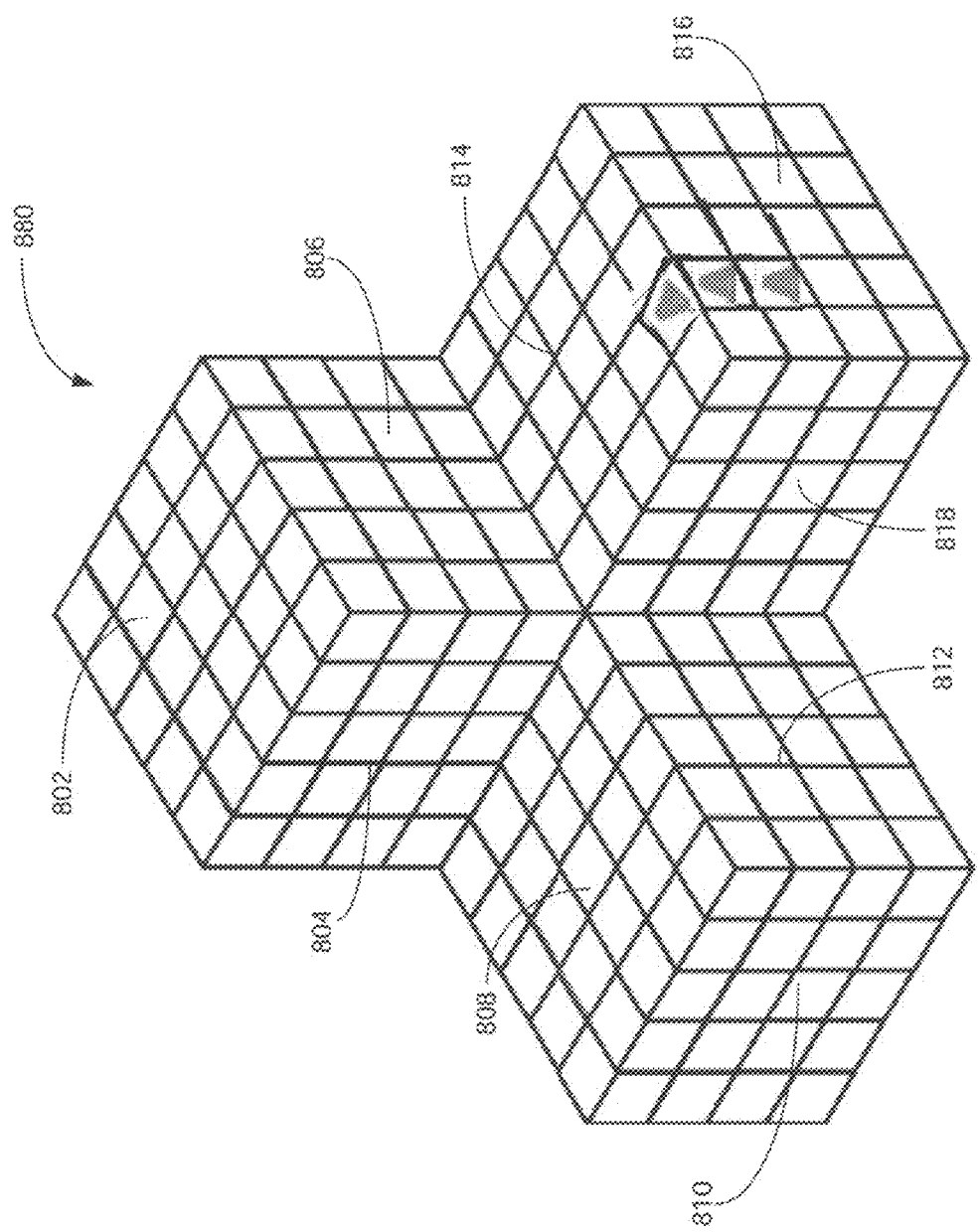
FIG. 8a is an exemplary embodiment of a three-dimensional multi-faceted gaming surface.

As indicated above, enhancing the game components may lead to the creation of three-dimensional structures. In addition to three-dimensional game components as illustrated in FIG. 4d, the entire gaming surface may be transformed into a multi-faceted structure. FIG. 8a is an exemplary embodiment of such an enhancement. The three-dimensional structure 880 comprises nine different surfaces 802, 804, 806, 808, 810, 812, 814, 816, and 818. Each surface may be used as an individual and separate playing surface, thus allowing multiple gaming instances to be run simultaneously. Alternatively, the surfaces may all be used as part of a same gaming instance, with winning patterns overlapping from one surface to another via neighboring cells. For example, one Ace on surface 814 and two Aces on surface 816 may form a winning pattern.

Figure 8B:
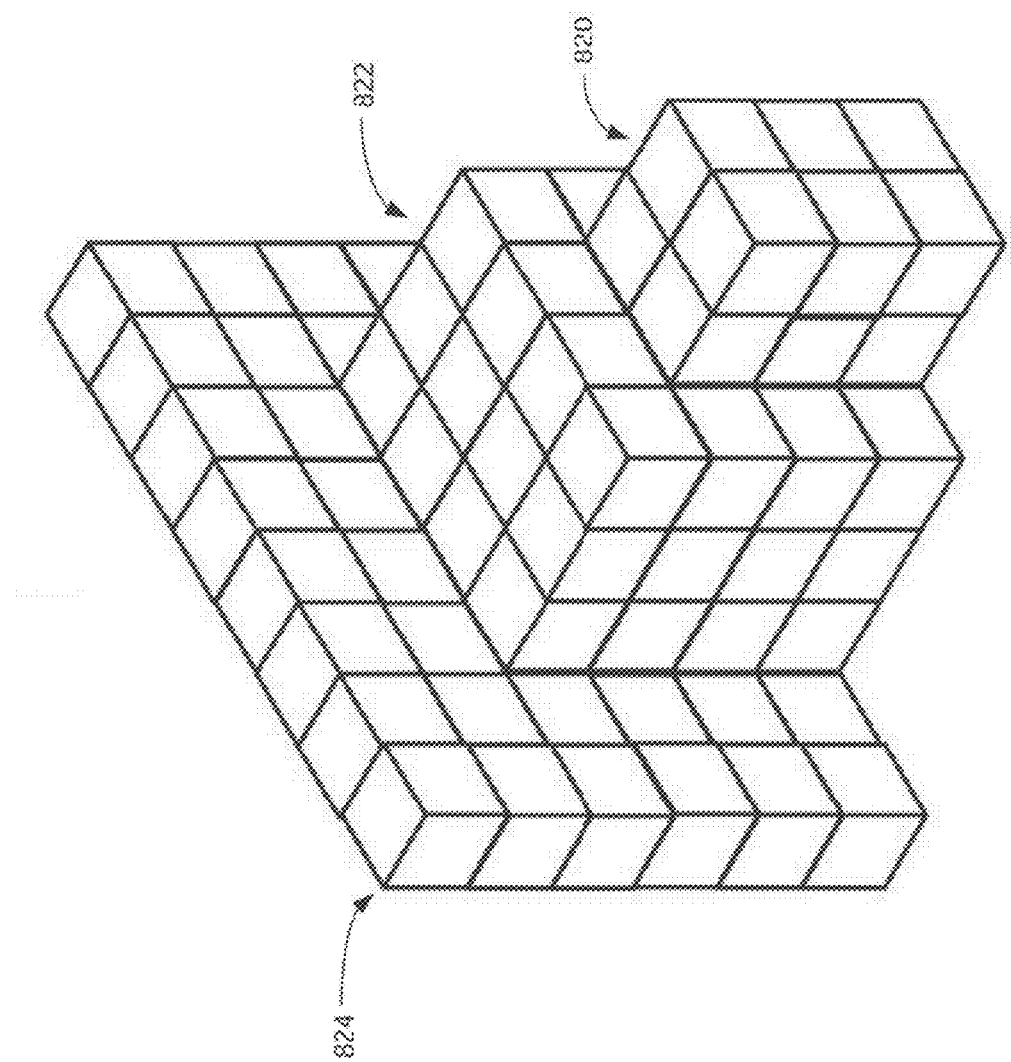
FIG. 8b is an exemplary embodiment of a three-dimensional layered gaming surface.

Other configurations for the gaming area are also possible, as illustrated in FIG. 8b. In this example, multiple layers 820, 822, 824 are provided to a gaming surface. In one exemplary embodiment, once the player has a group of symbols that are all 'like' symbols, they may be removed off of the game board. Once the first layer 820 of the game board has been removed, the next layer 822, which may be a different size and/or shape, is then available to play on. For example, the layers may go from a 5×3 to a 5×4 to a 5×5. Other sizes and shapes for the stacked layers may also be used.

Figure 8C:
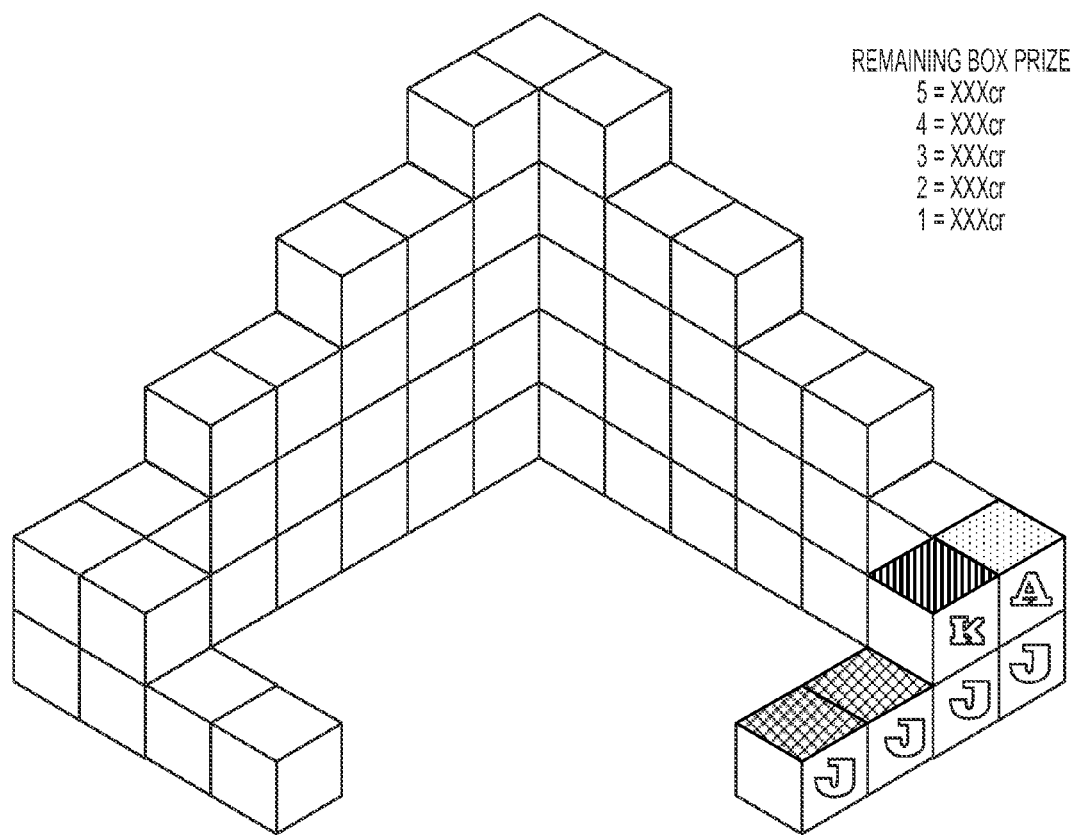
FIG. 8c is an exemplary embodiment of a three-dimensional gaming surface with matching symbols.

FIG. 8c is yet another exemplary embodiment for a three-dimensional, multi-faceted structure when enhancing game components. As shown, the structure is not specific to standard 5×3 or 5×4 video reel presentations of a slot-type game. It can be applied to any type of game matrix. The win patterns and pay categories do not have to have actual physical and traditional lines and patterns as seen in a 5×3 or 5×4 video reel matrix. Grouping of like symbols may create various pay categories, as long as like symbols are touching each other on one of the facets. A game mechanic like symbol elimination may be applied, where the player is hoping to have groups of the like symbols disappearing off of the game screen and depending on the number of symbols left, there could be a prize associated. For example, if five symbols are left, the prize may be 25 credits but if there was a single symbol left, the player would be paid 1000 credits.

In accordance with embodiments described herein, a selected game component may be an enhanced three-dimensional multi-faceted game component. The multi-faceted game components may be arranged in a three-dimensional configuration. Each multi-faceted game component may be associated with a gaming symbol. The gaming symbol may be identifiable, visible and displayed on multiple faces of each multi-faceted game component. When the multi-faceted game components are arranged in a three-dimensional configuration one or more of the faces may be covered by other game components or hidden from a particular view or angle, while one or more of the faces may still be visible at the particular view or angle. The game symbol for each multi-faceted game component may still be identifiable as it may still be shown on the visible face(s).

The embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The embodiments described herein involve computing devices, servers, electronic gaming terminals, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, electronic gaming terminals, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

Figure 9:
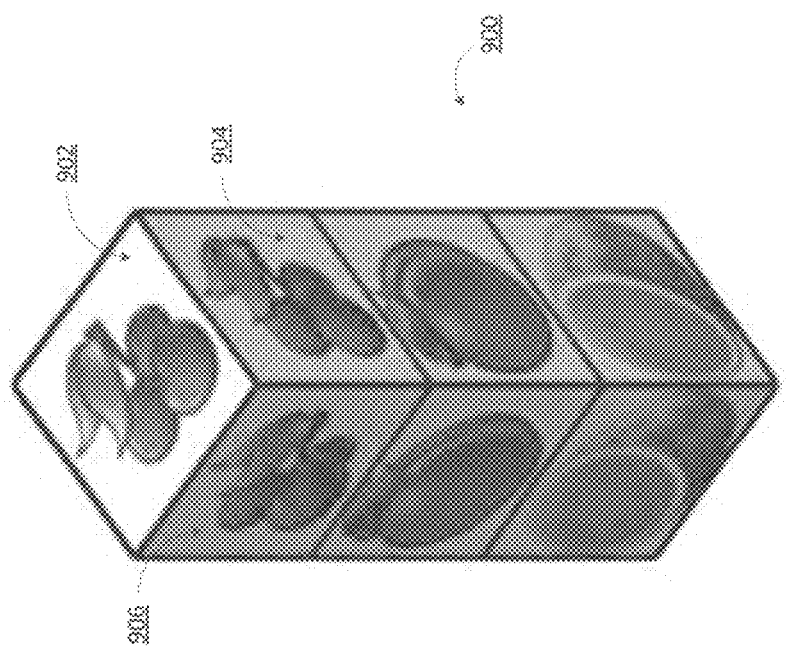
FIG. 9 is an exemplary embodiment of a three-dimensional stack of game components, each being a three-dimensional multi-faceted game component.

Referring now to FIG. 9, there is shown a three-dimensional stack 900 of game components, each being a three-dimensional multi-faceted game component. The stack 900 includes three game components stacked on top of each other along the z-axis. To display stacked symbols, EGM 10 may be configured to display multi-faceted game components each associated with a game symbol identifiable from multiple sides or faces (not only the top) of the game component. As shown, an example three-dimensional multi-faceted game component displays on screen with a visible top symbol 902 and two visible side symbols 904, 906. The cube is an example only and the multi-faceted game component may be of other shapes.

The embodiments described herein may provide various electronic data transformations to provide three-dimensional enhancements. For example, gaming component enhancements are shown in FIG. 4A, including single cell stacking (FIGS. 4B, 4C). Three-dimensional enhancements may involve rotations of multi-faceted game components and gaming surfaces, and the rotations described herein may be multiple axes rotation. There may also be mirrored configurations (FIGS. 5A, 5B), secondary game screens (FIG. 7), and irregular multi-faceted structures (FIGS. 8A-C). Further example three-dimensional enhancements are described herein.

Embodiments described herein may involve multi-faceted game components in a three-dimensional stack 900 along the z-axis. For the illustrative example shown in FIG. 9, if each cube of the stack 900 only displayed the graphic on the top face of the cube, it may not be possible to identify the game symbols of the cubes in the stack 900 except for the top symbol 902 corresponding to the top component on the stack 900. As shown in FIG. 9, the different faces 902, 904, 906 may identify the same game symbol to facilitate identification of the game symbol from different views or angles of the multi-faceted game component. This may facilitate identification of a game symbol corresponding to a multi-faceted game component that is not on the top of the stack, as the top face may not be visible but one or more side faces may be visible. This may provide a mechanism to effectively display multiple multi-faceted game components as a stack 900 while still displaying the gaming symbol corresponding to each multi-faceted game component of the stack 900.

Embodiments described herein may display multi-faceted game components revealing multiple game symbols. Embodiments described herein may involve multi-faceted game components displaying game symbol graphics on multiple sides of a three-dimensional shaped game component. In some embodiments, different game symbols may be displayed on different sides or faces of the three-dimensional game component. In some embodiments, a three-dimensional shaped game component may represent a single game symbol, where the single game symbol is displayed on different sides of the three-dimensional game component so that it may be identified from any angle or view point.

Figure 10:
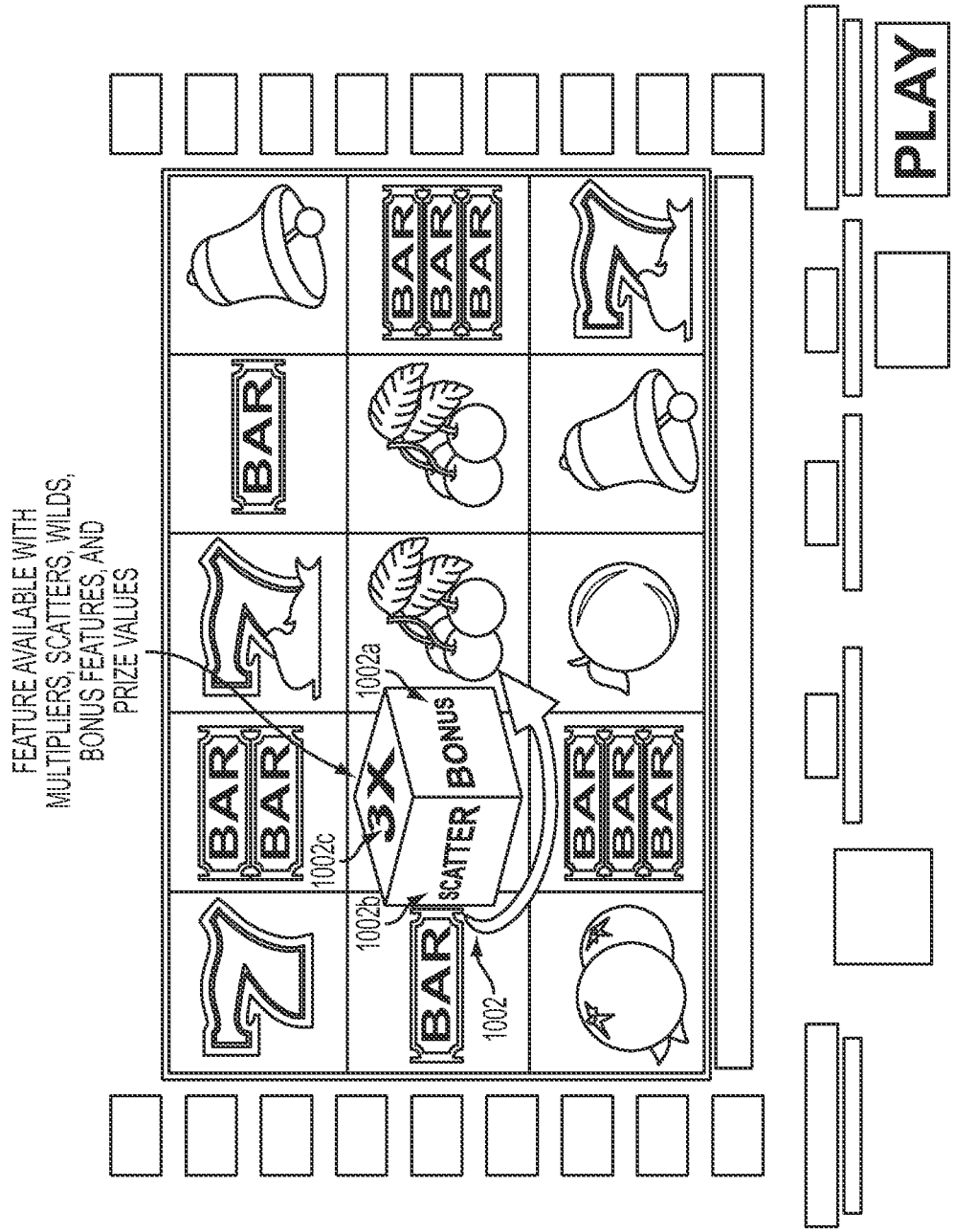
FIG. 10 shows an exemplary enhancement of a gaming component using a three-dimensional multi-faceted game component.

Referring now to FIG. 10, there is an exemplary enhancement of a gaming component using a three-dimensional game component. The three-dimensional game component may be enhanced as a multi-faceted game component, such as is shown in FIG. 4d. The reel or grid game is illustrated with a reel position that has depth (e.g. three dimensional features). The gaming component 1002 shown is a cube with multi-faceted symbols as part of the game composition. The reel or grid may form part of a reel strip. The reel may start spinning when a "play" button on a user interface display on a display screen is activated. As the reels stop spinning, the reel continues to spin and will finish spinning once the last reel halts to place symbols in various positions on the grid. Different combinations and patterns (e.g. lines) may form winning combinations of symbols.

FIG. 10 is an exemplary embodiment for an enhancement to a gaming component whereby expanding the gaming component creates a three-dimensional structure. A single facet gaming component 1002 may be enhanced as a multi-facet gaming component. Additional symbols may be provided on one or more of the facets of the three-dimensional structure, such as 1002a, 1002b, 1002c. The symbols may be multipliers, Wilds, scatters, bonus triggers, and static prize values for example.

One or more symbols may be used for the game to achieve winning combinations. The additional symbols may be used in various ways. For example, in a spinning reel game, as each game component is spun in a single direction, such as about the x axis, the enhanced gaming component may be spun about multiple axes, such as the y axis and/or the x axis, thus resulting in more possibilities for the spinning gaming component. Alternatively, various events in the game, such as a particular winning combination or reaching a threshold of points, may allow the player to freely rotate the multi-faceted gaming component in a desired direction, such that the symbol on the facet that is rotated to the front may be used for a winning combination. The symbols on the facets other than the front may be displayed to the player or hidden from view. In this example, three facets 1002a, 1002b, 1002c may be visible during a current view. As the gaming component 1002 spins to different views then different facets may be visible.

Various events in the game may allow hidden facets to be selectively shown to the player. Other scenarios are also possible. While the multi-faceted three-dimensional structure in this example is shown to be a cube, other geometrical shapes are also possible, such as a cylinder, an octagon, and many others.

Figure 11:
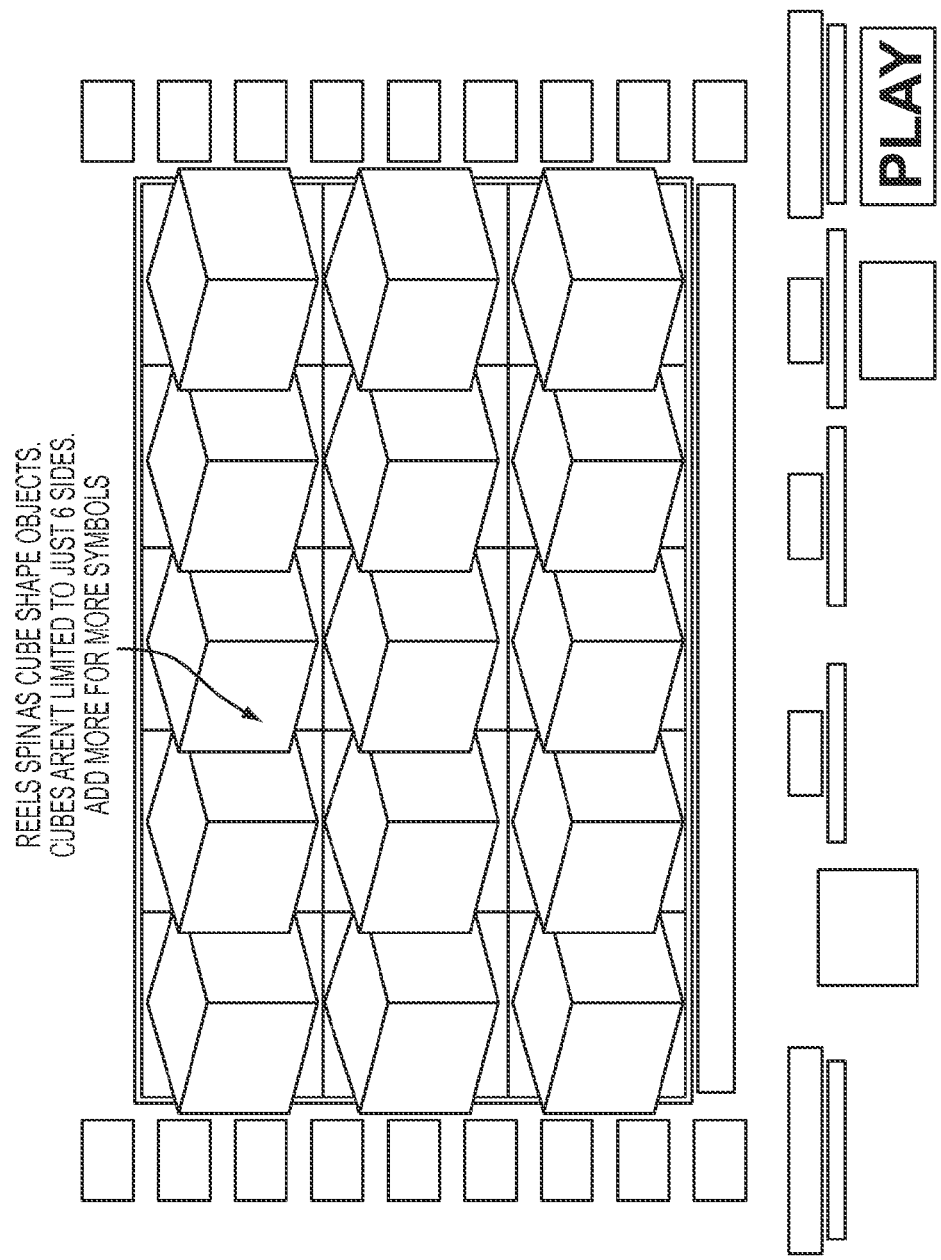
FIG. 11 shows an exemplary enhancement of a gaming component using multiple three-dimensional multi-faceted game components.

This example shows a single gaming component as enhanced. In some embodiments, multiple gaming components on the gaming plane may be enhanced, thus creating various effects and three dimensional variants. Referring now to FIG. 11 there is shown an exemplary enhancement of a gaming component using multiple three-dimensional game components. The three-dimensional game components may be enhanced as multi-faceted game components. In this example, all reel positions or cells may contain a multi-faceted game component. As an illustrative example, a multi-faceted game component may be a cube that may spin in various directions or on different axes. The spin or rotation may be activated in different ways (e.g. user activated, game state activated, event activated). The direction or axis of spin may be varying from one game component to the next.

A cube or other three-dimensional shape may not be limited to its geometric number of facets. For example, a cube may not be limited to six sides. Each facet may also have a weight associated therewith. A higher weight may increase likelihood or probability that the facet will be used in reel or grid combinations (e.g. the spinning will stop with the this facet visible and usable for the game). A lower weight may decrease likelihood or probability that the facet will be used in reel or grid combinations. Weighting may also be implemented as frequency of various symbols on the different facets. For example, if multipliers are used as gaming symbols on different facets then there may be more low paying multipliers than high paying multipliers over the facets of the multiple three-dimensional game components. This may also apply to bonus feature triggers and other symbols.

Figure 12:
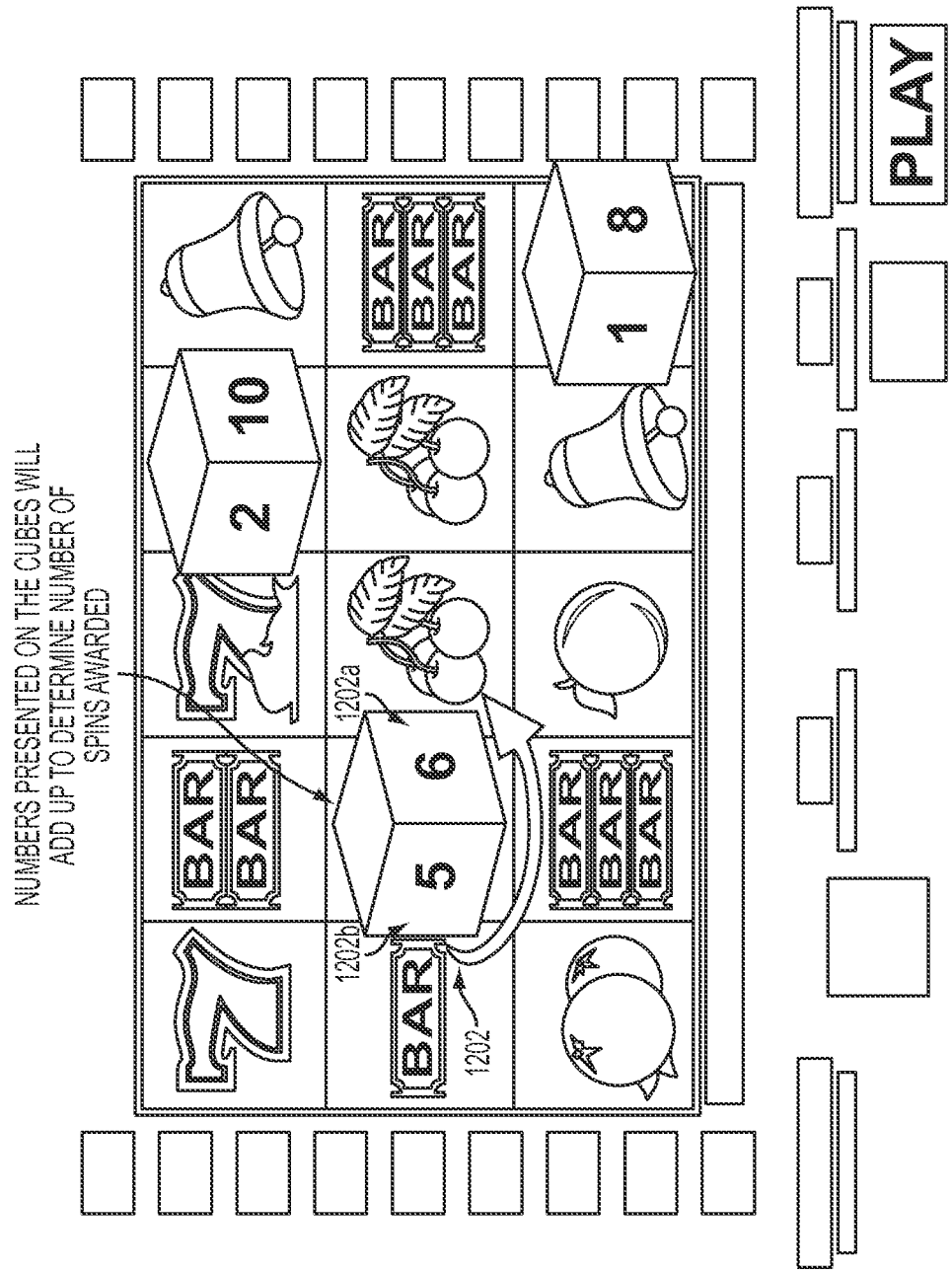
FIG. 12 shows an exemplary enhancement of a gaming component using multiple three-dimensional game components.

Referring now to FIG. 12 there is shown an exemplary enhancement of a gaming component using multiple three-dimensional game components. The three-dimensional game components may be enhanced as multi-faceted game components. The different facets may reflect bonus feature triggers. For example, when a predetermined number of particular bonus gaming symbols are visible when the reel stops, each may enhance into a multi-faceted game component, such as a cube 1202, where each fact may be associated with a bonus feature.

For example, each side or facet of the game component may hold a number, such as shown for facets 1202a, 1202b. Each multi-faceted game component may spin in a direction or on an axis, automatically or by player action. For example, player may be prompted to spin (via an electronic interaction with EGM 10) each multi-faceted game component displayed onscreen. The addition of all numbers (e.g. numbers on facets 1202a, 1202b) presented or visible on all or some of the multi-faceted game components may give a total of the number of free games to be awarded to a player, for example. Other bonus features may also be provided by the multi-faceted game components.

There may be a minimum number of free games provided by the bonus features of the multi-faceted game components. For example, FIG. 12 displays three multi-faceted game components with bonus features and a minimum number of free games may be three (one for each of the three multi-faceted game components). There may also be a maximum number of free games. If a multi-faceted game component offers bonus values from 1 to 10 then the maximum number of free games for this example may be 30 (a bonus value of 10 for each of the three multi-faceted game components). The bonus values can also be weighted and randomly chosen.

Figure 13:
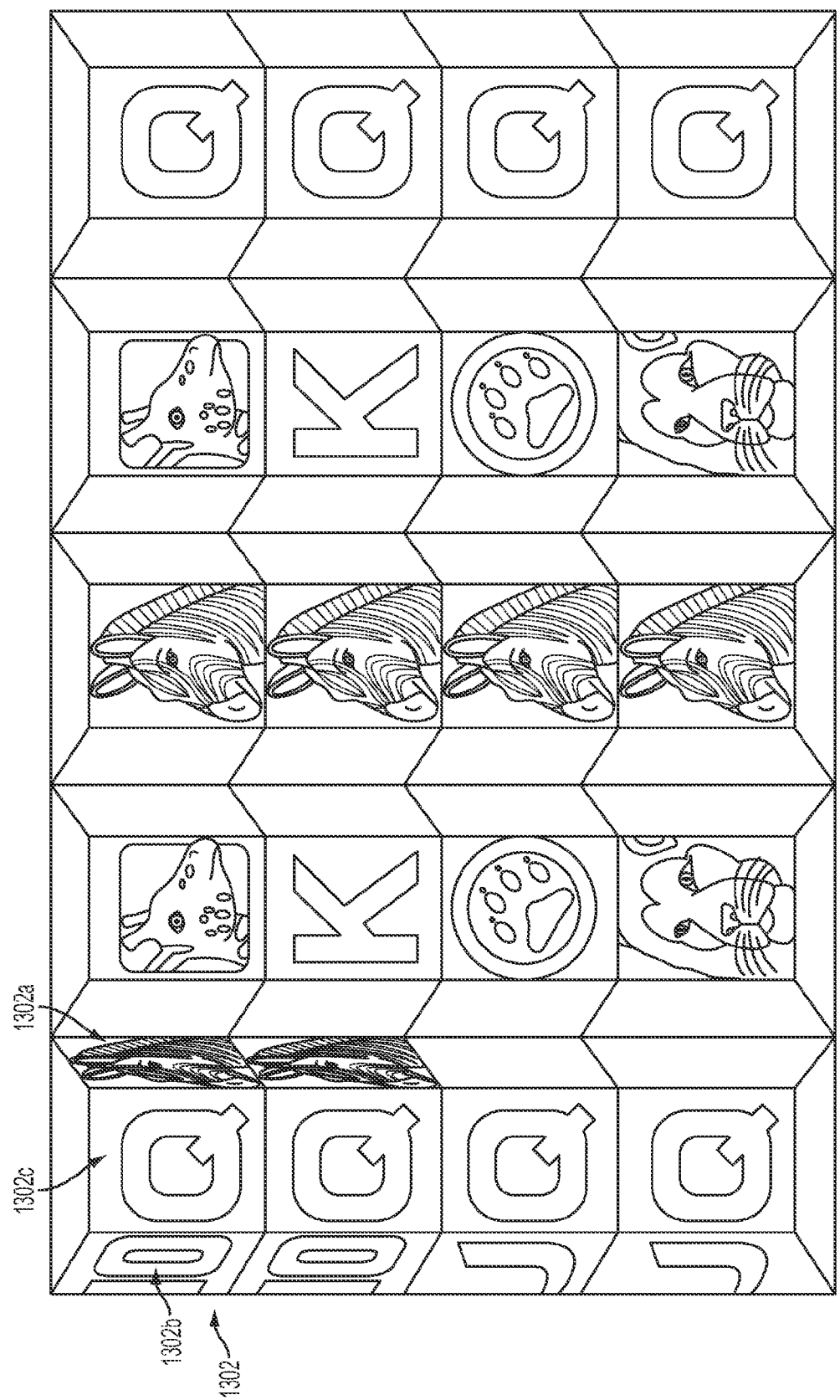
FIG. 13 shows an exemplary enhancement of a gaming component using multiple three-dimensional multi-faceted game components to provide additional symbols.

Referring now to FIG. 13 there is shown an exemplary enhancement of a gaming component using multiple three-dimensional game components. The three-dimensional game components may be enhanced as multi-faceted game components. The multiple faces of game components may be used as separate gaming symbols for a reel or grid type game. That is, the multiple faces may be used for patterns of winning combinations. The multi-faceted game components provide a different structure to grid. Each face of a multi-faceted game component may be used to form part of a winning combination or pattern. For example, a multi-faceted game component 1302 may have three viewable sides or faces 1302a, 1302b, 1302c that may be used to form part of a winning combination or pattern. Generally, only one face (e.g. 1302c) of a given multi-faceted game component 1302 may be viewable and used to form a winning combination or pattern. For this example enhancement three faces (e.g. 1302a, 1302b, 1302c) of a given multi-faceted game component 1302 may be used to form a winning combination or pattern.

Figure 14:
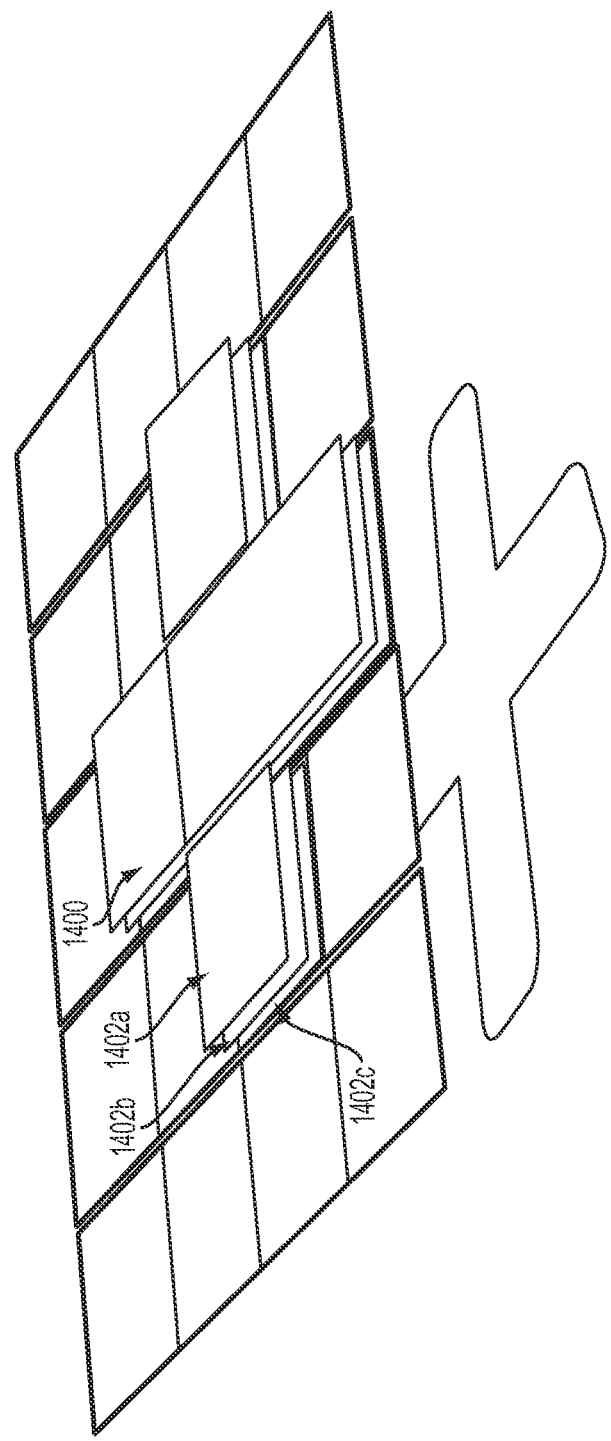
FIG. 14 shows another exemplary enhancement of a gaming component using multiple three-dimensional game components configured in multiple stacks.

Referring now to FIG. 14 there is shown another exemplary enhancement of a gaming component using multiple three-dimensional game components. A selected gaming component may be expanded outside of the gaming plane by stacking additional cells on top of or below, in front of or behind the original symbol.

In accordance with some example embodiments, a shaped symbol may appear behind the matrix (e.g. reel, grid). The shaped symbol may "push up" different cells or gaming components (e.g. the selected gaming components) to provide a three-dimensional enhancement. The shaped symbol may be different each time and may enhance a different number of symbol spaces or cells.

In this example, four selected gaming components 1400 are expanded outside of the gaming plane by stacked cells pushed up from behind of the original symbols. For example, the original symbol cell 1402a of a gaming component is enhanced by two stacked cells 1402b, 1402c behind.

Various embodiments are possible to integrate the additional symbols provided on cells 1402a, 1402b, 1402c into the original game. For example, the stacked cells 1402a, 1402b, 1402c may be multipliers (e.g. 2×, 3×, 4×) or Wild. As another example, in a spinning reel game, anyone of the symbols in cells 1402a, 1402b, 1402c may be used to form a winning combination with neighboring cells. Alternatively, only the top, or visible, symbol may be matched with neighboring cells and as the game progresses, hidden symbols may be discovered and used to further advance the game. In another embodiment, various events in the game, such as a particular winning combination or reaching a threshold of points, may allow the player to see and/or use the additional hidden symbols in addition to the top or visible symbol to form winning combinations. For example, during a bonus feature reels 3, 4, 5 (FIG. 14) have different levels of pushed up cells and the cells may "peel" off as used in free game line wins or as part of a winning combination or pattern. New cells from below or behind may then be revealed. Other scenarios are also possible. In addition, the number of stacked symbols may be more or less than three, as desired.

Figure 15:
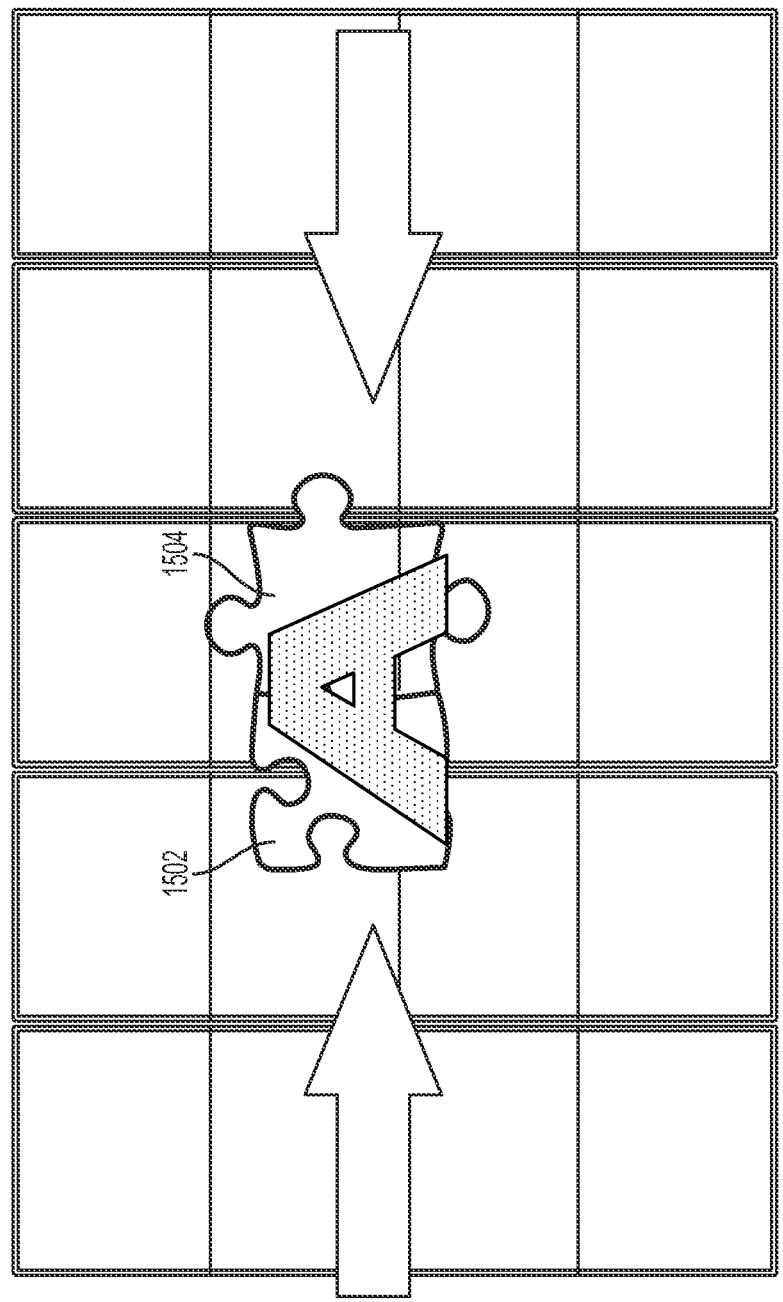
FIG. 15 illustrates two puzzle piece shapes or halves as additional game components to merge together to form an additional symbol.

Referring now to FIG. 15, there is shown another exemplary three-dimensional game enhancement. The example three dimensional enhancement includes additional game components (e.g. components that are not part of the original matrix game) that combine to create an additional game symbol. That is, various components (that are not part of the underlying matrix game) can merge together in front of the matrix game to create new game symbols. The components can move or "fly" in from the top, bottom, left, right, back or front of the game screen, for example.

The additional pieces or components of a shape may float on top (to provide a three-dimensional view and depth) of the game matrix (e.g. reels, grid) and fit or merge together in front of the game matrix (e.g. reels, grid) to create an additional game symbol. The example of FIG. 15 illustrates two puzzle piece shapes or halves as the additional game components 1502, 1504 to merge together to form an "A" symbol.

Figure 16:
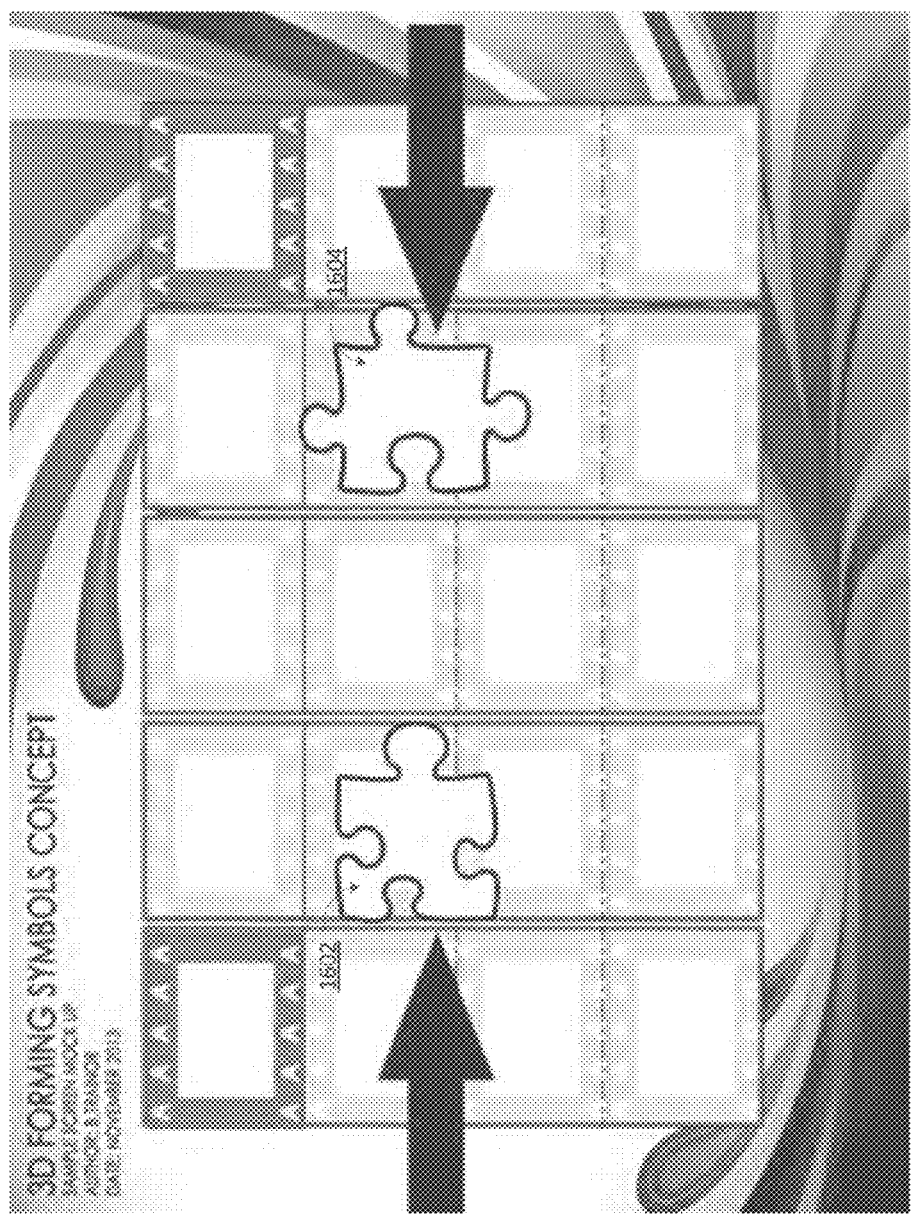
FIGS. 16 and 17 show further example illustrations of an exemplary three-dimensional game enhancement with merging components to form an additional symbol.
Figure 17:
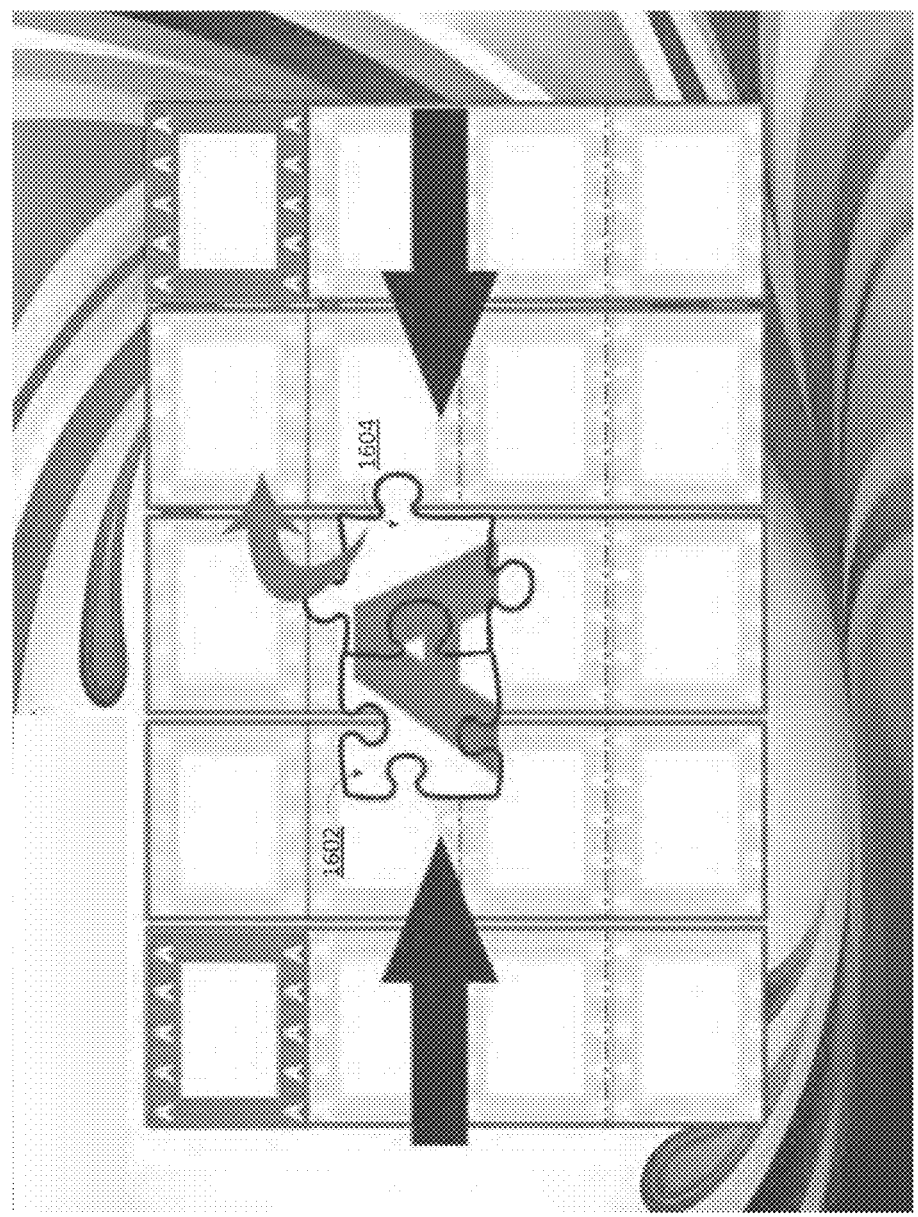

Referring now to FIGS. 16 and 17 there are shown further example illustrations of a exemplary three-dimensional game enhancement with merging components to form an additional symbol. In this example, two halves 1602, 1604 merge together of the underlining matrix game (e.g. grid, reels) that may lock in place on the reels to form an additional, new game component. The new game component may be semi-transparent so that the underlying game matrix is visible and can move behind. FIG. 16 illustrates two halves 1602, 1604 merging over the game screen. The components can move or "fly" in from the top, bottom, left, right, back or front of the game screen, for example. The additional game component may be an overlay on the underlying game matrix.

FIG. 17 illustrates an additional game component formed by the two halves 1602, 1604, the symbol "A". The additional game component may integrate with the underlying game to form winning combinations or patterns. For example, the additional game component may increase the chance of winning by combining with like symbols in the underlying game. The additional game component may offer a multiplier based on the symbol formed by the merged pieces (e.g. offers a chance to win five in a row over and over again with the additional game component).

The additional game component may be placed on the game grid to be used as a game component for the underlying game. For example, a goal of the game may be to get five in a row on the game grid to get an additional five in a row pay outs on top of the pay outs for the underlying game. The additional game component may provide a game within a game. The steps of moving in game pieces and forming additional game components may be repeated to fill in more game components of the underlying game.

Figure 18:
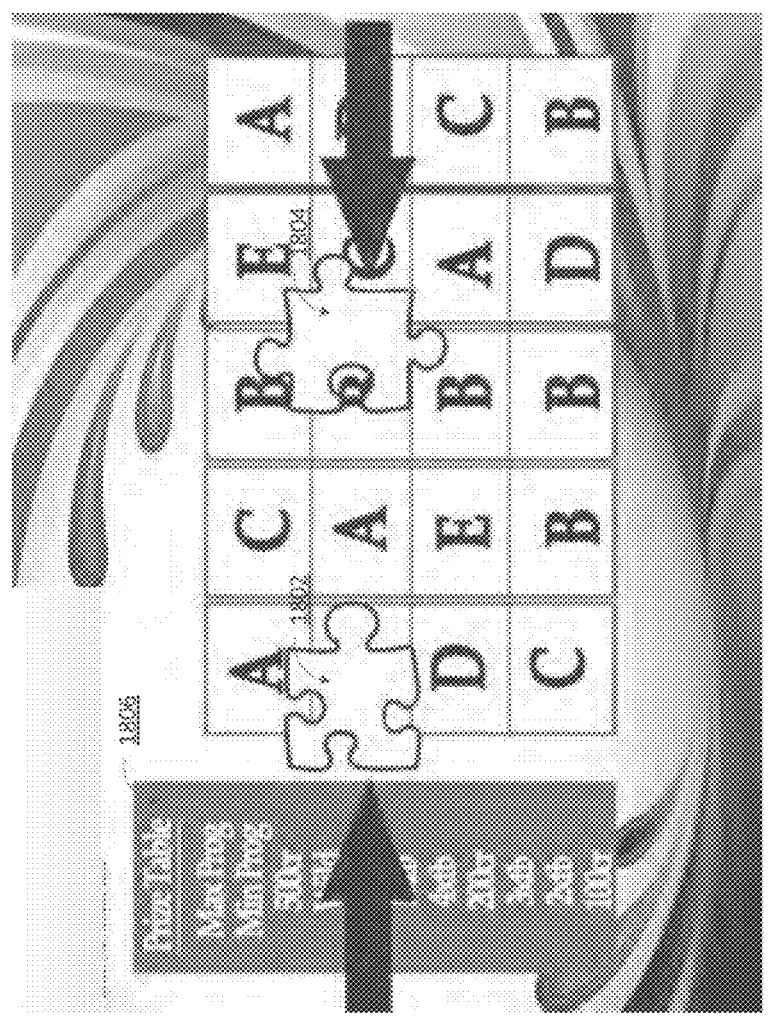
FIGS. 18 to 20 show further example illustrations of an exemplary three-dimensional game enhancement with merging components to form additional symbols.
Figure 19:
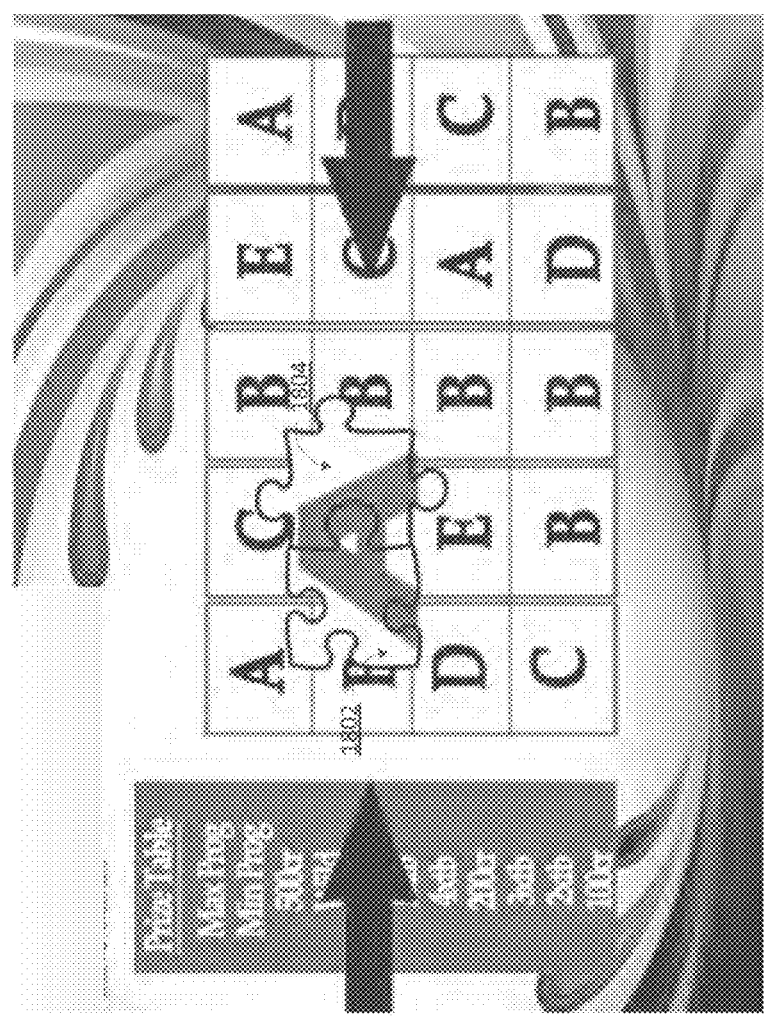
Figure 20:
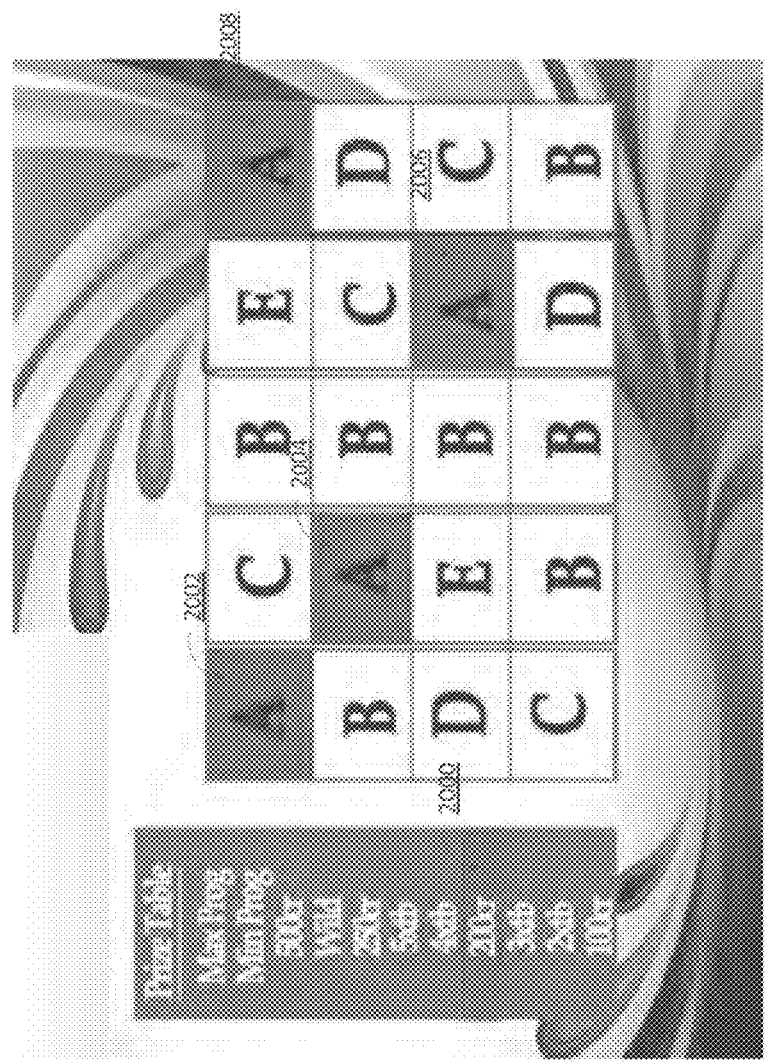

FIGS. 18 to 20 shown further example illustrations of an exemplary three-dimensional game enhancement with merging components to form additional symbols. For this example, two half pieces 1802, 1804 float out to merge the additional game component. The additional game component may integrate with the underlying game matrix in different ways. For example, symbols on the screen that match the merged symbol may pay a scatter prize. A prize ladder 1806 on the side may include win multipliers for the number of symbols on the game screen. The prize ladder 1806 may possibly increase over rounds of the game, and may involve progressive gaming features. The prize ladder 1806 may be displayed as a tape or three-dimensional line flowing.

As shown in FIG. 18, two halves 1802, 1804 merge over the game screen. As noted, the two halves 1802, 1804 may move or fly in from sides, back, front, top, bottom, etc. FIG. 19 illustrates the additional game symbol component formed by the two halves 1802, 1804, the symbol "A". As shown in FIG. 20, the game board may identify where the "A" symbols 2002, 2004, 2006, 2008 are located in the underlying game matrix. Based on the number of "A" symbols 2002, 2004, 2006, 2008 visible in the underlying game matrix, the prize table on the side may identify the prize(s) 2000 awarded for the 'A' symbols 2002, 2004, 2006, 2008 on screen.

Referring now to FIGS. 21 to 28 there is shown another example three-dimensional game enhancement. A three-dimensional game enhancement may involve a transparent symbol that may randomly appear on the reels of the game matrix. The transparent symbol may allow symbols to push through and if those symbols are used in a win they may disappear (cascade) allowing for additional symbols to push through.

Figure 21:
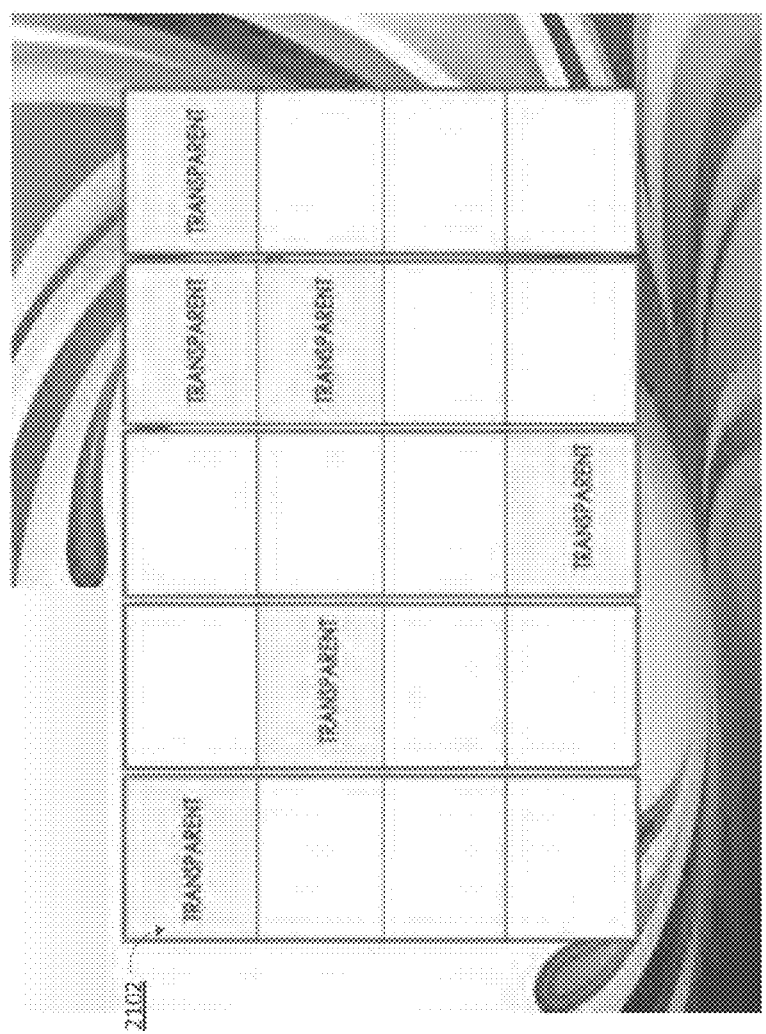
FIGS. 21 to 28 show another example three-dimensional game enhancement with transparent game features and stacks of gaming components.

FIG. 21 illustrates an example three-dimensional game enhancement may involve one or more transparent areas or symbols 2102 shown on the reel grid as part of the matrix game area.

Figure 22:
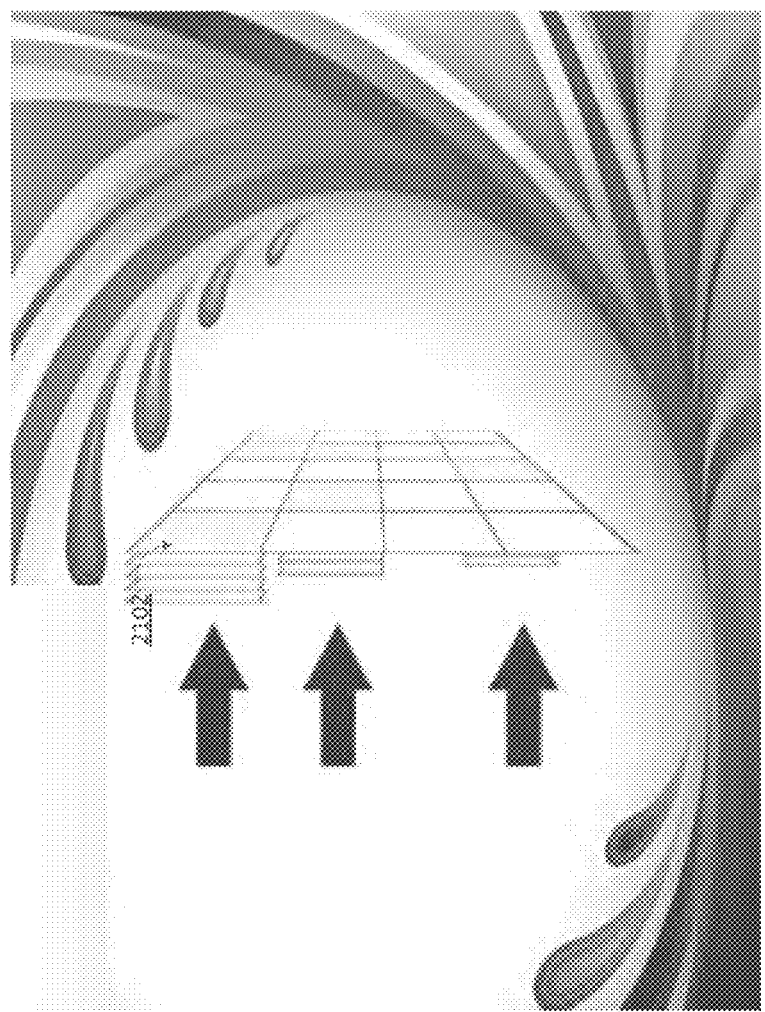

As shown in FIG. 22, when reel symbols land on these transparent areas 2102, and are used in line wins, the symbol spot may be replenished by a reel strip housed in behind the reels. The new symbols may 'push through' the transparent area 2102 and become the new symbol position. This "push through" mechanism may be similar to the example shown in FIG. 14 where a selected gaming component may be expanded outside of the gaming plane by stacking additional cells on top of or below, in front of or behind a symbol that lands on the transparent area 2102.

In other example embodiments, a transparent symbol may randomly appear on the reels of the free games. When the transparent symbol appears, it may mark the symbol area with a number or watermark sign. At the end of the bonus, a free game may be awarded where all the transparent symbol areas will be activated. This may allow for a set of reels in behind a game area matrix to become active. Where there are wins using the extra set of reels, winning symbols may disappear which allow for new symbols to push through. If the newly pushed through symbols are used in a win they may disappear (cascade) allowing for additional symbols to push through. This may continue until all of the transparent numbers are used per symbol area of the game matrix.

Figure 23:
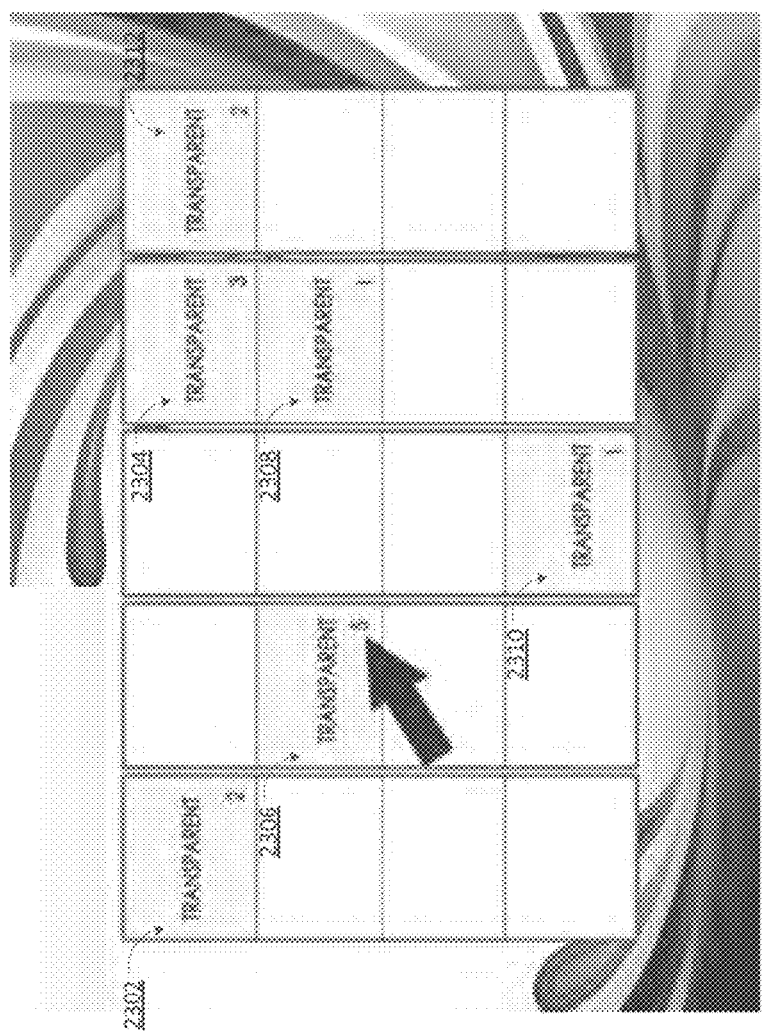

As shown in FIG. 23, transparent areas 2302, 2304, 2306, 2308, 2310, 2312 may randomly appear on the reel grid as part of symbols in the game. When a 'transparent' symbol 2302, 2304, 2306, 2308, 2310, 2312 lands, it may mark the game grid matrix in the position it lands with a number or watermark. The number or watermark may indicate a number of additional symbols stacked behind the transparent area 2302, 2304, 2306, 2308, 2310, 2312. For example, a number "5" may indicate that five symbols are stacked behind a transparent area 2306. The total number of transparent symbols that have landed per area may be tracked. As shown, six transparent areas 2302, 2304, 2306, 2308, 2310, 2312 may appear on the game matrix.

Figure 24:
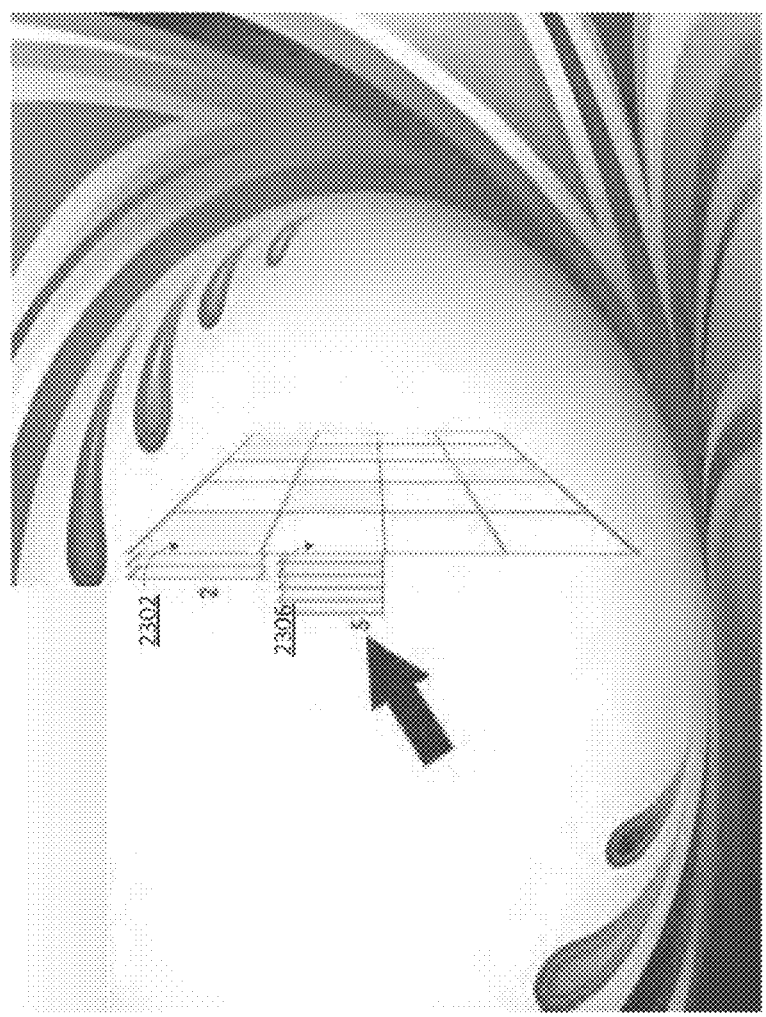

As shown in FIG. 24, when the free games are complete, one final free game may be awarded and the transparent symbol areas will become activated with the 'push through' symbols (e.g. as described in relation to FIG. 22). These additional symbols may be wilds, bonus triggers, straight credit prizes, jackpot symbols, scatters, multipliers, etc. symbols. In some example, the deeper the symbol in the stack then the more valuable they become.

In further example embodiments, there may be a pick a prize feature where the player can gamble on the same spot that they touch (via electronic signal) on the display screen in order to get a larger credit prize or collect a payout. The pick a prize feature may be provided as a three-dimensional enhancement. For example, a three-dimensional enhancement may show spots that have already been picked with depth to highlight a gamble of picking the same spot more than once. The same spot can be touched multiple times, as the player picks "deeper" in the hole. The prize is also double rich but the "collect" or "end game" symbol may also be hidden underneath.

Figure 25:
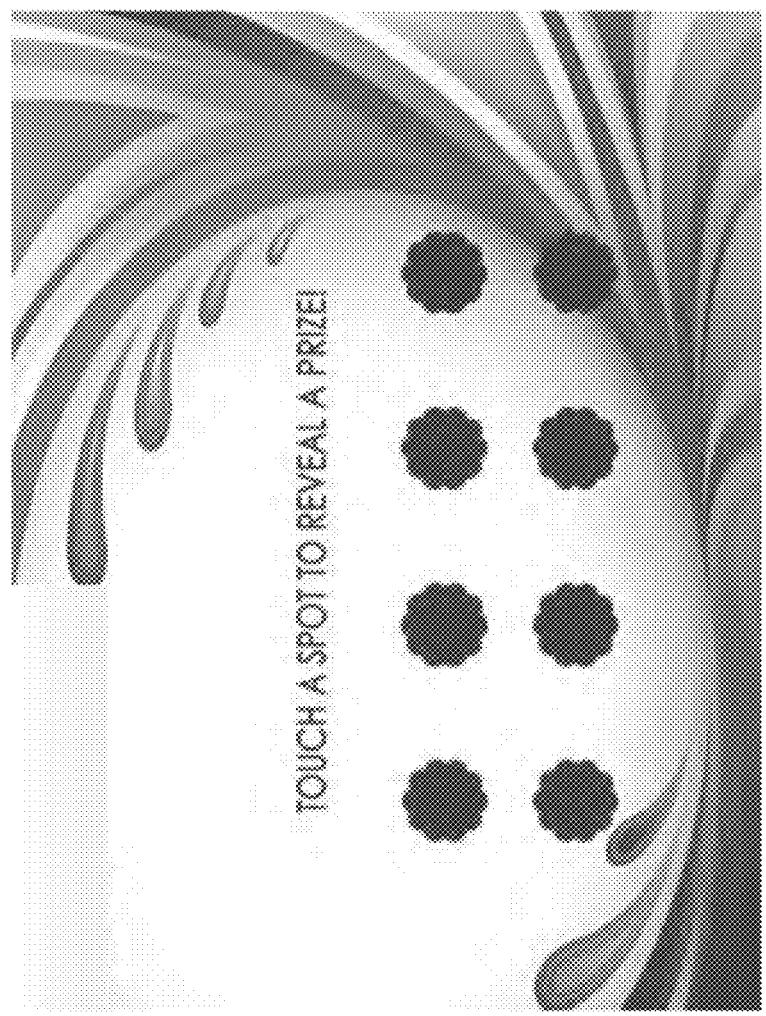
Figure 26:
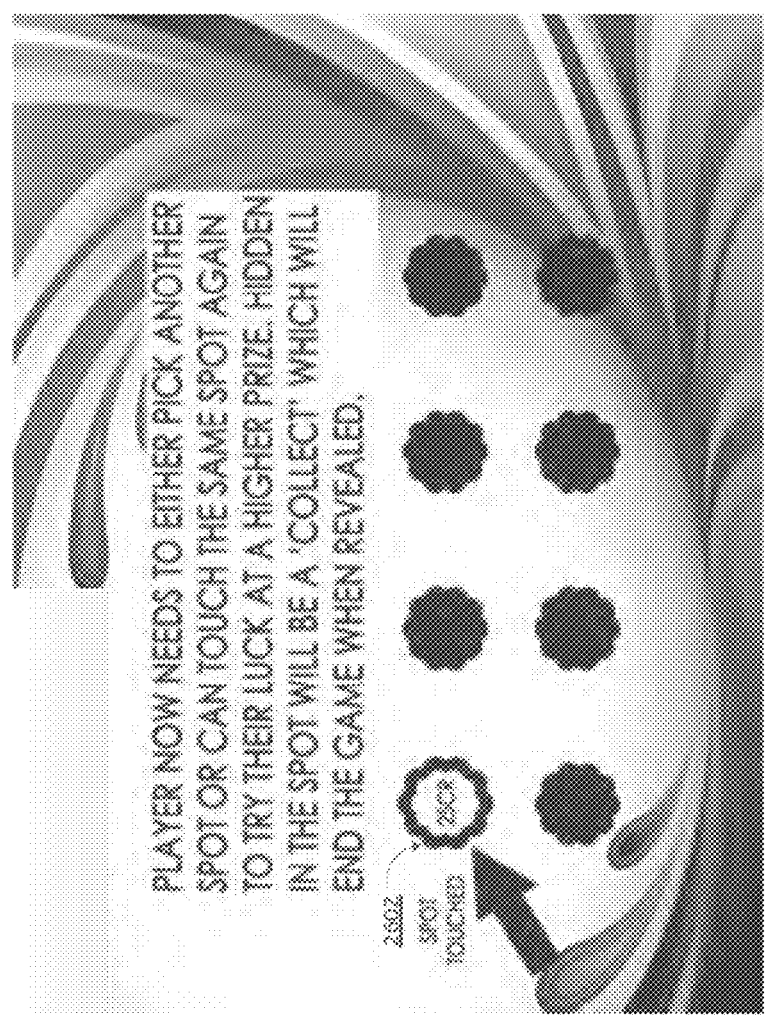
Figure 27:
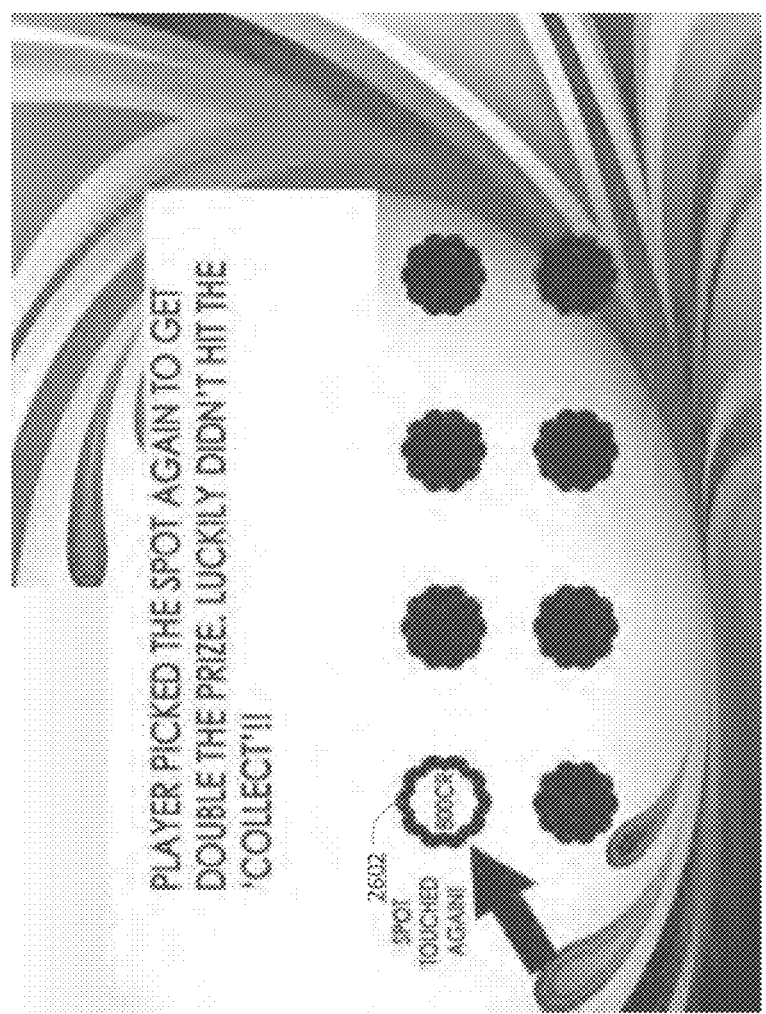
Figure 28:
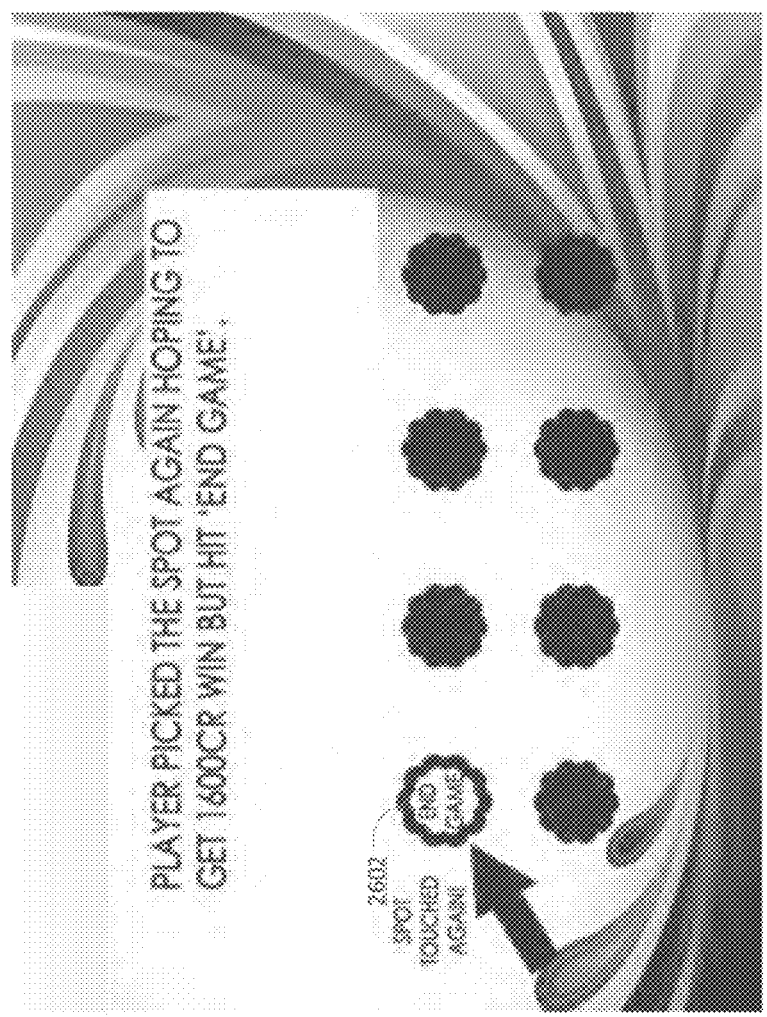

As shown in FIG. 25, a player may be presented with pick a prize screen, and prompted to touch a spot, or other activate a spot. Each spot may be associated with a credit prize or a 'collect'. As shown in FIG. 26, a player may touch first spot and wins 25 credits. The player may still not collect the credits. As shown in FIG. 27, the player may touch the same spot to win 50 credits, then 100 credits, then 200 credits, then 400 credits, and then 800 credits. That is, the spot may have a three-dimensional enhancement such that different prizes are hidden under already activated or touched spots. However, there is a risk in re-touching the same spot as there may not always be a hidden prize. As shown in FIG. 28, the player may press, touch or otherwise activate the same spot hoping to get a larger credit prize (e.g. 1600 credits) but instead an "end game" symbol may be revealed, or a "collect" symbol.

Figure 29:
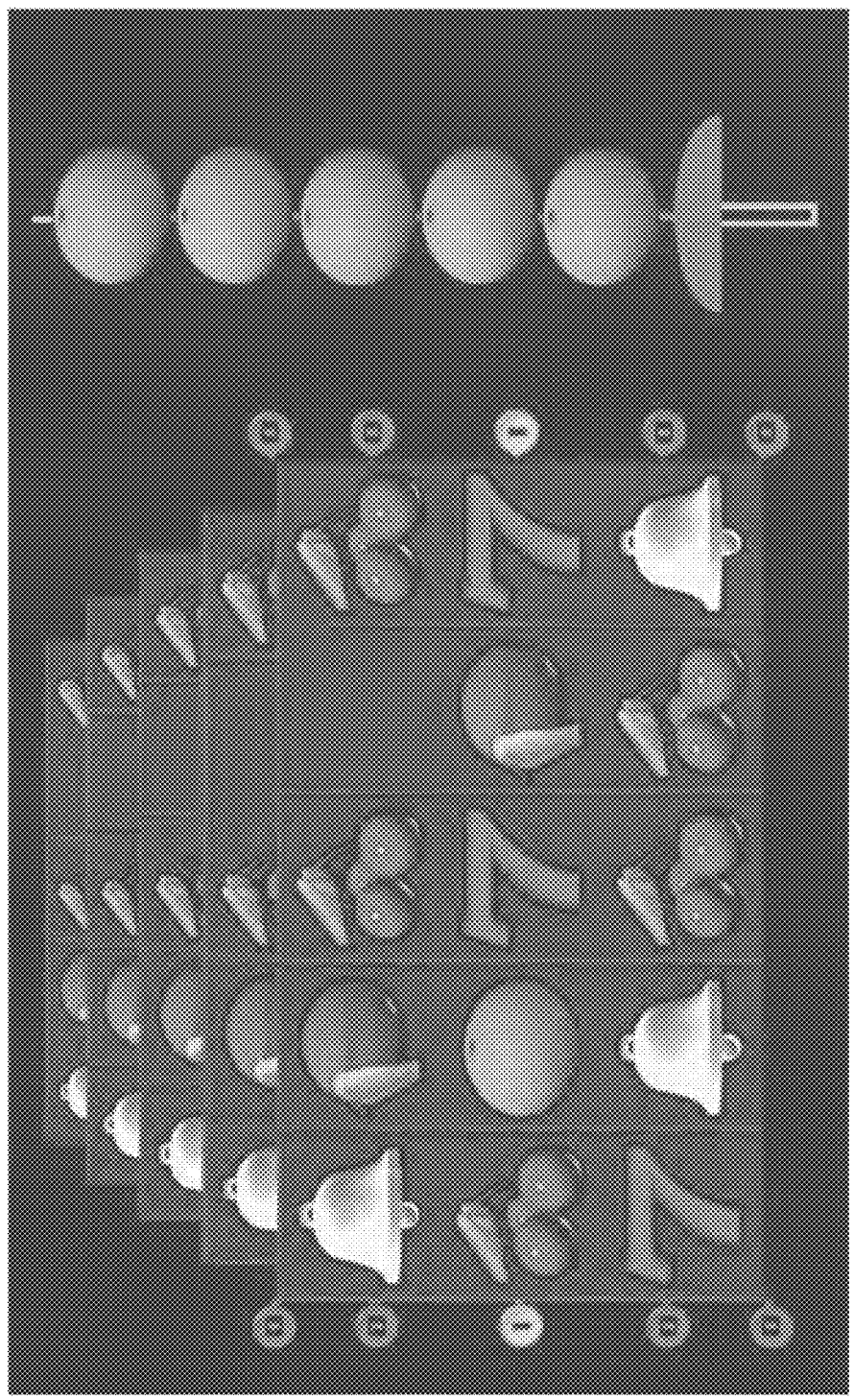
FIG. 29 shows another example three-dimensional game enhancement with stacks of gaming components and extra game feature purchase options.

Referring now to FIG. 29 there is shown another example three-dimensional game enhancement. The game may be a grid or matrix based line-count game, where a player selects their lines and bet. The player may also have to option to purchase symbol positions on the matrix as extra lines. A three-dimensional game enhancement may stack symbols along the z axis. After the reels stop and regular line wins are presented, any additional spots purchased may be presented as a toothpick skewering through the stack of symbols, pulling the stack out and turning it to reveal a side profile. This may reveal any number-in-a-row or scatter wins.

Figure 30A:
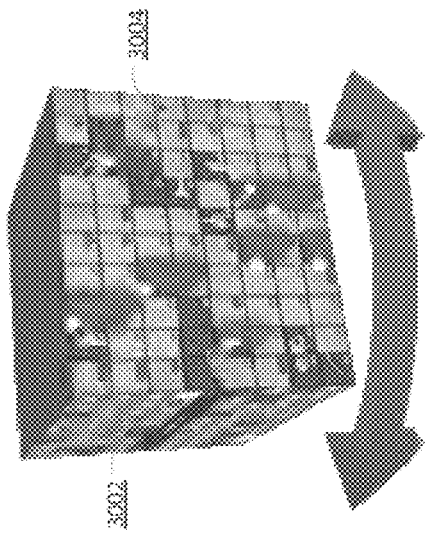
FIGS. 30a, 30b, 30c, 30d show another example three-dimensional game enhancement with multi-faceted gaming surfaces.
Figure 30B:
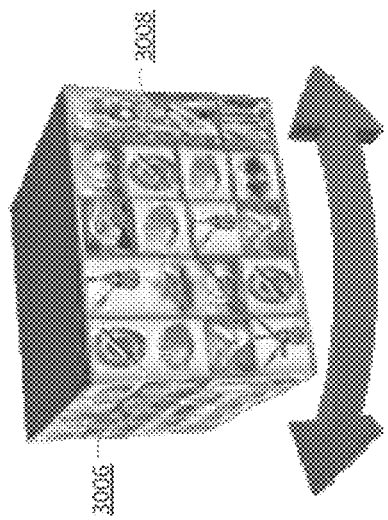

Referring now to FIGS. 30a, 30b, 30c, 30d there is shown another example three-dimensional game enhancement. The gaming surface may be shown as a three-dimensional game enhancement in this example. That is, the three-dimensional game enhancement may be a multi-faceted gaming surface. FIGS. 30a and 30b show two different game surfaces 3002, 3004 on each visible facet of a multi-faceted gaming surface. The multi-faceted gaming surface may rotate or spin to reveal more of a particular game surface 3002, 3004 or different game surfaces that may currently be hidden from view. For example, FIG. 30b shows more of one gaming surface 3004.

Figure 30C:
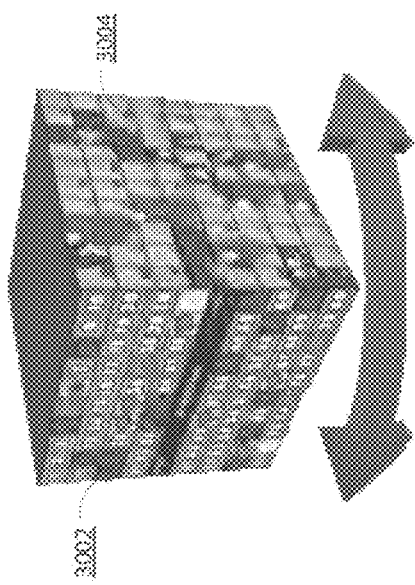
Figure 30D:
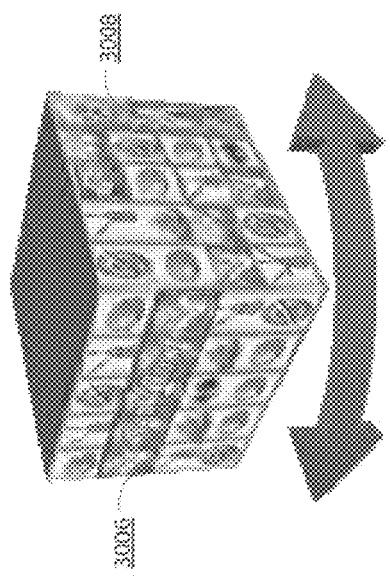

FIGS. 30c and 30b also show two different game surfaces 3006, 3008 on each visible facet of a multi-faceted gaming surface. The multi-faceted gaming surface may rotate or spin to reveal more of a particular game surface 3006, 3008 or different game surfaces that may currently be hidden from view. For example, FIG. 30d shows more of one gaming surface 3008. A cube is an illustrative example and different shapes and configurations may be used for the multi-faceted gaming surface.

Another example three-dimensional game enhancement may involve stacking symbols along a z-axis. For example, symbols may stack five symbols high, where any symbol involved in a winning combination or pattern may be peeled away, revealing the symbol beneath. This may create a z-axis cascading effect. Once all stacked symbols are removed from any spot on the reel that spot may be down to the hard core of the reel. The hard core symbol may be a wild until it is used. Then the symbols are replaced.

The different facets may correspond to different games of the same or different game type. For example, any four-card Keno, or multi-play game where the player is playing more than one game at once may be displayed on different sides of a cube, instead of beside each other, to maximize space.

The player may swipe the cube in any direction to change game card. In another example, buttons on screen may be selected to bypass the swipe control, but the rotation may still be displayed on the surface of a cube.

Figure 31:
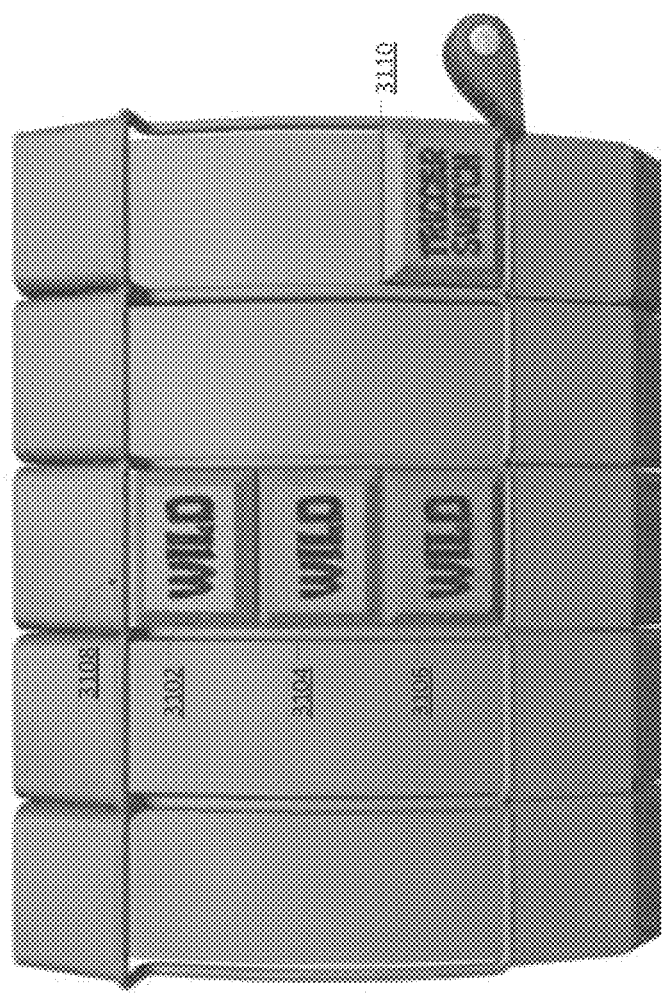
FIG. 31 shows another example three-dimensional game enhancement where gaming components have additional three-dimensional functionality.

Referring now to FIG. 31, there is shown another example three-dimensional game enhancement. The game matrix may relate to symbols on reels that may be activated to extrude or protrude outward on the z axis to create a three-dimensional game enhancement. The three-dimensional game enhancement allows symbols to have a function when they spin past on a reel without landing, instead of just when the symbol lands in view.

The three-dimensional symbols on reels may create different event triggers. For example, there may be a group of stacked symbols 3102, 3104, 3106 that may extrude outward, causing them to catch on the bottom of the reel border 3108, forcing the symbols 3102, 3104, 3106 to automatically stop on screen when they pass into view. In this example the symbols 3102, 3104, 3106 may be wilds.

As another example, a special symbol 3110 could extrude outward to flick a switch every time it passes into view, either triggering an event, or collecting symbols to contribute to a pool of wilds, bonus spins or prize values.

In accordance with some embodiments, three-dimensional game enhancements may relate to various physics effects (e.g. collisions, gravity) used in a three-dimensional environment to interact with symbols and wagering game functionality.

Referring now to FIG. 32, there is shown an example three-dimensional game enhancement that relates to physics effects. Symbols may be stacked along the Z-axis (as shown in FIG. 32 (a)) and may be triggered to break or split (as shown in FIGS. 32 (b), (c), (d), (g)). The break or split may cause the symbol to interact with other symbols by imitating real-world physics such as gravity (e.g. pull the objects downward) and collision (e.g. so more than one object occupying the same three-dimensional space will interact). The enhancement relates to a three-dimensional application (e.g. primarily along the Z-axis).

As shown in FIG. 32 (a), symbols may occupy a game matrix and may be stacked along the Z-axis. These stacks can be several symbols high. A predefined event will trigger a symbol (e.g. the symbol highlighted in FIG. 32 (b)) to animate a physics effects. An example may be to fall, or break into two or more symbols, and then fall. In the example shown in FIG. 32 (c), the symbol breaks into two pieces, with both pieces spreading out, away from its original position. The pieces appear to be affected by gravity, as they fall toward the reels in a three-dimensional space along the Z-axis, as shown in FIG. 32 (d). Each piece has the potential to collide with one or more other symbols, causing the pieces to interact with the colliding symbols, as shown in FIGS. 32 (e) and (f). Colliding symbol interactions may cause symbols to change to wilds, bonus triggers, or similar symbols, and so on. In the example shown in FIG. 32 (g), the colliding symbols create further fractions, causing the newly hit symbols to break into pieces, spread out, and interact with other symbols. These collisions could award extra credits, or create special symbols, for example.

Referring now to FIG. 33, there is shown another example three-dimensional game enhancement that relates to physics effects. Symbols, items or gaming components may be associated with different virtual weights, so the symbols or gaming components react differently to a virtual gravity effect. Certain items or gaming components may be perceived as heavy, and other items or gaming components may be perceived as lightweight. These physical attributes may cause the items or gaming components to interact with other symbols or gaming components stacked along the Z-axis.

In the example shown in FIG. 33 (a), an ANVIL item may symbolize a heavy object, and may appear within the game. Certain game events may trigger to cause heavy symbols, such as the anvil, to virtually fall downward on the gaming surface, breaking any gaming symbols below, as shown in FIGS. 33 (b) and (c). Gaming symbols below may break, either causing the broken pieces to interact with other gaming symbols, remove them from play, award credit for broken gaming symbols, or to cause new gaming symbols to cascade on top, creating new wins, and so on.

Referring now to FIG. 34, there is shown another example of symbols, items or gaming components associated with different virtual weights, so the symbols or gaming components react differently to a virtual gravity effect. Certain items would be perceived as heavy based on the virtual weight associated therewith, and other items may be perceived as lightweight based on the virtual weight associated therewith. These physical (virtual) attributes may cause the items to interact with gaming symbols stacked along the Z-axis in different ways.

In the example shown in FIG. 34 (a), a BALLOON item may symbolize a lightweight object, and may appear within the game. Certain gaming events may be trigger to cause lightweight symbols, such as this balloon, to rise upward, pulling special symbols up to the top of the stack, as shown in FIG. 34 (b).

Figure 35:
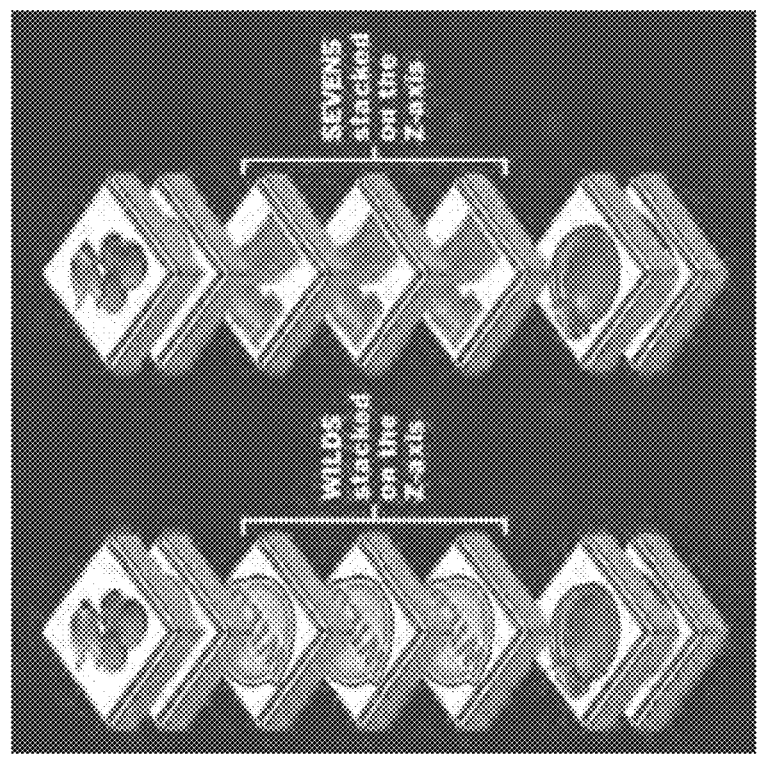
FIG. 35 shows another example three-dimensional game enhancement of stacking symbols or gaming components on the Z-axis.

Referring now to FIG. 35, there is shown another example three-dimensional game enhancement of stacking symbols or gaming components on the Z-axis. The stacked symbols may provide a variety of gaming enhancements, as described herein. For example, certain events may cause a top level gaming component to "peel" off or lift from the stack revealing another gaming symbol underneath. The newly revealed gaming symbol may be used to form additional winning patterns or combinations, for example. The stacked components may relate to Wilds, bonus features, multipliers, and so on. A three-dimensional game enhancement may provide the functionality of stacking symbols on the Z-axis.

The graphic of FIG. 35 illustrates how gaming symbols may be stacked on the Z-axis to create groups of the same symbol, wilds, bonus triggers, any other special symbol, and so on. The symbols may be used independently with other gaming symbols, such that each symbol in the stack may form a different or separate winning combination to provide an additional prize. The symbols may be used together (e.g. three like symbols in a row on the stack) to award additional prizes. Various winning enhancements may be provided.

A further example three-dimensional game enhancement may relate to a matrix that may represent spinning reels in a three-dimensional environment.

When PLAY button is pressed or activated, instead of the reels spinning, a new single layer of symbols may drop from above (along the Z-axis) and blankets the original or underlying matrix with a new layer of symbols. Various winning enhancements may be provided. For example, any wins that are created by the new layer of gaming symbols may cause the winning gaming symbols to disappear and reveal the gaming symbol directly beneath, sometimes causing more wins. This may be referred to as Z-axis or three-dimensional cascading functionality.

Further winning enhancement functionality may be added to create incentives for the player to remove as many symbols as possible. For example, win-multipliers may be provided for matching symbols lower in the stacked layers. Another incentive could be a base layer wild (e.g. the lowest level gaming symbol in the stack may be a Wild symbol).

Referring now to FIG. 36 there is shown a three-dimensional game enhancement for a matrix that may represent spinning reels. In the example shown in FIG. 36 (a), a gaming matrix is shown already populated with several layers of gaming symbols stacked along the z-axis.

As shown in FIG. 36 (b), when a PLAY button is pressed or activated, a new layer of symbols is stacked on top of the original, base, previously dropped, or underlying layer of gaming symbols. In this example, the new layer of symbols appears to drop from above.

As shown in FIG. 36 (c), the new layer of gaming symbols collapses to the previously dropped symbols, and blankets the top of all the stacks of symbols on the matrix. There may be different numbers of symbols stacked for various cells of the matrix as symbols, or different depths of levels. For example gaming symbols may disappear when they form part of a winning combination which may result in different size levels of stacked symbols.

As shown in FIG. 36 (d), new symbols may drop to form a new top layer of gaming symbols for winning combinations. Next, any winning combinations may be tallied. Winning symbols may be removed to reveal symbols below to potentially create more wins. This may create a backwards cascading effect along the z-axis.

While illustrated in the block diagrams as groups of discrete components communicating with each other via distinct electrical data signal connections, the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching example embodiments. The hardware components are configured to provide practical applications of innovative computerized gaming features. The hardware components are configured to provide physical transformations by, for example, transforming the display on gaming screen with three dimensional enhancements.

The concept of enhanced game components may be applied to game mechanics in multiple ways. For example, Wild cards may be placed one on top of each other to create a depth showing multiple wilds in one spot resulting in awarding of the same line multiple times. Wilds may have a multiplier attached to each of the layers in the depth, for example, the front one is worth 1×, the second level is worth 2×, the third level is worth 3×, etc. Surrounding Wilds may be used by offering a layer above a regular reel set that would allow for wilds to be created when reels stop (i.e. any symbol landing would have the opportunity to become wild). This allows for depth to the surrounding wilds. For games that may have a match functionality, it would allow for chunks of wilds and symbols to pay. In some embodiments, Wilds may stay in place until it is awarded. This would allow for the wild to grow in size allowing for either: multiplier attached to the wild; additional wilds stacking up and growing on the spot; or physically growing outwards on the Z axis onscreen.

Scatters may be used in a stacked configuration as well. Scatters may be placed on top of each other to create a depth showing multiple scatters in one spot, resulting in an award for a collective number of scatters. Scatters may also have a multiplier attached to each of the layers in the depth, for example, the front one is worth 1×, the second level is worth 2×, the third level is worth 3×, etc.

The third dimension provided by the enhanced game components may act as a portal or hole into the game (e.g. base game, secondary game, bonus game), given access to a bonus round or an additional win category. Symbols may appear with multiple layers and players may collect symbols and place them one on top of another in a single space. Three-dimensional stacks may be formed by allowing for symbols to be stacked not just on the vertical but also in the third (z) axis, allowing for depth to the normally viewed stacked symbol.

The game component enhancements allow for chunks of symbols that are spanning the vertical space of the reel to also have a back expansion area that causes a 'block' effect. It allows for chunks of symbols that are spanning the horizontal space of the reel to also have a back expansion area that causes a 'block' effect. It may also allow for depth on certain reels to create a new pattern of the physical game grid dimension.

Triggers may be modified using the game component enhancements. Such triggers may include, for example, consecutive triggers (on or outside of a reel), scatter, and trigger tiles. Triggers may lead to various events, such as additional credits, additional payouts, secondary games, bonus rounds, etc. Trigger tiles may be placed on any reel shape/dimension as desired, as a triggering mechanism. Multiple layers could be applied to this triggering mechanism as well. Pay ways may also be modified, as the enhancements allow for multiple games to be played in the same space. Shapes of lines wins may be collected to create a full screen pattern of extra prizes. Different layers with different line sets may be played all at once.

The game enhancements may be applied to multiple environments, such as Keno, 3D game grids, Player User Interfaces (PUI), Greenball (as described in U.S. application Ser. No. 13/631,129, the contents of which are hereby incorporated by reference), and many others. For Keno, multiple balls may be placed on a same number. One screen may be provided with layered effects. For 3D game grids, a 'cube' effect may be created, where the player can interact with the cube to 'spin' it to reveal an additional bonus prize. The enhancement offers a position to expand outwards to create a multiple symbol container. It also offers multi-levels, different matrices, games that become available during bonus rounds as special features activate the exterior, or multiple games to be wagered upon. Multi-facet game boards (i.e. with a matrix on different angles) are also possible.

Bonus types may also be enhanced via the game component enhancements. For example, multiple free games may be played in a layered style. This allows for symbols that land one in front of another that match to create some sort of super win/super symbol that spans in depth and possibly in height, if synchronized reels are used. In a picking screen for picking a prize, the player may grab and drag the 3D object and reposition it on the screen. Progressive posts may get physically larger and expand outwards to show the player that they are getting closer to being awarded, and/or larger in value.

The user interfaces, computer implemented methods, and computer system components described may be used in connection with a variety of different games that are pattern games or that include pattern game components.

Various functions or features described in this disclosure may be implemented as part of different gaming systems. For example:

(A) The winning enhancements may be implemented as part of a game to system (G2S) system.
(B) As previously stated, the user interfaces, computer implemented methods, and computer system components described herein may be used by an EGM.
(C) In the event the game is a lottery game, the game computer may be an in-store gaming system or a gaming kiosk. For lottery games including the enhancements to the game components, the host system may be controlled by a government agency.

As described herein, a third dimension may be provided by the enhanced game components. Three dimensional enhancements may be provided as a primary game (or base game), secondary game or a bonus game in some embodiments. Motion tracking data for the player received via camera may be used to update and modify the three dimensional enhancements, for example. Head and body movements of the player may control aspects of the game.

In some example embodiments, the number of bonus choices may be proportional to the size of the bet, or average bet. The number of features may also be proportional to the size of the bet, or average bet.

Three dimensional enhancements may be provided as dynamic content, where bonus selection and other gaming features may display differently from one trigger to the next. The three dimensional enhancements provide variety in primary and bonus game types to appeal to a broad player demographic.

A bonus game may include progressive levels and may be of a different game type than the primary game, including new symbols and rules. There may also be hidden features within the game.

The game may be a tile based game where different lines shapes of corresponding tiles may be associated with different winning amounts for the game.

Three dimensional enhancements may be used for various game features. For example, there may be a three dimensional enhancement for a trigger symbol, a base game, a tension spin, a large or medium win, a bonus game, a bonus game choice entry, help functionality, introduction to game, and so on.

An example flow for a game with three dimensional enhancements may include a base game with bonus or hidden features. There may be a trigger within the base game to launch a bonus selection game level where the player can select a bonus game from multiple choices. There may be a short description for each bonus game. The amount of bet or average bet within the base game may be proportional to the number of bonus game choices. For example, a higher bet may increase the number of bonus games to select from. The bonus games may be different types of games. The base game may also be a different type of game.

The game may be played on a standalone video gaming machine, a gaming console, on a general purpose computer connected to the Internet, on a smart phone, or using any other type of gaming device. The video gaming system may include multiplayer gaming features.

The game may be played on a social media platform, such as Facebook™. The video gaming computer system may also connect to a one or more social media platforms, for example to include social features. For example, the video gaming computer system may enable the posting of results as part of social feeds. In some applications, no monetary award is granted for wins, such as in some on-line games. For playing on social media platforms, non-monetary credits may be used for bets and an award may comprise similar non-monetary credits that can be used for further play or to have access to bonus features of a game. All processing may be performed remotely, such as by a server, while a player interface (computer, smart phone, etc.) displays the game to the player.

The functionality described herein may also be accessed as an Internet service, for example by accessing the functions or features described from any manner of computer device, by the computer device accessing a server computer, a server farm or cloud service configured to implement said functions or features.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including an EGM, A Web TV, a Personal Digital Assistant (PDA), a smart phone, a tablet or any other suitable portable or fixed electronic device.

Also, a computer may have one or more input and output devices.

These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, changes and modifications may be made.

The embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The embodiments described herein involve computing devices, servers, electronic gaming terminals, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components.

Substituting the computing devices, servers, electronic gaming terminals, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

The invention claimed is:

1. An electronic gaming machine for stereoscopic display of game components, the machine comprising:
   at least one processor;
   memory storing processor-executable instructions in communication with the at least one processor; and
   a stereoscopic display;
   wherein executing the processor-executable instructions by the at least one processor causes the at least one processor to:
   identify, for display, at least one game component in accordance with a set of game rules for a given game;
   select a three-dimensional intensity level for displaying the at least one game component;
   render left and right eye images based on the selected three-dimensional intensity level; and
   provide the rendered left and right eye images to the stereoscopic display, for presentation to the left and right eyes, respectively, of a player,
   wherein the machine is configured to transition between at least a monoscopic rendering mode and a stereoscopic rendering mode.

2. The electronic gaming machine of claim 1, wherein the rendering comprises:
   determining, based on the selected three-dimensional intensity level, an interaxial distance between a left virtual camera and a right virtual camera;
   disposing left and right virtual cameras such that they are separated by the determined interaxial distance; and
   rendering the left and right eye image from the respective perspectives of the left and right virtual cameras.

3. The electronic gaming machine of claim 1, wherein the rendering comprises:
   constructing a three-dimensional scene comprising at least one three-dimensional object representative of the at least one game component; and
   rendering the left and right eye images each as a perspective projection of the constructed three-dimensional scene.

4. The electronic gaming machine of claim 1, wherein the stereoscopic display is at least one of a polarized display, an anaglyphic display, an autostereoscopic display, and a virtual reality head-mounted display.

5. The electronic gaming machine of claim 1, wherein the selecting comprises: receiving a user input indicating the selected three-dimensional intensity level.

6. The electronic gaming machine of claim 1, wherein the selecting comprises: selecting the three-dimensional intensity level in accordance with the set of game rules.

7. The electronic gaming machine of claim 1, wherein the selecting comprises: increasing the three-dimensional intensity level when the player wins the given game, wins a round of the given game, obtains points exceeding a pre-defined threshold, or activates a bonus game.

8. The electronic gaming machine of claim 1, wherein executing the processor-executable instructions by the at least one processor further causes the at least one processor to activate user selection of the three-dimensional intensity level.

9. The electronic gaming machine of claim 8, wherein user selection of the three-dimensional intensity level is activated when the player wins the given game, wins a round of the given game, obtains points exceeding a pre-defined threshold, or activates a bonus game.

10. The electronic gaming machine of claim 1, wherein the machine is configured to transition to the monoscopic rendering mode when the selected three-dimensional intensity level is less than a pre-defined threshold.

11. The electronic gaming machine of claim 1, wherein the machine is configured to transition to the stereoscopic rendering mode when the selected three-dimensional intensity level exceeds a pre-defined threshold.

12. An electronic gaming system for stereoscopic display of game components, the system comprising:
    a server comprising a transmitter for transmitting electronic data signals representing game data;
    an electronic device comprising:
    at least one processor;
    memory storing processor-executable instructions in communication with the at least one processor;
    a stereoscopic display; and
    at least one receiver to receive the game data for storage in the memory;
    wherein executing the processor-executable instructions by the at least one processor causes the at least one processor to:
    identify, for display, at least one game component in accordance with a set of game rules for a given game;
    select a three-dimensional intensity level for displaying the at least one game component by receiving a user input indicating the three-dimensional intensity level;
    render left and right eye images based on the selected three-dimensional intensity level; and
    provide the rendered left and right eye images to the stereoscopic display, for presentation to the left and right eyes, respectively, of a player;
    a network configured to provide a communication link to couple the server and the electronic device.

13. The electronic gaming system of claim 12, wherein the electronic device is an electronic gaming terminal and wherein the system further comprises:
    a mobile gaming device operated by a player coupled via a communications link to the electronic gaming terminal, the mobile gaming device running a remote gaming program to play the given game, the electronic gaming terminal programmed to carry out at least game functions of pseudo-randomly determining a game outcome and determining an award to a player and receiving player control signals by the electronic gaming terminal from the mobile gaming device to initiate the given game,
    wherein the electronic gaming terminal is configured to carry out the given game by the electronic gaming terminal, including determining a final outcome of the given game and any award for the outcome and transmitting electronic data signals to the mobile gaming device identifying the final outcome of the given game and the award.

14. The electronic gaming system of claim 13, wherein the mobile gaming device is a laptop computer, a tablet computer, or a mobile phone.

15. The electronic gaming system of claim 13, wherein the network comprises a wireless network.

16. A computer-implemented method for displaying game components stereoscopically, the method comprising:
   identifying, for display, at least one game component in accordance with a set of game rules for a given game;
   selecting a three-dimensional intensity level for displaying the at least one game component;
   rendering left and right eye images based on the selected three-dimensional intensity level;
   providing the rendered left and right eye images to a stereoscopic display, for presentation to the left and right eyes, respectively, of a player; and
   increasing the three-dimensional intensity level when the player wins the given game, wins a round of the given game, obtains points exceeding a pre-defined threshold, or activates a bonus game.

17. The method of claim 16, further comprising:
   determining, based on the selected three-dimensional intensity level, an interaxial distance between a left virtual camera and a right virtual camera;
   disposing left and right virtual cameras such that they are separated by the determined interaxial distance; and
   rendering the left and right eye image from the respective perspectives of the left and right virtual cameras.

18. The method of claim 16, further comprising:
   constructing a three-dimensional scene comprising at least one three-dimensional object representative of the at least one game component; and
   rendering the left and right eye images each as a perspective projection of the constructed three-dimensional scene.

19. The method of claim 16, further comprising receiving a user input indicating the selected three-dimensional intensity level.

20. The method of claim 16, further comprising selecting the three-dimensional intensity level in accordance with the set of game rules.

* * * * *